US012573648B2

(12) United States Patent
Sheldon-Coulson

(10) Patent No.: US 12,573,648 B2
(45) Date of Patent: Mar. 10, 2026

(54) MARINE THERMAL AND ELECTRICAL BATTERY

(71) Applicant: Lone Gull Holdings, Ltd., Portland, OR (US)

(72) Inventor: Garth Alexander Sheldon-Coulson, Portland, OR (US)

(73) Assignee: Lone Gull Holdings, Ltd., Portland, OR (US)

( * ) Notice: Subject to any disclaimer, the term of this patent is extended or adjusted under 35 U.S.C. 154(b) by 0 days.

(21) Appl. No.: 19/080,676

(22) Filed: Mar. 14, 2025

(65) Prior Publication Data

US 2025/0300200 A1     Sep. 25, 2025

Related U.S. Application Data

(60) Provisional application No. 63/569,682, filed on Mar. 25, 2024.

(51) Int. Cl.
H01M 8/04082     (2016.01)
H01M 8/0289     (2016.01)

(52) U.S. Cl.
CPC ..... H01M 8/04201 (2013.01); H01M 8/0289 (2013.01); *H01M 2250/20* (2013.01); *H01M 2250/407* (2013.01)

(58) Field of Classification Search
CPC ........... H01M 8/04201; H01M 8/0289; H01M 2250/20; H01M 2250/407
See application file for complete search history.

(56) References Cited

U.S. PATENT DOCUMENTS

| | | | |
|---|---|---|---|
| 2011/0008178 A1* | 1/2011 | Spidell ................ | F03B 13/1875 |
| | | | 417/330 |
| 2011/0114496 A1 | 5/2011 | Dopp et al. | |
| 2017/0198401 A1 | 7/2017 | Phillips | |
| 2018/0238294 A1* | 8/2018 | Alm ........................ | F03B 13/20 |
| 2019/0003448 A1* | 1/2019 | Shepsis .................... | C25B 1/04 |
| 2019/0353139 A1* | 11/2019 | Sheldon-Coulson ........................ | |
| | | | H02K 7/1823 |
| 2020/0056578 A1* | 2/2020 | Sheldon-Coulson ........................ | |
| | | | F03B 13/145 |
| 2023/0078347 A1* | 3/2023 | Sheldon-Coulson ..... | C25B 1/04 |
| | | | 205/637 |
| 2023/0378499 A1* | 11/2023 | Toida ................ | H01M 8/04395 |
| 2024/0295208 A1* | 9/2024 | Solheim .................. | F03B 13/24 |
| 2024/0322738 A1* | 9/2024 | Ren ........................... | C25B 9/65 |

FOREIGN PATENT DOCUMENTS

WO          2021102396 A1      5/2021

OTHER PUBLICATIONS

International Search Report and Written Opinion from PCT/US2025/020288 dated May 22, 2025, 9 pgs.

* cited by examiner

*Primary Examiner* — Muhammad S Siddiquee
(74) *Attorney, Agent, or Firm* — Schwabe, Williamson & Wyatt, P.C.

(57)          ABSTRACT

Embodiments disclosed herein comprise a wave energy converter (WEC) that includes a buoyant chamber with a tube depending from the buoyant chamber. In an embodiment, a battery is coupled to the WEC. In an embodiment, the battery includes a first tank for storing an oxidizing gas and a precursor fluid, and a second tank for storing a fuel. In an embodiment the battery further includes a fuel cell fluidically coupled to the first tank and the second tank, and a reaction pipe fluidically coupled to the first tank and the second tank.

25 Claims, 30 Drawing Sheets

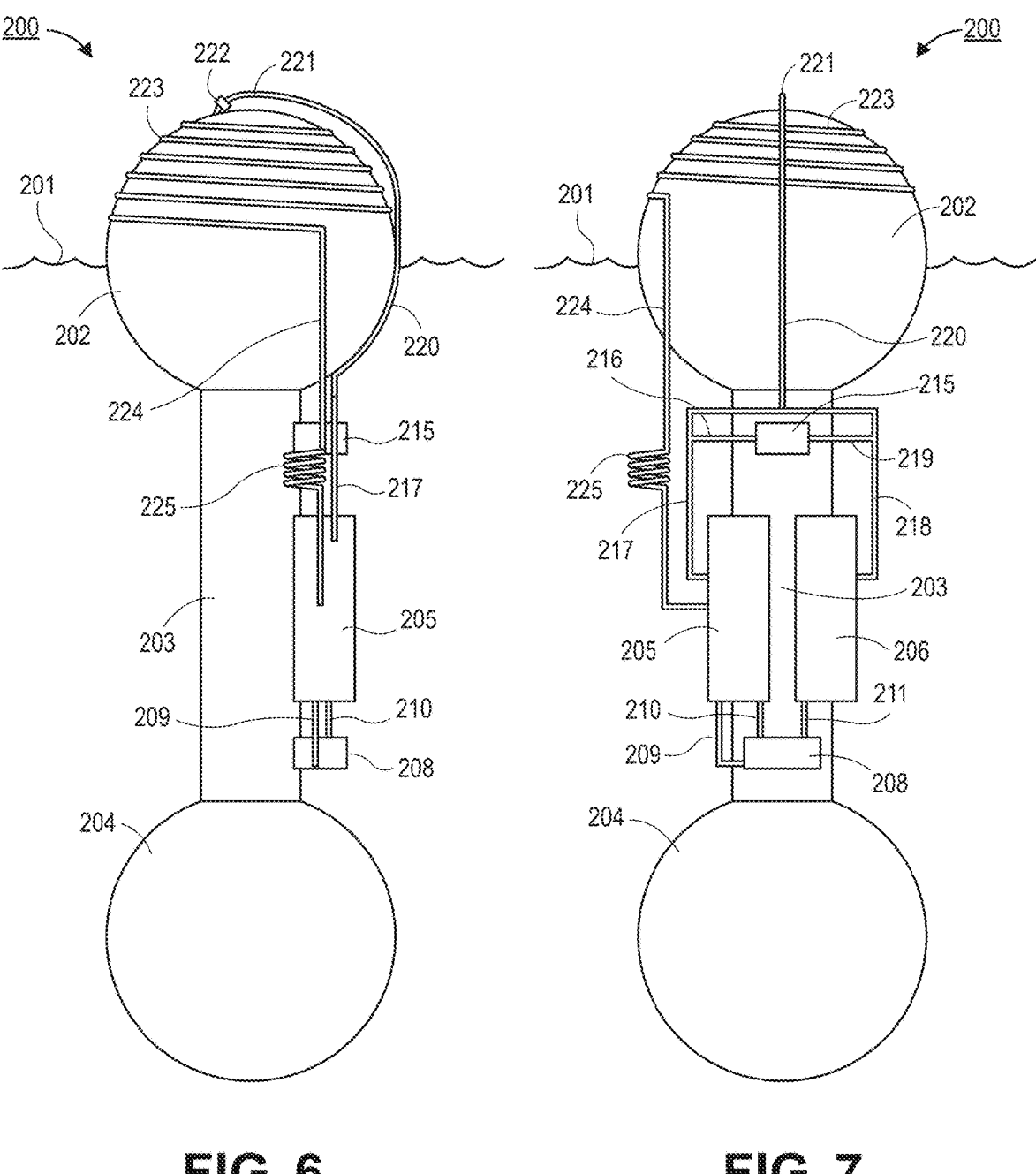
FIG. 6          FIG. 7

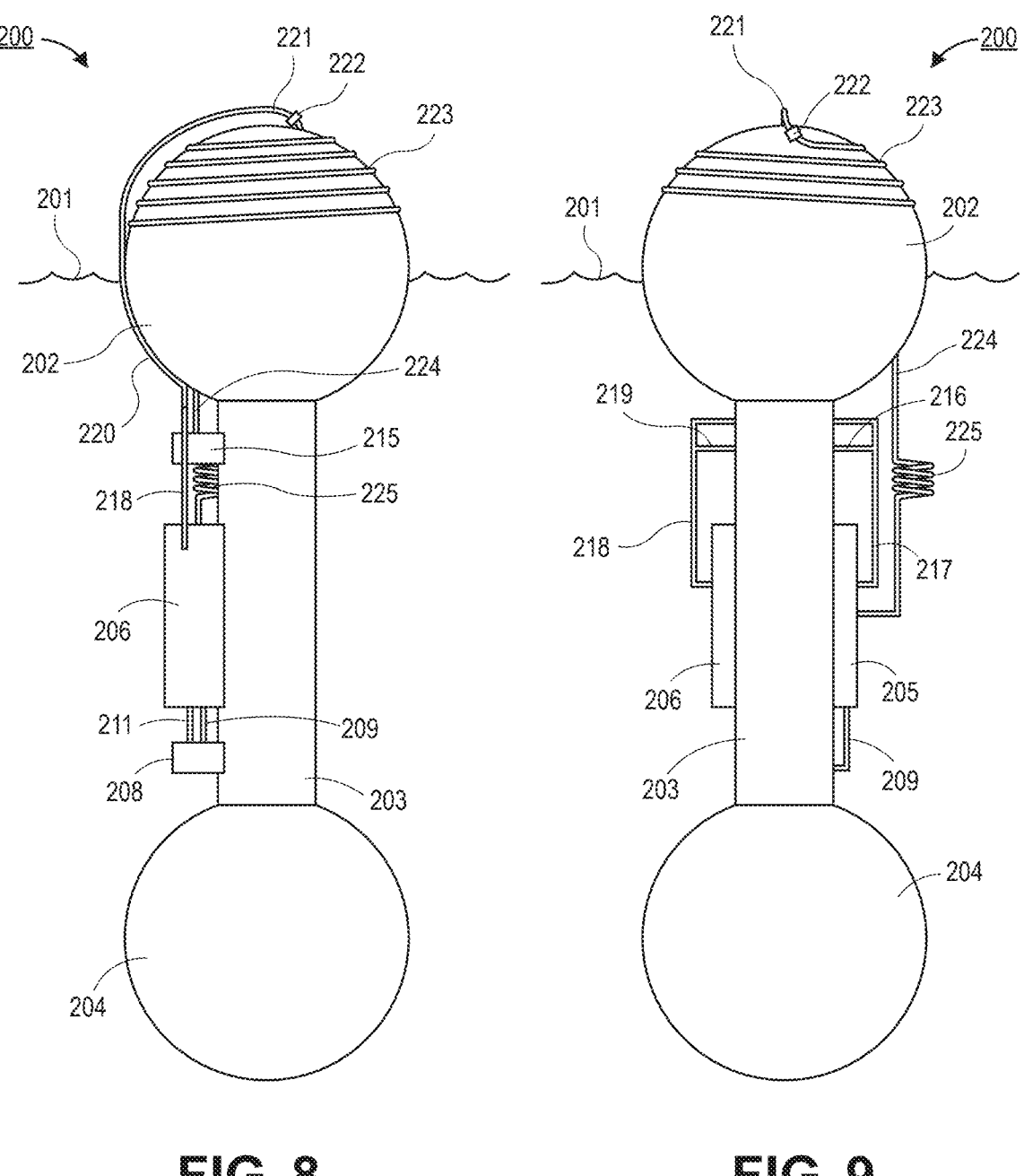
FIG. 8                              FIG. 9

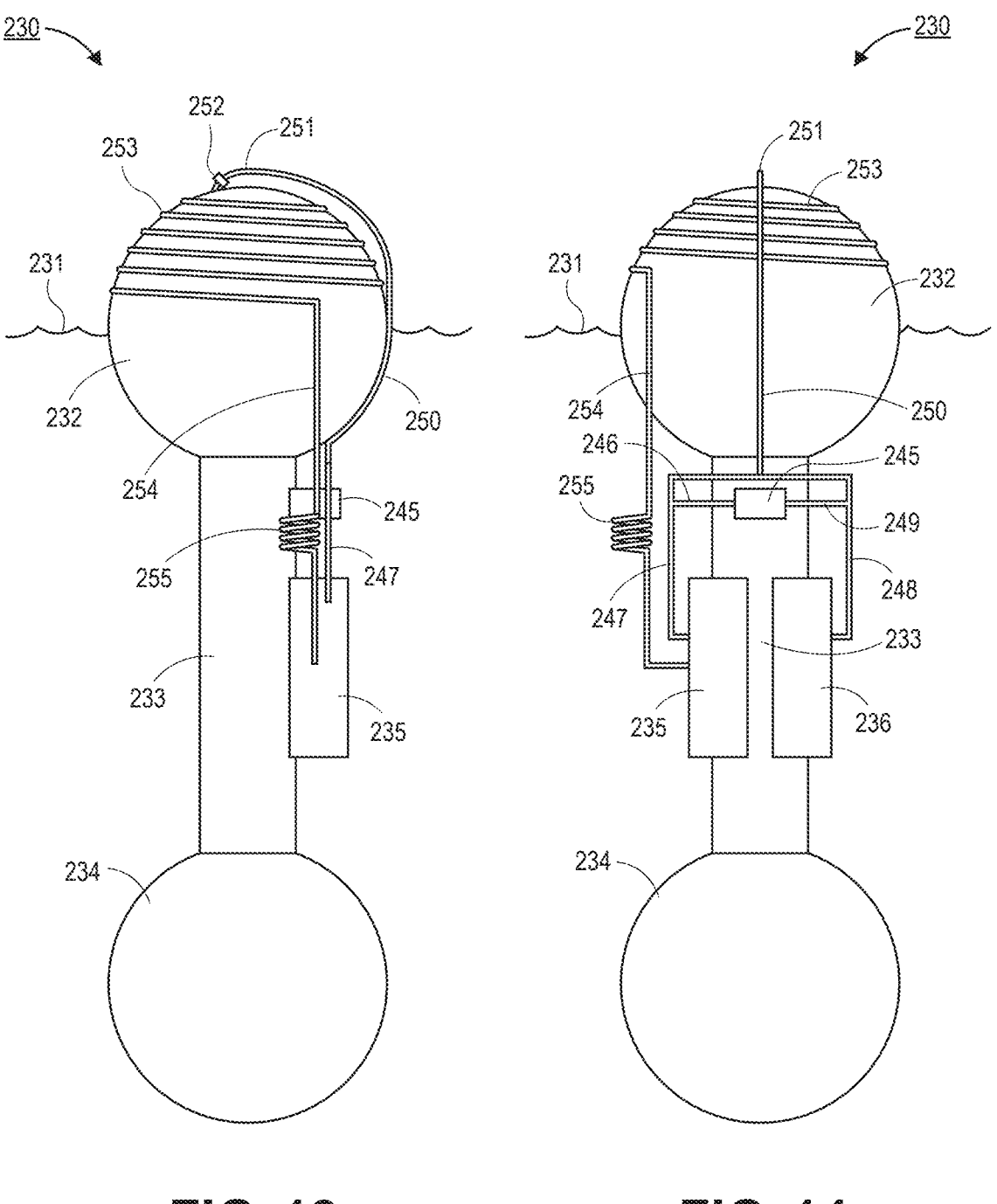
FIG. 13          FIG. 14

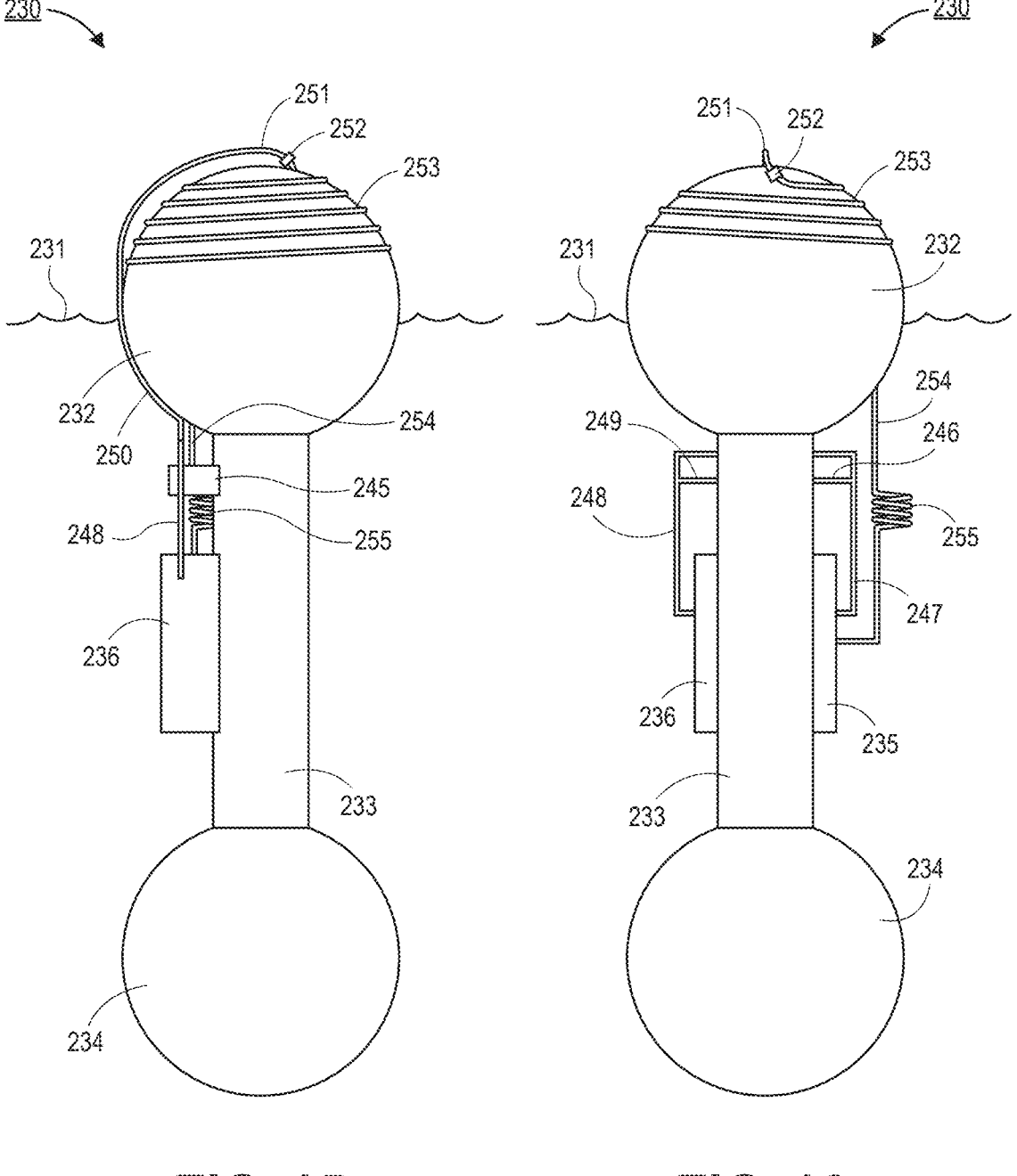
FIG. 15          FIG. 16

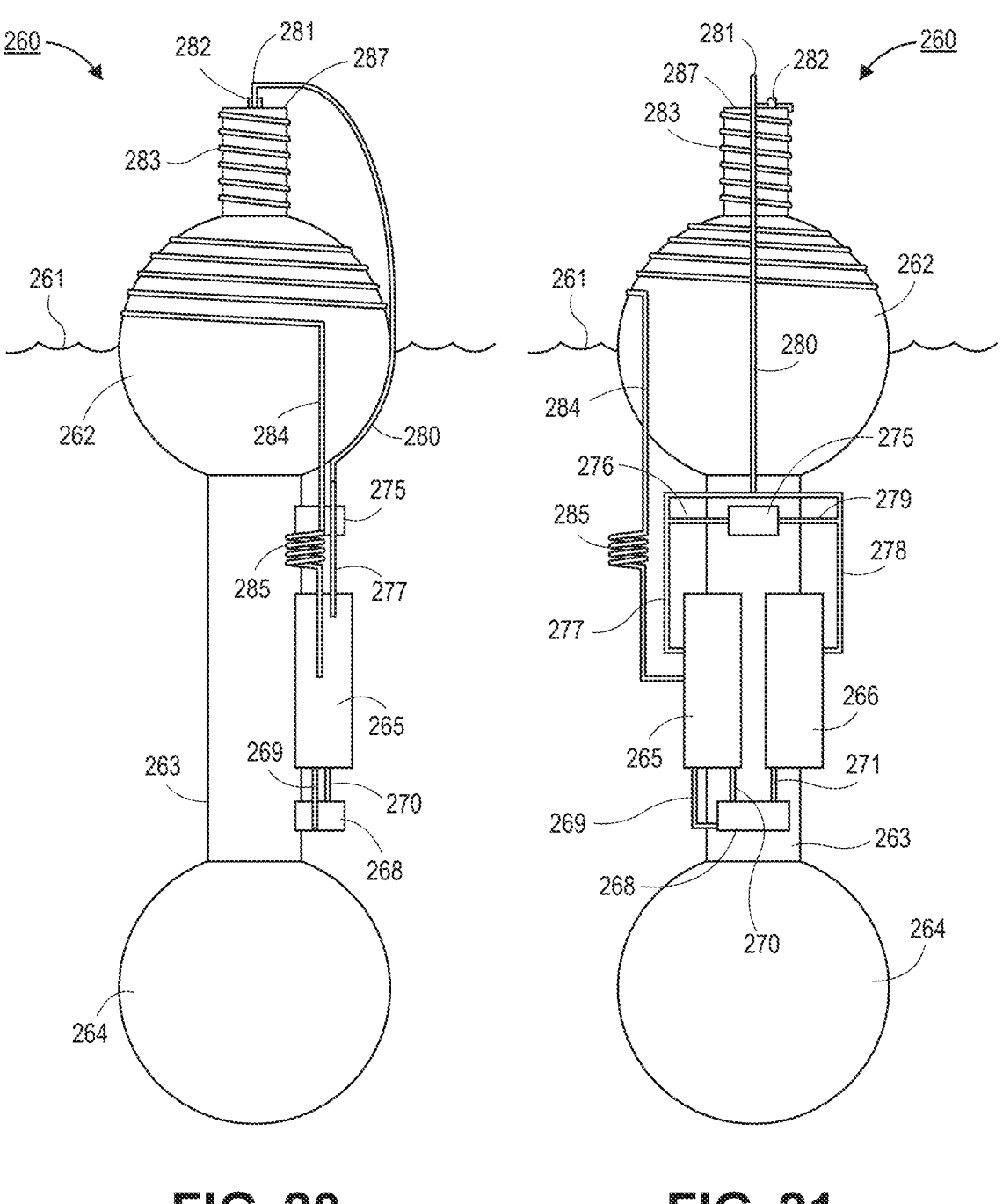
FIG. 20          FIG. 21

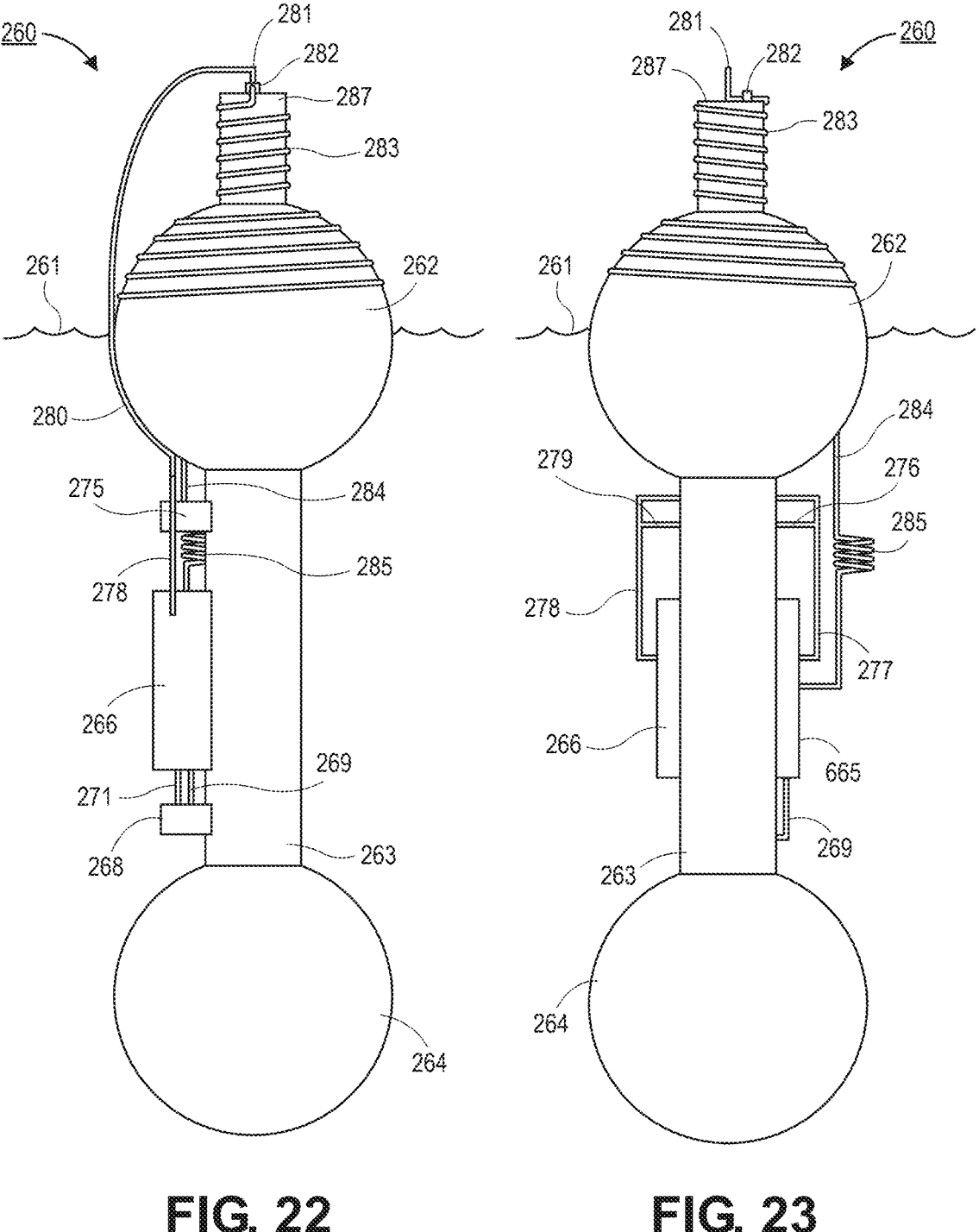
FIG. 22          FIG. 23

_910_

CONVERTING WAVE ENERGY INTO AN ENERGY PRODUCT WITH A WAVE ENERGY CONVERSION (WEC) DEVICE THAT COMPRISES A THERMAL AND/ OR ELECTRICAL BATTERY          911

MOVING THE ENERGY PRODUCT FROM THE WEC DEVICE TO A TRANSPORT VESSEL          912

DELIVERING THE ENERGY PRODUCT TO A STORAGE FACILITY OR A POWER PLANT WITH THE TRANSPORT VESSEL          913

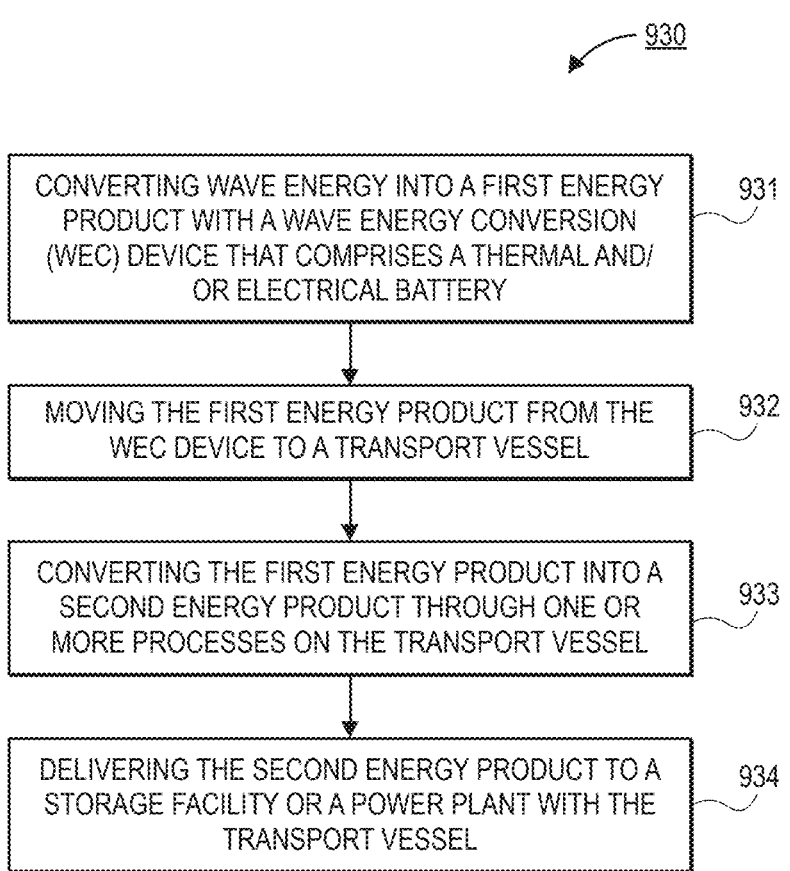

<u>930</u>

CONVERTING WAVE ENERGY INTO A FIRST ENERGY PRODUCT WITH A WAVE ENERGY CONVERSION (WEC) DEVICE THAT COMPRISES A THERMAL AND/OR ELECTRICAL BATTERY     931

MOVING THE FIRST ENERGY PRODUCT FROM THE WEC DEVICE TO A TRANSPORT VESSEL     932

CONVERTING THE FIRST ENERGY PRODUCT INTO A SECOND ENERGY PRODUCT THROUGH ONE OR MORE PROCESSES ON THE TRANSPORT VESSEL     933

DELIVERING THE SECOND ENERGY PRODUCT TO A STORAGE FACILITY OR A POWER PLANT WITH THE TRANSPORT VESSEL     934

FIG. 39

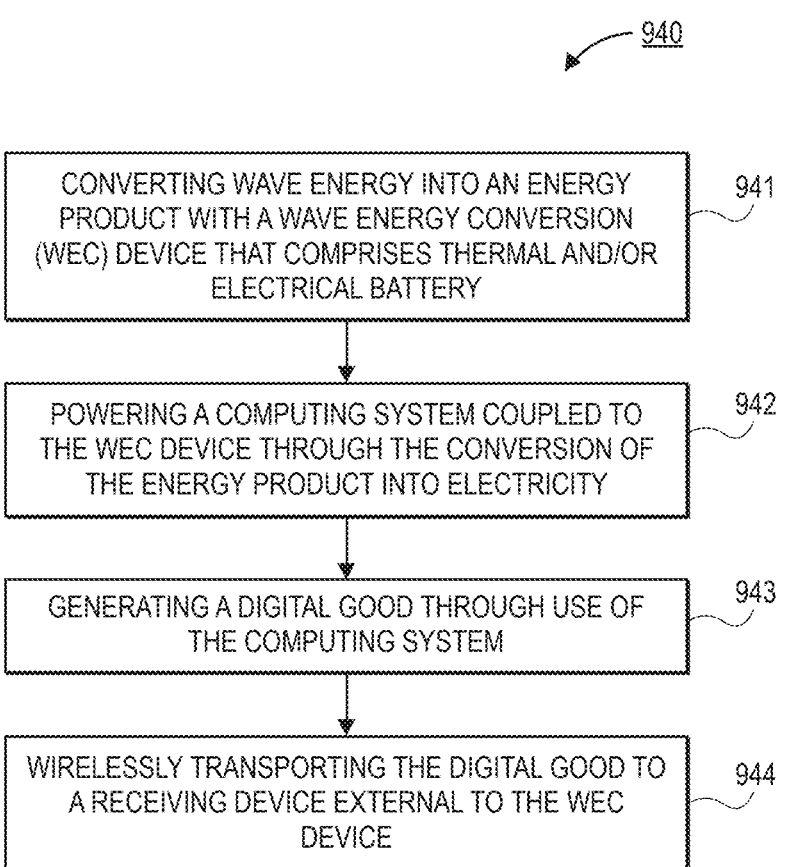

940

CONVERTING WAVE ENERGY INTO AN ENERGY PRODUCT WITH A WAVE ENERGY CONVERSION (WEC) DEVICE THAT COMPRISES THERMAL AND/OR ELECTRICAL BATTERY — 941

POWERING A COMPUTING SYSTEM COUPLED TO THE WEC DEVICE THROUGH THE CONVERSION OF THE ENERGY PRODUCT INTO ELECTRICITY — 942

GENERATING A DIGITAL GOOD THROUGH USE OF THE COMPUTING SYSTEM — 943

WIRELESSLY TRANSPORTING THE DIGITAL GOOD TO A RECEIVING DEVICE EXTERNAL TO THE WEC DEVICE — 944

FIG. 40

MARINE THERMAL AND ELECTRICAL BATTERY

CROSS-REFERENCE TO RELATED APPLICATIONS

This application claims the benefit of U.S. Provisional Application No. 63/569,682, filed on Mar. 25, 2024, the entire contents of which are hereby incorporated by reference herein.

BACKGROUND

Some marine environments have extreme temperature conditions. For example, the ambient temperatures may be below 0° C., and the water temperatures may be between −2° C. and 10° C. near arctic regions. These low temperature environments make it difficult to operate electrical devices. In some instances, vessels may be primarily located in such extreme environments, and/or vessels may at least temporarily visit such extreme environments. The ability to maintain a temperature on the vessel that enables operation of electrical devices (e.g., computers, sensors, communications systems, etc.) is necessary in order for the vessel to operate in harsh conditions.

In some instances, an electrical heater may be provided in order to warm the vessel (or portions of the vessel). Electrical heaters may not have the necessary efficiency in order to allow for long durations in challenging environments. As such, excess battery storage, fuel, or the like may need to be carried by the vessel in order to prepare for the cold temperatures. This is particularly problematic for vessels that reside primarily in cold environments. For example, buoy like vessels for sensing applications (e.g., climate sensing, weather sensing, biological sensing, etc.), or for green energy product generation (e.g., hydrogen gas generation) may operate in isolation, with only periodic (if any) refueling.

SUMMARY OF THE INVENTION

Disclosed herein is a thermal and electrical battery. In an embodiment, the power to run the thermal and electrical battery is stored in a gas form. For example, an oxidant and a fuel may be stored in separate tanks or chambers. When electrical energy is needed, the oxidant and the fuel may be flown into a fuel cell in order to generate electrical current that is coupled to a load (e.g., a computer system, a sensor, a communications system, etc.). When thermal energy is needed, the oxidant and the fuel may be flown to a reaction pipe. A catalyst in the reaction pipe may initiate an exothermic reaction between the oxidant and the fuel in order to generate heat. The heat can be used to control a temperature of one or more components, systems, or the like.

In one embodiment, the oxidant may comprise oxygen gas, and the fuel may comprise hydrogen gas. Though, other gas systems may also be used. For example, the oxidant may also include a chlorine gas, or the fuel may comprise methanol or another hydrogen containing fuel.

In an embodiment, one or both of the fuel and the oxidizer may be supplied to the tanks. The tanks may be refilled when the oxidizer and the fuel are consumed. In another embodiment, one or both of the fuel and the oxidizer may be replenished through internal generation of the gasses. For example, an electrolyzer may be used to convert water into hydrogen and oxygen. The precursor liquid may be supplied to the system in some embodiments. Water generated through the reaction in the reaction pipe and/or the fuel cell can also be returned to the tank to replenish the precursor liquid. The electrolyzer may be powered through the use of on-board energy generation (e.g., a wave energy converter that is coupled to the battery, solar panel, wind turbine, etc.).

In one embodiment, the thermal and electrical battery may comprise both an electrolyzer and a fuel cell. Such an embodiment may be beneficial when the thermal and electrical battery is coupled to a source of energy generation, such as a renewable or green energy source. In other embodiments, the thermal and electrical battery may include only the fuel cell. Such embodiments may be useful when the thermal and electrical battery can have gasses replenished periodically.

In an embodiment, the thermal and electrical battery may be coupled to any type of device. In one embodiment, the device is a watercraft or other water compatible vessel. For example, the device may include, but is not limited to, a boat, a buoy, a submersible, an amphibious vehicle, or the like. The device may be self-propelled so that it can actively navigate across or through a body of water, or the device may be passive without active propulsion systems. The device may also be an aerial vehicle, a land based vehicle, or any other type of vehicle. Other devices may include land based stations (e.g., a weather station). More generally, the thermal and electrical battery may be coupled to any device that is to be thermally controlled, and/or which may comprise electronics, sensors, motors, etc. that use electrical power.

In a particular embodiment, the thermal and electrical battery is coupled to a wave energy converter (WEC) that floats on a body of water. The WEC may generate energy from the motion of waves that pass over and/or through the body of water. The WEC may include any number of sensors, computers, and/or other electronic components. The thermal portion of the battery may be used to warm the WEC so that the sensors, computers, and/or other electronic components are at suitable temperature in order to allow for operation in cold environments, such as those described above. In some instances, the thermal and electrical battery may be used to prevent ice formation on the WEC or to melt ice on the WEC. The electrical portion of the battery may be used to power (or aid in powering) one or more of the sensors, computers, and/or other electronic components.

In some embodiments, warming the WEC (or any other vessel) with the thermal and electrical battery may be useful for locating the WEC in a body of water. For example, the thermal signature provided by the reaction pipe may be used to locate the WEC in order to guide a second vessel to the WEC in low visibility conditions. This may be useful for refueling operations, energy product offtake from the WEC, or any other suitable use case.

In some embodiments, a mast or other protruding structure may extend up from the top of the WEC (or any other vessel). The reaction pipe may be wrapped around the mast. Such a mast may be useful to raise the thermal signal out of the water. This can aid in providing a clearer thermal signature for identification in low visibility environments. The mast may also house some (or all) of the electrical components that are to be warmed. Grouping the electrical components within the mast may allow for more efficient temperature control compared to if they were spread about the WEC (or other vessel).

In an embodiment, the reaction pipe may be separated from a feed pipe by a peak or apex of the system. A catalyst may be provided on the same side of the peak as the reaction pipe, and the feed pipe may be provided on the opposite side of the peak. This ensures that the reaction products (e.g., water) flow down the reaction pipe towards a return line instead of passing back down the feed pipe. In an embodiment, any catalyst may be used to initiate the reaction in the reaction pipe. For example, the catalyst may include a spark plug, an ultraviolet lamp, or platinum. In the case of platinum, a layer of platinum may line a portion of the walls of the reaction pipe.

In some embodiments, a single reaction pipe is used. In other embodiments, a branched structure with two or more reaction pipes may be used. In a branched configuration, a feed pipe may branch into different reaction pipes before rejoining together at a return line. That is, the branched reaction pipes may be considered as being provided "in fluidic parallel" between the feed pipe and the return line. Such an embodiment may be beneficial for heating separate regions of a device or for heating more than one device with a single thermal and electrical battery.

BRIEF DESCRIPTION OF THE DRAWINGS

FIG. 6 is a side view of the vessel in FIG. 5, in accordance with an embodiment.

FIG. 7 is a side view of the vessel in FIG. 5, in accordance with an embodiment.

FIG. 8 is a side view of the vessel in FIG. 5, in accordance with an embodiment.

FIG. 9 is a side view of the vessel in FIG. 5, in accordance with an embodiment.

FIG. 13 is a side view of the vessel in FIG. 12, in accordance with an embodiment.

FIG. 14 is a side view of the vessel in FIG. 12, in accordance with an embodiment.

FIG. 15 is a side view of the vessel in FIG. 12, in accordance with an embodiment.

FIG. 16 is a side view of the vessel in FIG. 12, in accordance with an embodiment.

FIG. 20 is a side view of the vessel in FIG. 19, in accordance with an embodiment.

FIG. 21 is a side view of the vessel in FIG. 19, in accordance with an embodiment.

FIG. 22 is a side view of the vessel in FIG. 19, in accordance with an embodiment.

FIG. 23 is a side view of the vessel in FIG. 19, in accordance with an embodiment.

FIG. 39 is a process flow diagram of a process for generating an energy product with a first vessel with a thermal and electrical battery and transporting the energy product to a second vessel, in accordance with an embodiment.

FIG. 40 is a process flow diagram of a process for generating an energy product with a vessel with a thermal and electrical battery, and using the energy product to produce digital goods, in accordance with an embodiment.

5

Figure 1:
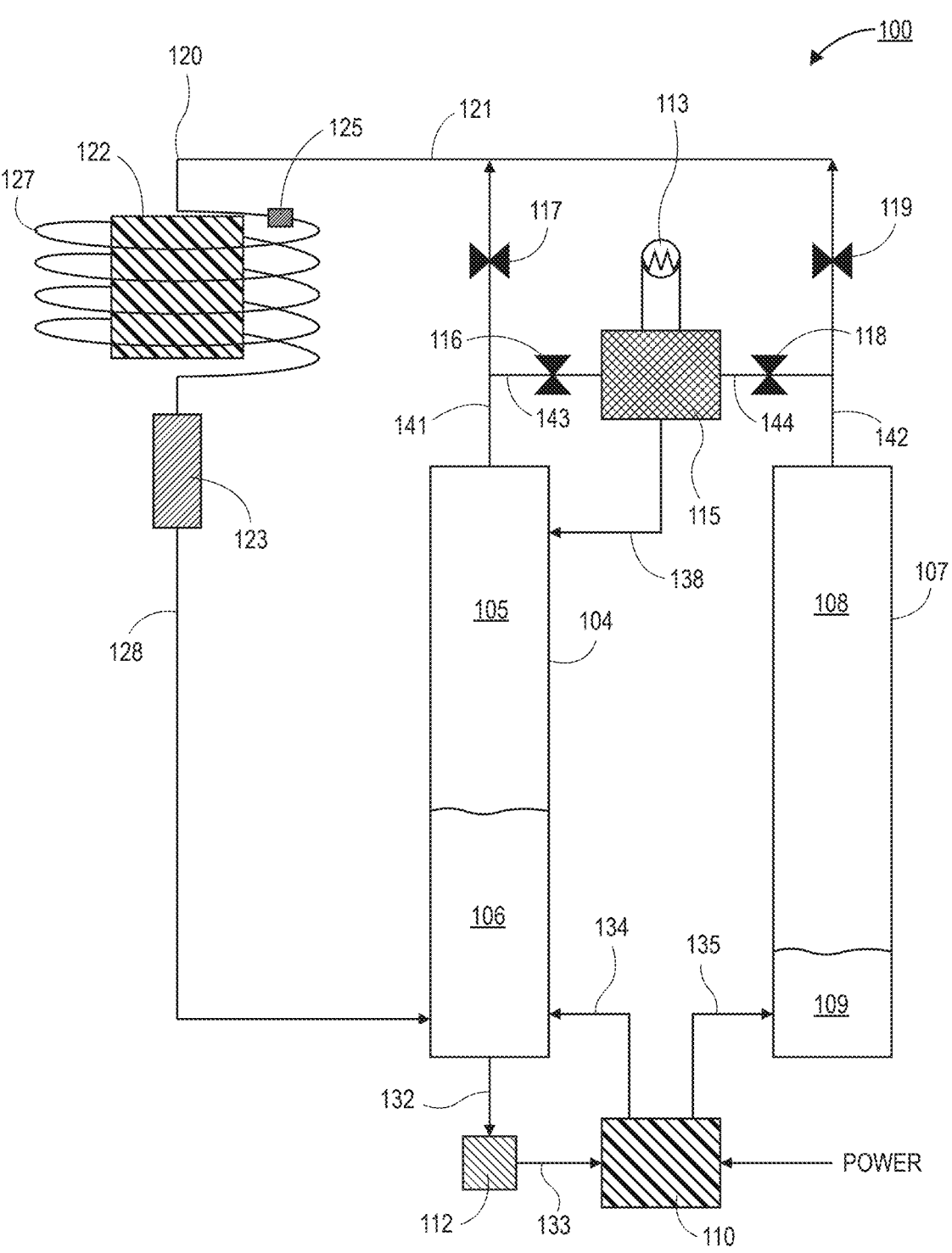
FIG. 1 is a schematic illustration of a thermal and electrical battery with an electrolyzer and a fuel cell, in accordance with an embodiment.

DETAILED DESCRIPTIONS OF THE
PREFERRED EMBODIMENTS

For a fuller understanding of the nature and objects of the disclosure, reference should be made to the following detailed description, taken in connection with the accompanying drawings. The following figures, and the illustrations offered therein, in no way constitute limitations, either explicit or implicit, on the scope of the current disclosure. Various embodiments or aspects of the disclosure are described herein. In some implementations, the different embodiments are practiced separately. However, embodiments are not limited to embodiments being practiced in isolation. For example, two or more different embodiments can be combined together in order to be practiced as a single device, process, structure, or the like. The entirety of various embodiments can be combined together in some instances. In other instances, portions of a first embodiment can be combined with portions of one or more different embodiments. For example, a portion of a first embodiment can be combined with a portion of a second embodiment, or a portion of a first embodiment can be combined with a portion of a second embodiment and a portion of a third embodiment.

The embodiments illustrated and discussed in relation to the figures included herein are provided for the purpose of explaining some of the basic principles of the disclosure. However, the scope of this disclosure covers all related, potential, and/or possible, embodiments, even those differing from the idealized and/or illustrative examples presented. This disclosure covers even those embodiments which incorporate and/or utilize modern, future, and/or as of the time of this writing unknown, components, devices, systems, etc., as replacements for the functionally equivalent, analogous, and/or similar, components, devices, systems, etc., used in the embodiments illustrated and/or discussed herein for the purpose of explanation, illustration, and example.

The scope of this disclosure includes embodiments possessing, incorporating, including, and/or utilizing, any number of thermal and electrical batteries. The scope of this disclosure includes embodiments possessing, incorporating, including, and/or utilizing, thermal and electrical batteries made of any and all materials. The scope of this disclosure includes thermal and electrical batteries with potential energy supplies that comprise any suitable oxidizing gas and any suitable gas fuel. The scope of this disclosure includes thermal and electrical batteries that are coupled to any device. The device may be land based or water based. In the case of a water based device, the device may include, but is not limited to, vessels, boats, buoys, submersible vehicles, amphibious vehicles, and/or the like.

The scope of this disclosure includes embodiments possessing, incorporating, including, and/or utilizing, wave-motion energized power take offs, including, but not limited to: fluid and/or hydrokinetic turbines of any and all types, any and all diameters, any and all efficiencies, any and all power ratings, and made of any and all materials; magnetohydrodynamic generators of any and all types, any and all diameters, any and all efficiencies, any and all power ratings, and made of any and all materials; hydraulic pumps, accumulators, and/or generators, of any and all types, any and all diameters, any and all efficiencies, any and all power ratings, and made of any and all materials; pendulum mechanisms, and/or mechanisms possessing, incorporating, including, and/or utilizing, unbalanced and/or off-axis weights, of any and all types, any and all diameters, any and all efficiencies, any and all power ratings, and made of any and all materials; electrical generators and/or alternators of any and all types, any and all diameters, any and all efficiencies, any and all power ratings, and made of any and all materials; and/or energy conversion mechanisms, systems, and/or apparatuses, of any and all types, any and all diameters, any and all efficiencies, any and all power ratings, and made of any and all materials. Such devices may generally be referred to as a WEC.

The scope of this disclosure includes embodiments possessing, incorporating, including, and/or utilizing, any number of fluid chambers, and fluid chambers of any design, size, shape, volume, relative and/or absolute position within an embodiment. The scope of this disclosure includes embodiments possessing, incorporating, including, and/or utilizing, fluid chambers made of any and all materials.

A portion of many embodiments of the present disclosure include, incorporate, and/or utilize, at least one buoyant portion, buoy, vessel, and/or module. These buoyant portions may be referred to as hollow flotation modules, buoys, buoyant capsules, buoyant chambers, buoyant compartments, buoyant enclosures, buoyant vessels, hollow balls, and/or hollow spheroids. Many terms, names, descriptors, and/or labels, could adequately distinguish an embodiment's buoyant portion from among its other components, features, and/or elements, and the scope of the present disclosure incorporates any naming convention and/or choice, and is not limited by the nomenclature used to describe an embodiment or its parts.

Referring now to FIG. 1, a schematic illustration of a thermal and electrical battery 100 is shown, in accordance with an embodiment. As used herein a "thermal and electrical battery" may sometimes be referred to as a "battery" for simplicity. In an embodiment, the battery 100 may include a thermal branch and an electrical branch. The thermal branch may comprise a reaction pipe 127 that is used to heat one or more devices 122. The electrical branch may comprise a fuel cell 115 that is used to power one or more electrical loads 113. In an embodiment, potential energy for the battery 100 is stored in the form of gasses in a first tank 104 and a second tank 107. The tanks 104 and 107 may also be referred to as chambers, or any other suitable structure for storing gasses.

In an embodiment, the potential energy may be provided by having two gasses that are reactive with each other, and which can be used to operate the fuel cell 115. The first tank 104 may house an oxidant 105, and the second tank 107 may house a fuel 108. Precursor 106 (in the form of a liquid) may be provided in the first tank 104, and precursor fluid 109 may also be present in the second tank 107. In an embodiment, the oxidant 105 may comprise oxygen ($O_2$) or chlorine gas ($Cl_2$). The fuel 108 may comprise hydrogen ($H_2$), methanol, or any other hydrogen containing gas.

In the embodiment shown in FIG. 1, the oxidant 105 and the fuel 108 may be replenished through the use of an electrolyzer 110. The electrolyzer 110 may receive the precursor 106 as an input. For example, a pump 112 may remove precursor 106 from the first tank 104 along pipe 132 and deliver the precursor 106 to the electrolyzer 110 through pipe 133. The pump 112 may be used in order to provide sufficient bubble clearance or otherwise move the precursor 106 (and resulting gasses) through the system. In an embodiment, the electrolyzer 110 may include any type of electrolyzer system. For example, the electrolyzer 110 may include a proton exchange membrane (PEM) electrolyzer, an alkaline electrolyzer, or the like. The outputs from the electrolyzer 110 may include an oxidizing gas 105 that is delivered to the first tank 104 through pipe 134, and a fuel 108 that is delivered to the second tank 107 through pipe 135.

The electrolyzer 110 may be powered by any suitable power source (POWER). In some embodiments, the power source may be from a renewable or green energy source. For example, the power source may obtain power from wave energy, solar energy, wind energy, or the like. Though other power sources (e.g., rechargeable electric batteries, combustion of carbon-based fuel sources, or the like) may be used to power the electrolyzer 110 in some embodiments.

In a particular embodiment, the electrolyzer 110 is a hydrogen electrolyzer. When a hydrogen electrolyzer 110 is used, the precursor 106 may comprise water ($H_2O$). The water may be fresh water. The water may further be purified, filtered, deionized, and/or distilled in some embodiments. In some embodiments, the precursor 106 may be periodically replenished. Other embodiments include a closed system that regenerates the precursor 106 through the byproducts of reactions and/or processes in the battery 100. The electrolyzer may generate oxygen as the oxidizing gas 105 and hydrogen as the fuel 108. Another embodiment may use an electrolyzer 110 that uses hydrochloric acid (HCl) as the precursor 106. The oxidizing gas 105 from such a process may include chlorine gas ($Cl_2$) and the fuel 108 may include hydrogen. While hydrogen is envisioned as one type of fuel 108, other fuels comprising hydrogen (e.g., methanol, etc.) may be formed using an electrolyzer 110 (or using the electrolyzer 110 as one operation in a multi-operation chemical process to generate the fuel 108). Other suitable precursors 106, oxidizing gas 105, and fuels 108 can also be used in some embodiments.

In an embodiment, the first tank 104 and the second tank 107 may be cylindrical tanks or chambers. Though, other tank structures may also be used. Precursor 106 may reside at a bottom of the first tank 104. Some amount of precursor 109 may also be provided at a bottom of the second tank 107. In an embodiment, the first tank 104 may have a similar volume to the second tank 107. Though, the first tank 104 may also be larger (or smaller) than the second tank 107. While the first tank 104 comprises both the precursor 106 and the oxidizing gas 105, other embodiments may include a third tank (not shown) for storing the precursor 106. In such an embodiment, the first tank 104 may comprise substantially all oxidizing gas 105 (with or without residual amounts of precursor 106). In an embodiment, the first tank 104 and the second tank 107 may be pressure vessels suitable for storing gasses up to approximately 200 bar. For example, pressures within the first tank 104 and the second tank 107 may be between 50 bar and 200 bar. Though, lower pressures or higher pressures may also be accommodated by the first tank 104 and the second tank 107.

In an embodiment, the oxidizing gas 105 may exit the first tank 104 through a pipe 141. Similarly, the fuel 108 may exit the second tank 107 through a pipe 142. Branch 143 may provide a path for the oxidizing gas 105 between the pipe 141 and a fuel cell 115, and branch 144 may provide a path for the fuel 108 between the pipe 142 and the fuel cell 115. In an embodiment, a valve 116 may control a flow of the oxidizing gas 105 to the fuel cell 115, and a valve 118 may control a flow of the fuel 108 to the fuel cell 115. For example, when electrical power is needed to drive a load 113, the valves 116 and 118 can be opened to divert some (or all) of the flow of the oxidizing gas 105 and the fuel 108 into the fuel cell 115. In an embodiment, the valve 116 and the valve 118 may be independently controllable with respect to each other in order to provide a desired oxidizing gas 105 to fuel 108 ratio to the fuel cell 115. The valves 116 and 118 may be any type of valve architecture. Additionally, the valves 116 and 118 may be controlled by sensors and/or processors on board the battery 100 or remotely (e.g., through the transmission of operating signals over satellite or other communication technique). The valves 116 and 118 may also be operated manually in some embodiments.

In an embodiment, the fuel cell 115 may be any sort of fuel cell. In one embodiment, the fuel cell 115 is a PEM fuel cell. The reaction product within the fuel cell 115 may generate electricity that is used to drive a load 113 that is electrically coupled to the fuel cell 115. The load 113 may include any type of electrical component, such as, but not limited to, a sensor, a processor, a server, a communications system or component, a light, a beacon, a transponder, a battery, an electrical motor or other propulsion device, or the like. In an embodiment, a byproduct of the reaction in the fuel cell 115 may be returned to the first tank 104 through pipe 138. For example, the byproduct may be the same material as the precursor 106 (e.g., in a hydrogen fuel cell 115 that is fed oxygen and hydrogen, the byproduct is water).

In an embodiment, when thermal energy is needed, the battery 100 may be configured to allow the flow of the oxidizing gas 105 and the fuel 108 into the thermal portion of the battery 100. That is, valve 117 along pipe 141 may be opened, and valve 119 along pipe 142 may be opened. This allows for the oxidizing gas 105 and the fuel 108 to reach a thermal feed line 121. The gasses 105 and 108 mix in the thermal feed line 121 and proceed towards a reaction pipe 127. In an embodiment, the valve 117 and the valve 119 may be independently controllable with respect to each other in order to provide a desired oxidizing gas 105 to fuel 108 ratio to the thermal feed line 121. The valves 117 and 119 may be any type of valve architecture. Additionally, the valves 117 and 119 may be controlled by sensors and/or processors on board the battery 100 or remotely (e.g., through the transmission of operating signals over satellite or other communication technique). The valves 117 and 119 may also be operated manually in some embodiments.

The reaction (e.g., an exothermic reaction) between the oxidizing gas 105 and the fuel 108 can be initiated by a catalyst 125 that is provided proximate to a beginning of the reaction pipe 127. The reaction may generate a reaction byproduct (e.g., water, hydrochloric acid, etc.) and heat. In an embodiment, the reaction pipe 127 may be thermally coupled to a device 122. The device 122 may be any type of device that is desired to be heated. For example, the device 122 may comprise electrical components (e.g., sensors, computers, and/or other electronic devices) that need to be maintained above a particular temperature in order to function. The device 122 may also include mechanical structures that need to be maintained at an elevated temperature in order to prevent ice from forming or to remove ice that has formed. The device 122 may also be a structure that is desired to be heated for any reason. In one instance, the reaction pipe 127 generates heat in order to produce a thermal signal that can be used to locate the device 122 in low visibility conditions (e.g., night, cloudy conditions, foggy conditions, high wave conditions, and/or the like).

Any catalyst 125 may be used, such as one or more of an ultraviolet light, a spark plug, and/or platinum. In the case of platinum, a layer of platinum may line a portion of the walls of the reaction pipe 127. In some embodiments, the catalyst 125 may be located on a side of a peak 120 of the battery 100 opposite from the valves 117 and 119. The peak 120 may be the absolute peak of the battery 100, or the peak 120 may be a local peak 120 that prevents the flow of reaction byproduct back towards the valves 117 and 119. Instead, the liquid continues to flow down the reaction pipe 127 and into a return line 128. It is to be appreciated that locating a catalyst 125 on an opposite side of a peak 120 from the valves 117 and 119 is not typically implemented in fuel cell systems. Usually, a catalyst may be provided within one or both of the tanks holding the oxidizing gas 105 and/or the fuel 108. The catalyst is used to consume any gas crossover between the tanks in order to prevent large volumes of both the oxidizing gas 105 and the fuel 108 being within a single tank. If this were to happen, an explosion or other energetic reaction may take place (undesirably) within a tank. While not shown in FIG. 1, some embodiments of the battery 100 may also include a catalyst 125 in one or both of the first tank 104 and the second tank 107 for this purpose in addition to the catalyst 125 on the opposite side of peak 120 in the reaction pipe 127.

In an embodiment, the end of the reaction pipe 127 may be fluidically coupled to a return line 128 (or return pipe 128). The return line 128 may connect back to the first tank 104. As such, the reaction byproduct may replenish the precursor 106. In this manner, the battery 100 the precursor 106 does not need to be resupplied ever (or as often). Such a battery 100 may be considered as being a closed system where the reacting species (i.e., the precursor 106, the oxidizing gas 105, and the fuel 108 are maintained within the battery 100). The energy to charge the battery 100 (to provide electricity to power the load 113 and/or to provide thermal energy to heat the device 122) may be provided by the POWER input to the electrolyzer 110, as described above.

In an embodiment, a condenser 123 may be provided along the return line 128. The condenser 123 may condense any residual product (e.g., steam) from the reaction in the reaction pipe 127 into a fluid (e.g., precursor 106). The condenser 123 may be a portion of pipe that includes a high surface area with an ambient environment in order to rapidly cool and condense steam or gas back into the precursor 106. In the case of a water craft coupled to the battery 100, the condenser 123 may be provided below a surface of the water in order to aid in the condensation of the residual product.

Figure 2:
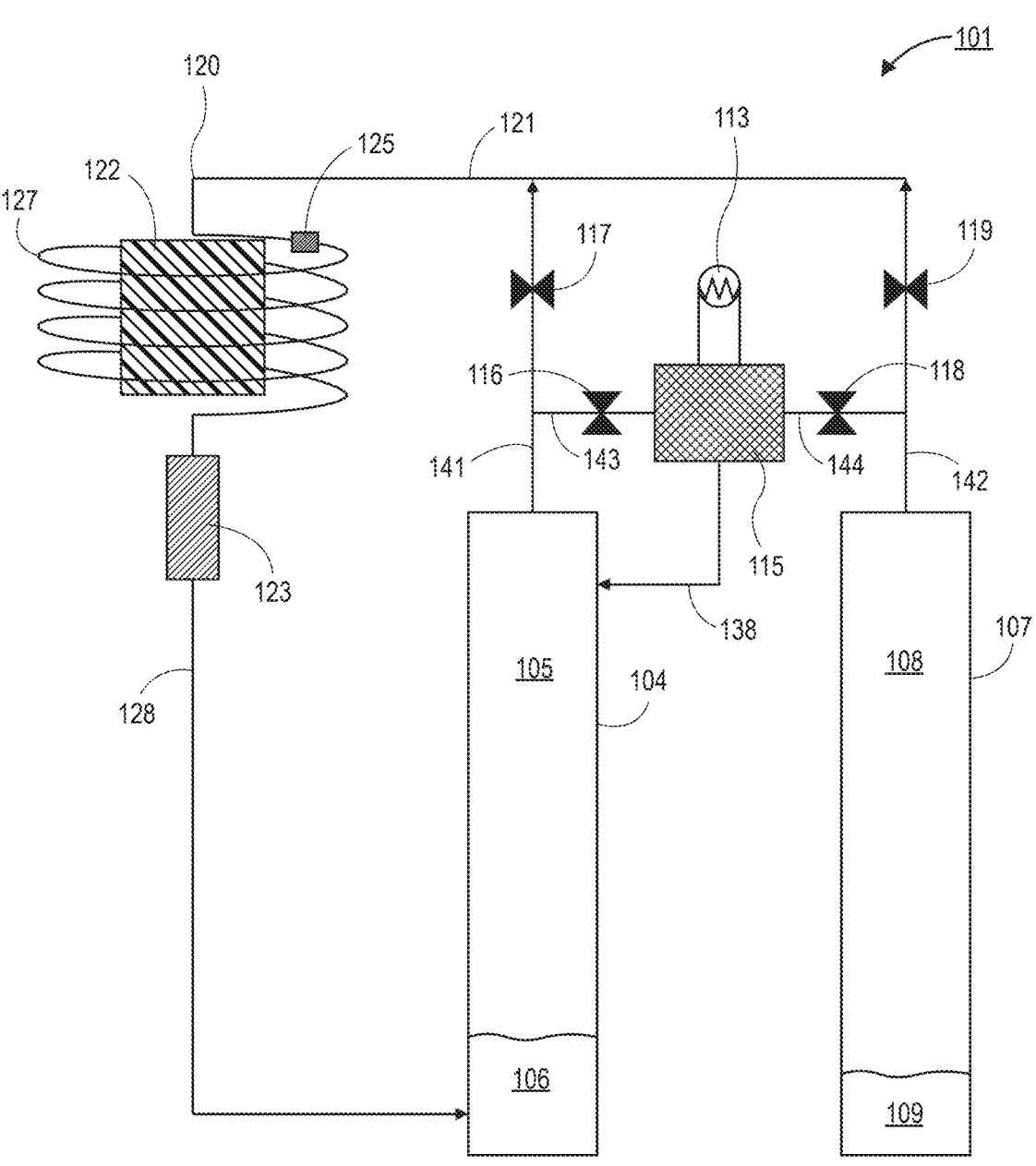
FIG. 2 is a schematic illustration of a thermal and electrical battery with a fuel cell, in accordance with an embodiment.

Referring now to FIG. 2, a schematic illustration of a battery 101 in accordance with another embodiment is shown. The battery 101 may be similar to the battery 100, with the exception of the omission of the electrolyzer 110. In such an embodiment, the battery 101 does not regenerate the oxidizing gas 105 or the fuel 108. As such, the oxidizing gas 105 and the fuel 108 may be replenished at various intervals. Additionally, residual liquid (e.g., precursor 106) that returns to the first tank 104 (and any liquid precursor 109 in the second tank 107) may also be removed from the first tank 104 and/or the second tank 107 at periodic intervals. Embodiments with such a configuration do not require a power input in order to power the electrolyzer 110. As such, batteries 101 may be suitable for systems that lack energy generation capability. For example, the battery 101 may be coupled to a buoy that is floating at sea without any wave energy capture functionality, solar panels, wind turbines, or the like.

In the illustrated embodiment, the return line 128 from the reaction pipe 127 and the pipe 138 from the fuel cell 115 are fluidically coupled back to the first tank 104. This provides a storage location for reacted byproducts. In other embodiments, the reacted byproducts may be sent to a third tank (not shown) instead. Storing the reacted byproducts may be beneficial for some reasons. For one, it may not be desirable to release byproducts into the environment. For example, when the oxidizing gas 105 is Cl$_2$ and the fuel 108 is hydrogen, the reacted byproducts may include hydrochloric acid. In some instances, it may not be desirable to release such an acid into the environment. Also, the reacted byproduct may have value as a chemical that can be offloaded from the battery 101 and monetized and/or used for other productive purposes.

Figure 3:
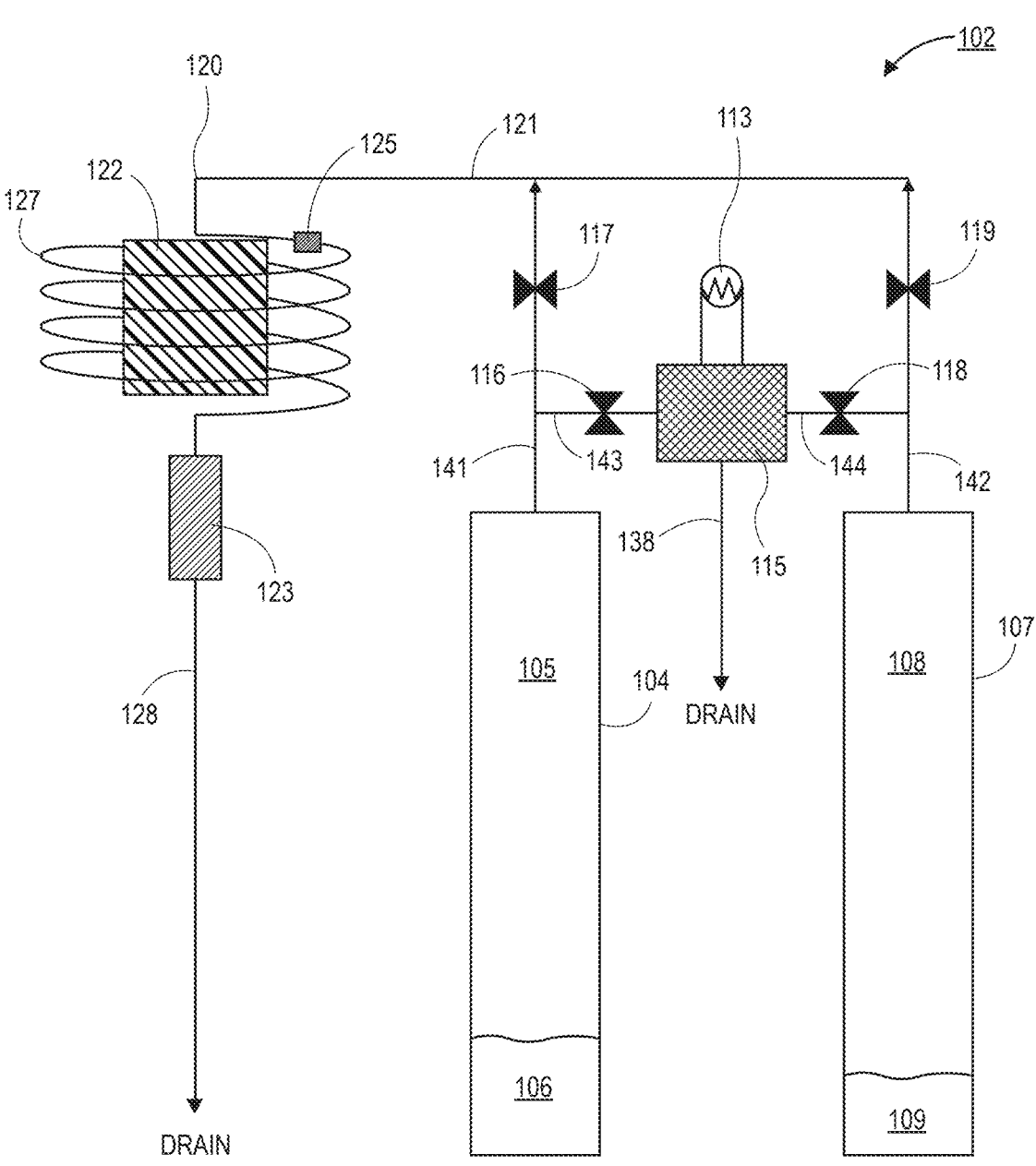
FIG. 3 is a schematic illustration of a thermal and electrical battery that drains to the external environment, in accordance with an embodiment.

Referring now to FIG. 3, a schematic illustration of a battery 102 in accordance with another embodiment is shown. The battery 102 in FIG. 3 is similar to the battery 101 in FIG. 2 with the exception of the return line 128 from the reaction pipe 127 and the return pipe 138 from the fuel cell 115. Instead of being fluidically coupled back to a tank (e.g., the first tank 104), the return pipe 138 and the fuel cell 115 empty to the environment (e.g., DRAIN). Such an embodiment may be beneficial when the reacted byproduct is non-toxic and/or otherwise has limited value for future use. For example, in the case of oxygen as the oxidizing gas 105 and hydrogen as the fuel 108, the reacted byproduct may comprise water (H$_2$O). In such instances, the water may be released safely into the environment (e.g., into a body of water).

Figure 4:
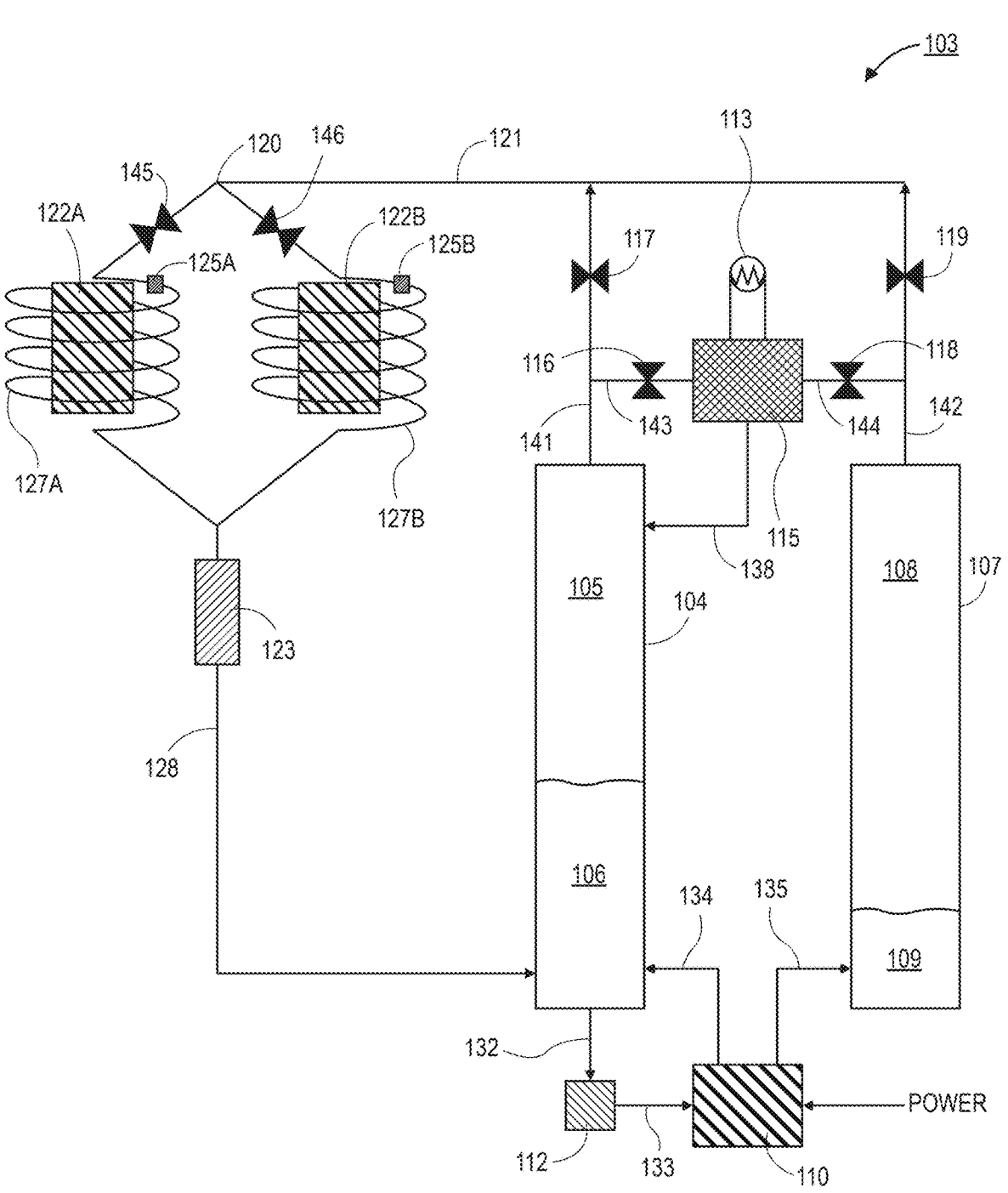
FIG. 4 is a schematic illustration of a thermal and electrical battery with an electrolyzer, a fuel cell, and a branched reaction pipe, in accordance with an embodiment.

Referring now to FIG. 4, a schematic illustration of a battery 103 in accordance with an additional embodiment is shown. In an embodiment, the battery 103 may be similar to the battery 100 in FIG. 1, with the exception of there being a plurality of reaction pipes 127. For example, a pair of reaction pipes 127A and 127B are shown in FIG. 4. The multiple reaction pipes 127 may be provided in fluidic parallel. That is, the reaction pipes 127A and 127B may be provided along fluidic paths between the same input (e.g., peak 120) and the same output (e.g., return line 128, the first tank 104, or the environment (in the case of a drain similar to what is shown in FIG. 3).

The use of two or more reaction pipes 127 allows for multiple devices 122A and 122B to be heated by the battery 103. The devices 122A and 122B may be completely separate systems, or the devices 122A and 122B may be different components within a single system. In an embodiment, valves 145 and 146 may be used to control the heating power delivered to each reaction pipe 127A and 127B, respectively. The valves 145 and 146 may be operated independently of each other. Any suitable valve type may be used for valves 145 and 146. Additionally, the valves 145 and 146 may be controlled by sensors and/or processors on board the battery 103 or remotely (e.g., through the transmission of operating signals over satellite or other communication technique). The valves 145 and 146 may be operated manually in some embodiments. In the illustrated embodiment, each reaction pipe 127 includes an independent catalyst 125A or 125B. Other embodiments may include a single catalyst 125 that is downstream of the peak 120, but located before a branch to each individual reaction pipe 127.

Figure 5:
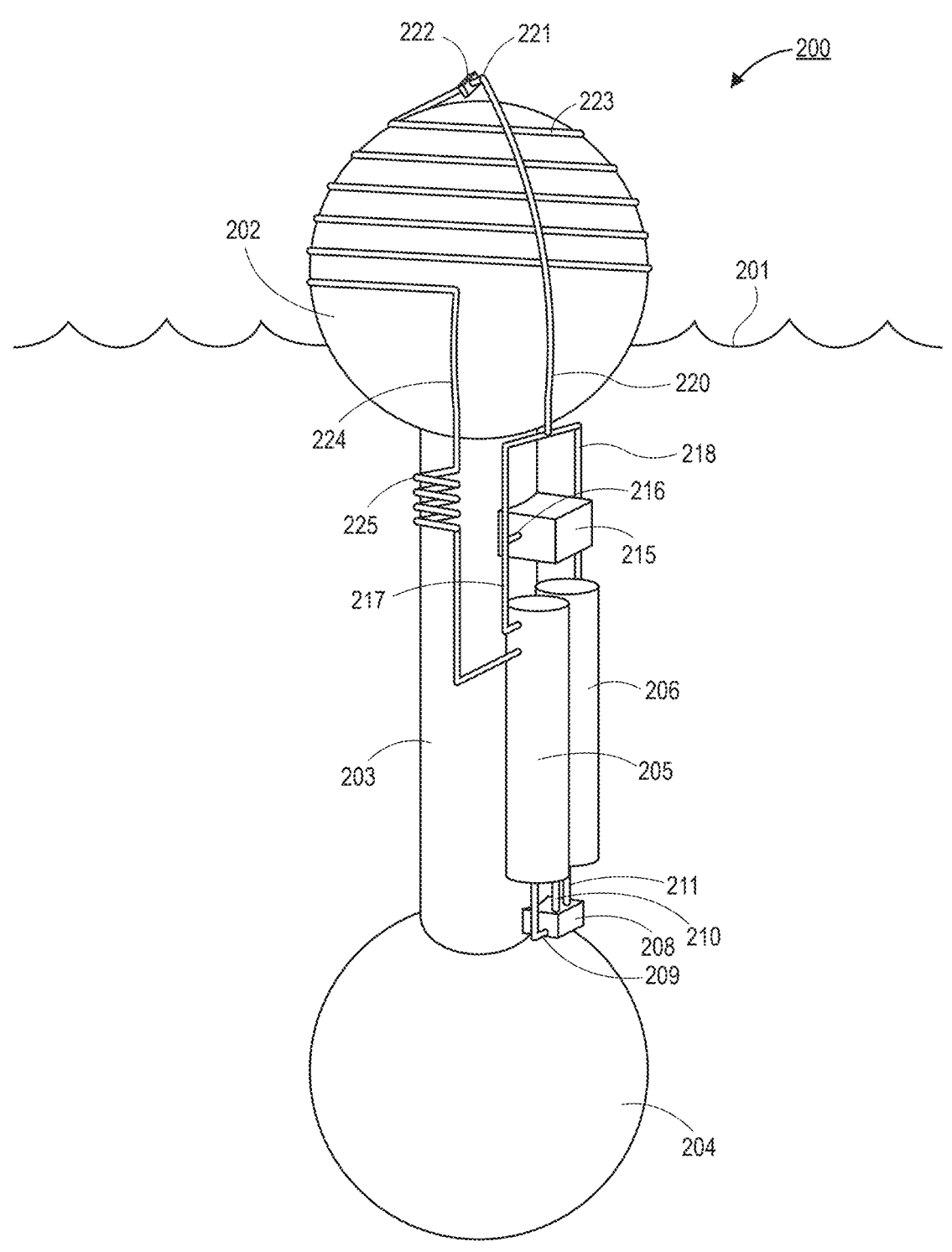
FIG. 5 is a side perspective view of a vessel with a thermal and electrical battery with an electrolyzer and a fuel cell, in accordance with an embodiment.

Referring now to FIG. 5, a side perspective view of a wave energy converter (WEC) 200 is shown, in accordance with an embodiment. The WEC 200 may float on a body of water 201. For example, an upper buoyant chamber 202 may be provided along a surface of the body of water 201. The upper buoyant chamber 202 may be coupled to a tube 203 that extends down from the upper buoyant chamber 202 into the body of water 201. The tube 203 has an opening at the bottom to allow water to enter the tube 203. A lower buoyant chamber 204 may be provided at a lower end of the tube 203. The tube 203 may pass through the lower buoyant chamber 204 in some embodiments. In other embodiments, the lower buoyant chamber 204 may be omitted.

The WEC 200 may include buoyant chambers 202 and/or 204 with diameters that are approximately 20 meters or smaller, approximately, 10 meters or smaller, or approximately 1 meter or smaller. Though, larger diameters may also be used. A length of the tube 203 may be approximately 100 meters or less, approximately 50 meters or less, approximately 20 meters or less, or approximately 1 meter or less. Though, larger lengths may also be used in some embodiments. More generally, a length of the tube 203 may be related to a diameter of the buoyant chambers 202 or 204 by a ratio of (tube length:chamber diameter) that is 3:1 or greater, 5:1 or greater, or 10:1 or greater. Though, smaller ratios may also be used in some embodiments. The buoyant chambers 202 and/or 204 may be are spherical, spheroidal, or spherical segments. However, in other instances the buoyant chambers 202 and/or 204 may comprise different geometries, such as cuboidal, pyramidal, conical, frusto-conical, or any other three-dimensional chamber.

During oscillation (i.e., rising and falling) of the WEC 200 in response to waves passing through and/or over the body of water 201, water in the tube 203 may be injected into the upper buoyant chamber 202. As will be described in greater detail below, the oscillation of the WEC 200 may generate pressure differences within the WEC 200 (or between the interior of the WEC 200 and the external environment) that drive water (or other fluid) through a turbine (not visible in FIG. 5) or the like. The turbine can be coupled to a generator (not visible in FIG. 5) that converts rotational energy into electrical power. In some embodiments, the electrical power is used to provide a power input to a thermal and electrical battery that is coupled to the WEC 200.

In an embodiment, the thermal and electrical battery (or just "battery" for simplicity) may be similar to any of the batteries described in greater detail herein. For example, a battery similar to one or more of batteries 100, 101, 102, and/or 103 described with respect to FIGS. 1-4 may be coupled to the WEC 200. In the particular embodiment shown in FIG. 5, the battery coupled to the WEC 200 is most similar to the battery 100 of FIG. 1. As such, the battery comprises an electrolyzer 208 that is fluidically coupled to a first tank 205 and a second tank 206. For example, a pipe 209 may fluidically couple the first tank 205 to the electrolyzer 208 in order to deliver a precursor (that is stored in the first tank 205, but not visible) to the electrolyzer 208. The electrolyzer 208 may generate an oxidizing gas (not shown) and a fuel (not shown). The oxidizing gas may be sent to the first tank 205 through pipe 210, and the fuel may be sent to the second tank 206 through pipe 211. The electrolyzer 208 may be powered by the electrical power generated by the WEC 200 in response to wave motion on the body of water 201.

In an embodiment, the first tank 205 and the second tank 206 may be fluidically coupled to a fuel cell 215. For example, pipe 217 extends out of the first tank 205 and a branch 216 from the pipe 217 delivers oxidizing gas to the fuel cell 215. Fuel in the second tank 206 is fluidically coupled to the fuel cell 215 by pipe 218 and a branch 219 (not visible in FIG. 5). Valves and/or other coupling components are omitted from FIG. 5 for simplicity. Though valve structures similar to those described above may be used to control the flow of gasses to the fuel cell 215. The fuel cell 215 may be used to generate electrical current that is used to power an electrical load (not shown) that is provided on the WEC 200. In an embodiment, reaction byproducts from the fuel cell 215 may be routed back to the first tank 205 by a return pipe (not shown).

When thermal power is desired, the oxidizing gas and the fuel is allowed to flow up the pipes 217 and 218 to a thermal feed line 220. The thermal feed line 220 allows for the oxidizing gas and the fuel to flow to a peak 221 of the battery. As shown in FIG. 5, the peak 221 is at the top of the WEC 200. Though, the peak 221 does not need to be an absolute peak or apex of the system. For example, the peak 221 may be any structure or feature that prevents the flow of liquid reaction byproduct back down the thermal feed line 220. A catalyst 222 (e.g., ultraviolet light, spark plug, platinum, etc.) may be provided on the opposite side of the peak 221. The catalyst 222 initiates an exothermic reaction between the oxidizing gas and the fuel in order to generate heat within the reaction pipe 223.

In the illustrated embodiment, the reaction pipe 223 is a spiral that wraps around a perimeter of the upper buoyant chamber 202. Though, the reaction pipe 223 may take any structural form, and/or be provided over, on, and/or otherwise thermally coupled to any one or more components, systems, devices, or structures of the WEC 200. In an embodiment, the reacted byproduct (e.g., water, hydrochloric acid, etc.) flows through the reaction pipe 223 and enters a return line 224. The return line 224 may be fluidically coupled to the first tank 205 in order to provide a closed system. In some embodiments, the return line 224 may comprise a condenser 225 to further convert any remaining steam or gas into a fluid. The condenser 225 may be submerged (at least some of the time) in some embodiments. This may improve the condensation process since thermal transfer away from the condenser 225 is enhanced by the surrounding water.

As used herein, "fluidically coupled" may refer to two components that are configured to allow for the transfer of one or more fluids (e.g., gas and/or liquid) between the two components. For example, a first chamber may be fluidically coupled to a second chamber, when a gas from the first chamber is capable of flowing (either actively (e.g., through pumping) or passively (e.g., through pressure differentials)) from the first chamber to the second chamber and/or from the second chamber to the first chamber. Fluidically coupled components may be directly connected to each other. That is, there may not be any intervening components between the first component and the second component. In other instances, one or more additional intervening components (e.g., pipes, valves, chambers, reactors, etc.) may be provided between the first component and the second component so long as the one or more fluids are capable of being transferred between the first chamber and the second chamber along a path that includes the one or more intervening components. Additionally, while "components" may be fluidically coupled with each other, the concept of fluidic coupling is not limited to structures such as chambers, containers, and the like. That is, a first volume of a liquid or gas may be fluidically coupled to a second volume of a liquid or gas even if one or both of the first volume and the second volume are not confined by any specific structure. For example, a volume of fluid within a WEC may be fluidically coupled to the body of water surrounding the WEC through a pipe, tube, port, opening or other passage through a surface of the WEC.

FIG. 6 shows a side view of the same WEC 200 that is illustrated in FIG. 5.

FIG. 7 shows a side view of the same WEC 200 that is illustrated in FIG. 5 and FIG. 6. The view shown in FIG. 7 further illustrates the branch 219 from the pipe 218 to the fuel cell 215.

FIG. 8 shows a side view of the same WEC 200 that is illustrated in FIGS. 5-7.

FIG. 9 shows a side view of the same WEC 200 that is illustrated in FIGS. 5-8.

Figure 10:
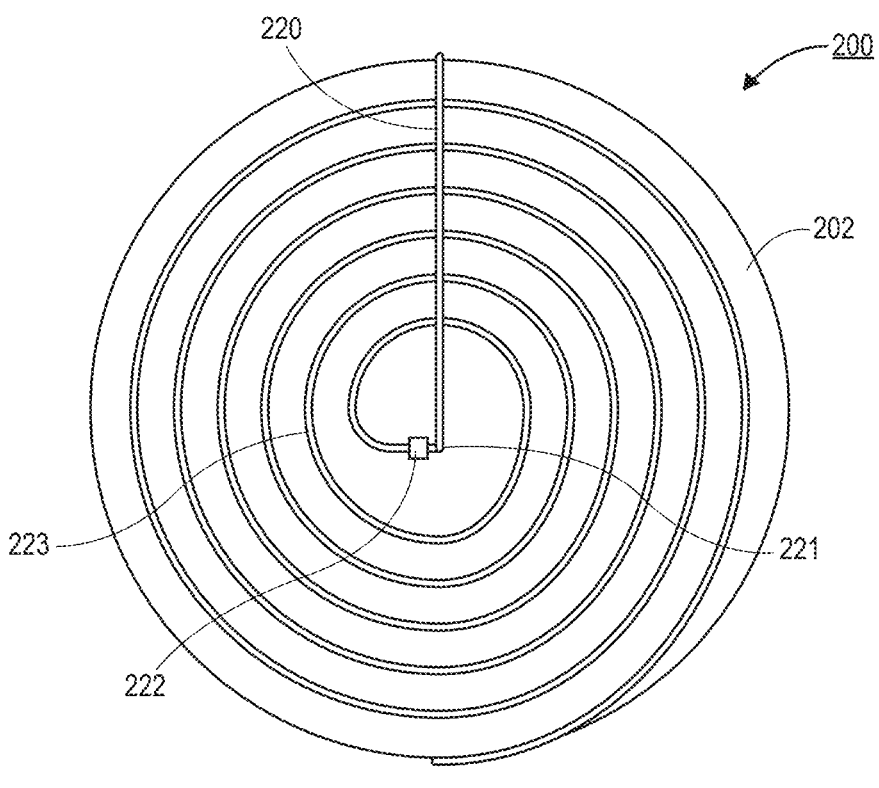
FIG. 10 is a top-down view of the vessel in FIG. 5, in accordance with an embodiment.

FIG. 10 shows a top-down view of the same WEC 200 that is illustrated in FIGS. 5-9.

Figure 11:
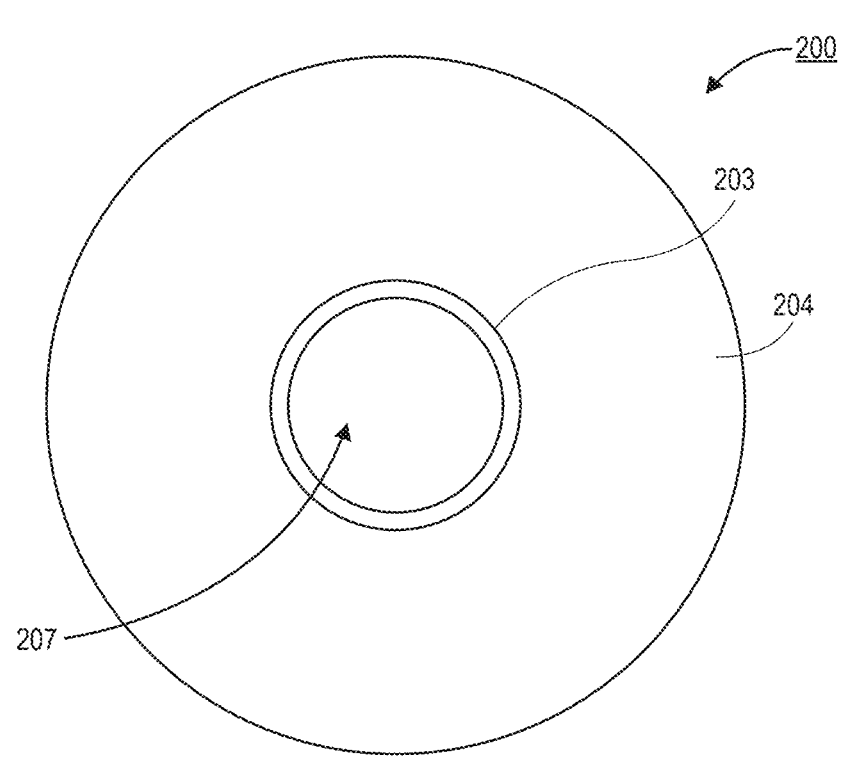
FIG. 11 is a bottom-up view of the vessel in FIG. 5, in accordance with an embodiment.

FIG. 11 shows a bottom-up view of the same WEC 200 that is illustrated in FIGS. 5-10. As shown in FIG. 11, the tube 203 passes through the lower buoyant chamber 204 and includes an opening 207 that is fluidically coupled to the surrounding body of water 201.

Figure 12:
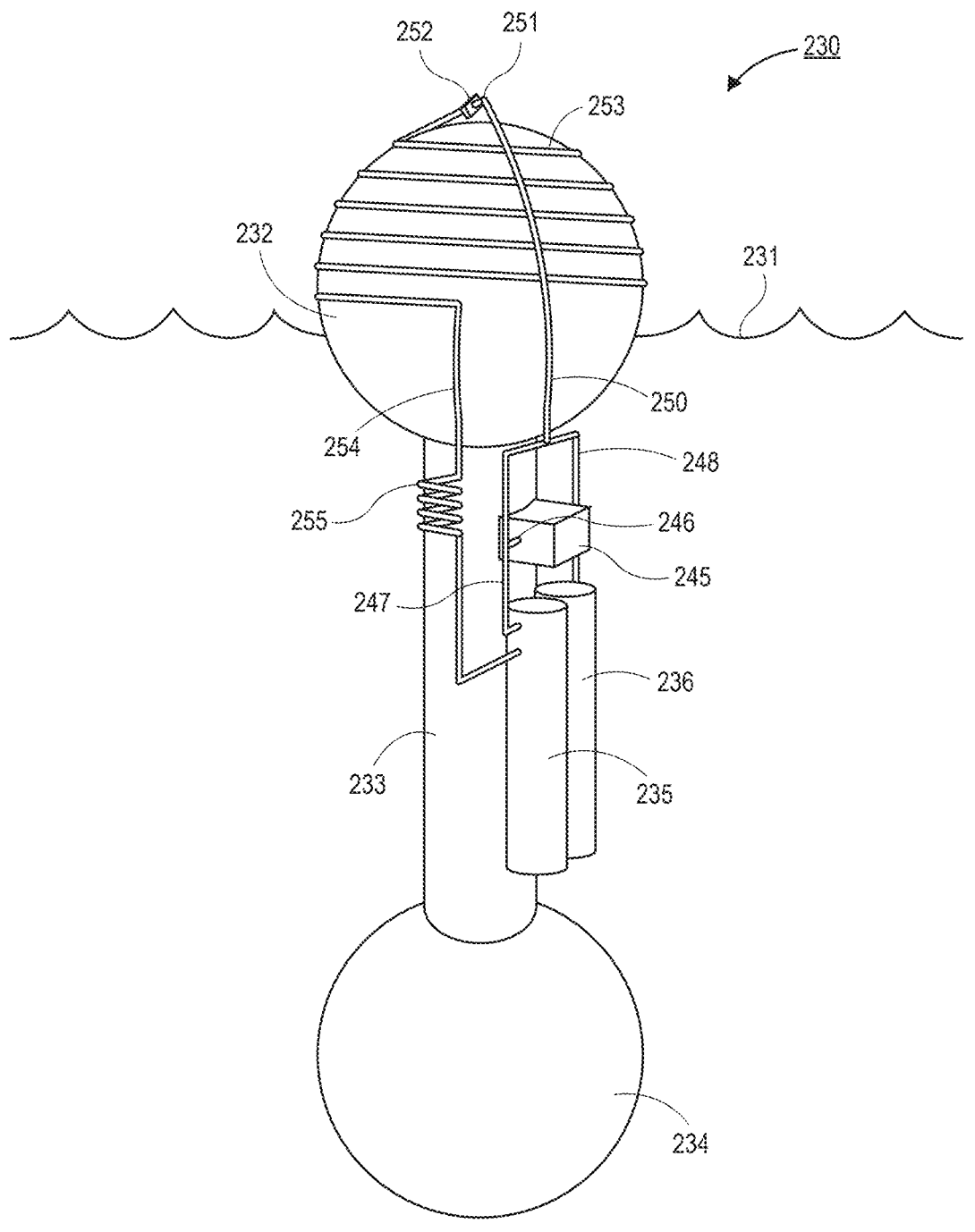
FIG. 12 is a side perspective view of a vessel with a thermal and electrical battery with a fuel cell, in accordance with an embodiment.

Referring now to FIG. 12, a side perspective view of a WEC 230 is shown, in accordance with an embodiment. The WEC 230 may float on a body of water 231. For example, an upper buoyant chamber 232 may be provided along a surface of the body of water 231. The upper buoyant chamber 232 may be coupled to a tube 233 that extends down from the upper buoyant chamber 232 into the body of water 231. The tube 233 has an opening at the bottom to allow water to enter the tube 233. A lower buoyant chamber 234 may be provided at a lower end of the tube 233. The tube 233 may pass through the lower buoyant chamber 234 in some embodiments. In other embodiments, the lower buoyant chamber 234 may be omitted. The WEC 230 may include buoyant chambers 232 and/or 234 with dimensions and/or shapes that are similar to those described above with respect to WEC 200. Similarly the tube 233 may be similar in dimension and/or shape to the tube 203 described above with respect to WEC 200.

During oscillation (i.e., rising and falling) of the WEC 230 in response to waves passing through and/or over the body of water 231, water in the tube 233 may be injected into the upper buoyant chamber 232. As will be described in greater detail below, the oscillation of the WEC 230 may generate pressure differences within the WEC 230 (or between the interior of the WEC 230 and the external environment) that drive water (or other fluid) through a turbine (not visible in FIG. 12) or the like. The turbine can be coupled to a generator (not visible in FIG. 12) that converts rotational energy into electrical power. In some embodiments, the electrical power is used to provide a power input to a thermal and electrical battery that is coupled to the WEC 230.

In an embodiment, the battery may be similar to any of the batteries described in greater detail herein. For example, a battery similar to one or more of batteries 100, 101, 102, and/or 103 described with respect to FIGS. 1-4 may be coupled to the WEC 230. In the particular embodiment shown in FIG. 12, the battery coupled to the WEC 230 is most similar to the battery 101 of FIG. 2. In an embodiment, the a first tank 235 (with an oxidizing gas) and a second tank 236 (with a fuel) may be fluidically coupled to a fuel cell 245. For example, pipe 247 extends out of the first tank 235 and a branch 246 from the pipe 247 delivers oxidizing gas to the fuel cell 245. Fuel in the second tank 236 is fluidically coupled to the fuel cell 245 by pipe 248 and a branch 249 (not visible in FIG. 12). Valves and/or other coupling components are omitted from FIG. 12 for simplicity. Though valve structures similar to those described above may be used to control the flow of gasses to the fuel cell 245. The fuel cell 245 may be used to generate electrical current that is used to power an electrical load (not shown) that is provided on the WEC 230. In an embodiment, reaction byproducts from the fuel cell 245 may be routed back to the first tank 235 by a return pipe (not shown).

When thermal power is desired, the oxidizing gas and the fuel is allowed to flow up the pipes 247 and 248 to a thermal feed line 250. The thermal feed line 250 allows for the oxidizing gas and the fuel to flow to a peak 251 of the battery. As shown in FIG. 12, the peak 251 is at the top of the WEC 230. Though, the peak 251 does not need to be an absolute peak or apex of the system. For example, the peak 251 may be any structure or feature that prevents the flow of liquid reaction byproduct back down the thermal feed line 250. A catalyst 252 (e.g., ultraviolet light, spark plug, platinum, etc.) may be provided on the opposite side of the peak 251. The catalyst 252 initiates an exothermic reaction between the oxidizing gas and the fuel in order to generate heat within the reaction pipe 253.

In the illustrated embodiment, the reaction pipe 253 is a spiral that wraps around a perimeter of the upper buoyant chamber 232. Though, the reaction pipe 253 may take any structural form, and/or be provided over, on, and/or otherwise thermally coupled to any one or more components, systems, devices, or structures of the WEC 230. In an embodiment, the reacted byproduct (e.g., water, hydrochloric acid, etc.) flows through the reaction pipe 253 and enters a return line 254. The return line 254 may be fluidically coupled to the first tank 235 in order to provide a closed system. In some embodiments, the return line 254 may comprise a condenser 255 to further convert any remaining steam or gas into a fluid. The condenser 255 may be submerged (at least some of the time) in some embodiments. This may improve the condensation process since thermal transfer away from the condenser 255 is enhanced by the surrounding water.

FIG. 13 shows a side view of the same WEC 230 that is illustrated in FIG. 12.

FIG. 14 shows a side view of the same WEC 230 that is illustrated in FIG. 12 and FIG. 13. The view shown in FIG. 14 further illustrates the branch 249 from the pipe 248 to the fuel cell 245.

FIG. 15 shows a side view of the same WEC 230 that is illustrated in FIGS. 12-14.

FIG. 16 shows a side view of the same WEC 230 that is illustrated in FIGS. 12-15.

Figure 17:
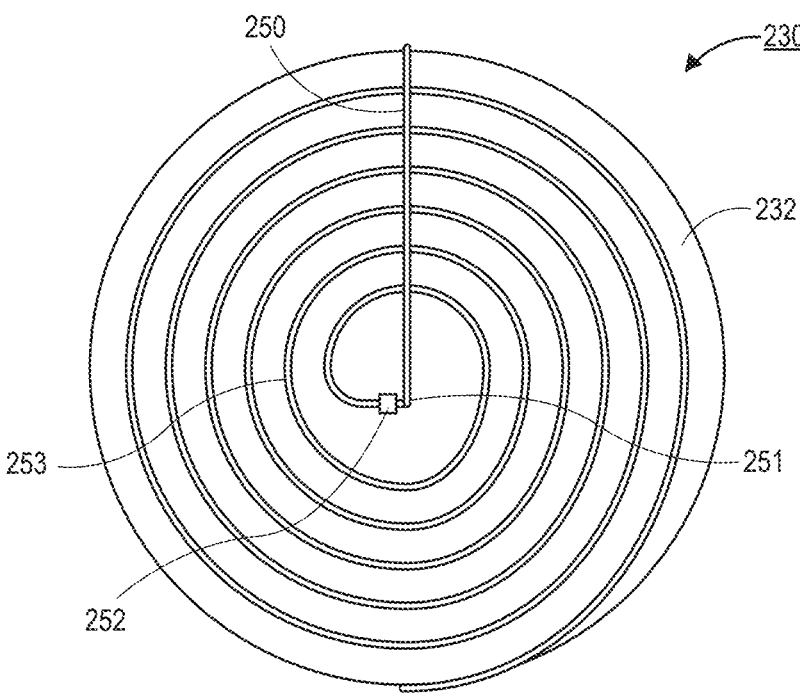
FIG. 17 is a top-down view of the vessel in FIG. 12, in accordance with an embodiment.

FIG. 17 shows a top-down view of the same WEC 230 that is illustrated in FIGS. 12-16.

Figure 18:
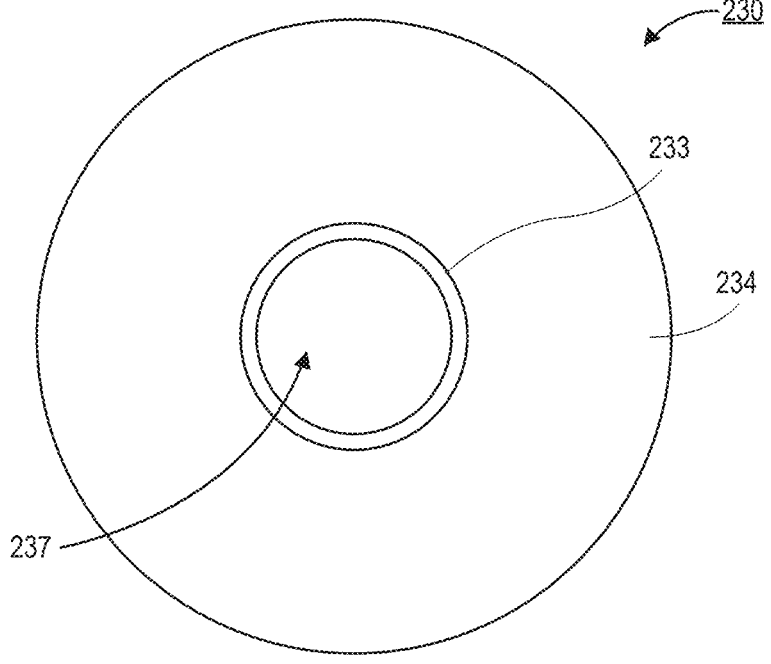
FIG. 18 is a bottom-up view of the vessel in FIG. 12, in accordance with an embodiment.

FIG. 18 shows a bottom-up view of the same WEC 230 that is illustrated in FIGS. 12-17. As shown in FIG. 18, the tube 263 passes through the lower buoyant chamber 264 and includes an opening 237 that is fluidically coupled to the surrounding body of water 261.

Figure 19:
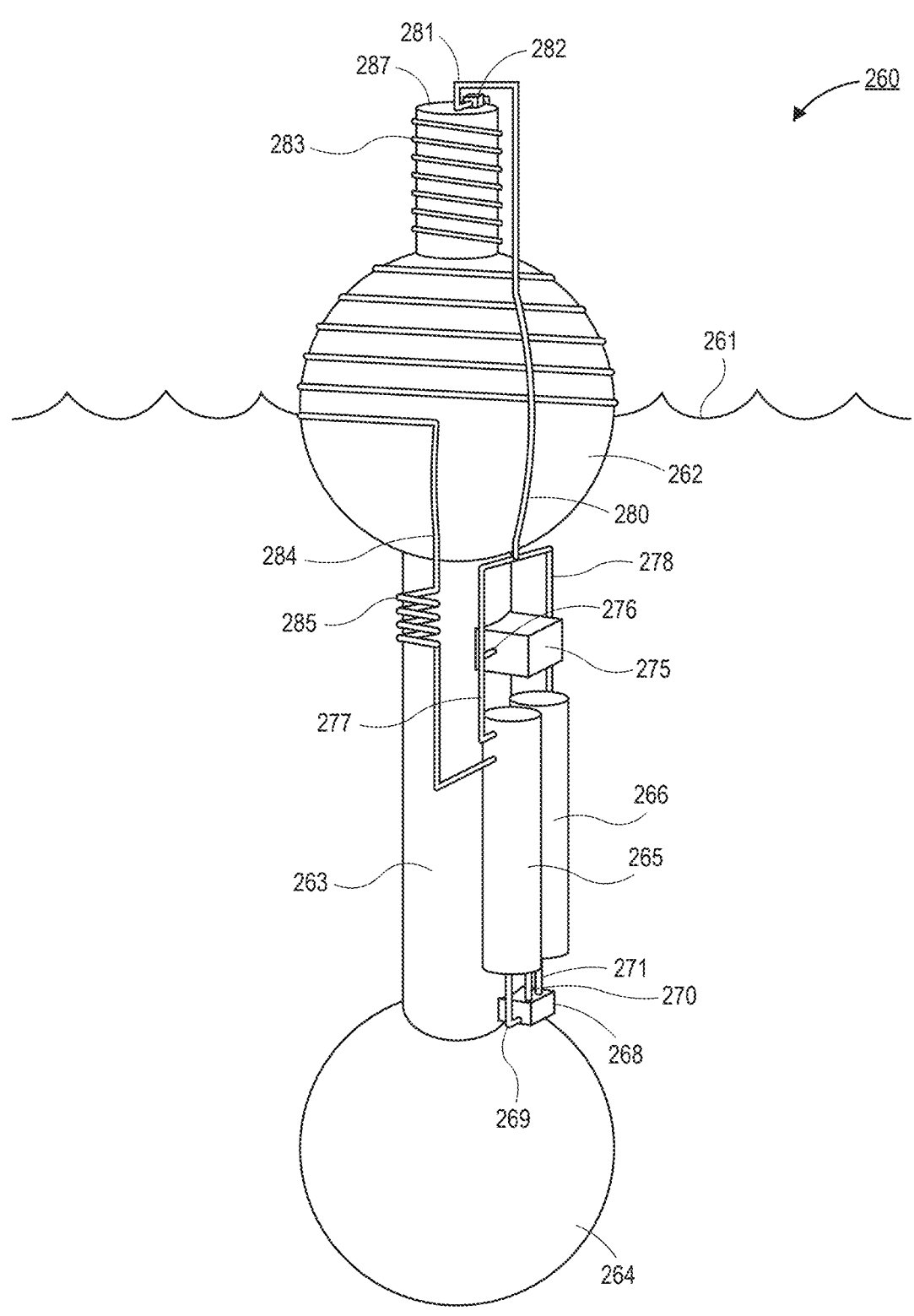
FIG. 19 is a side perspective view of a vessel with a thermal and electrical battery with a fuel cell, in accordance with an embodiment.

Referring now to FIG. 19, a side perspective view of a WEC 260 is shown, in accordance with an embodiment. The WEC 260 may float on a body of water 261. For example, an upper buoyant chamber 262 may be provided along a surface of the body of water 261. The upper buoyant chamber 262 may be coupled to a tube 263 that extends down from the upper buoyant chamber 262 into the body of water 261. The tube 263 has an opening at the bottom to allow water to enter the tube 263. A lower buoyant chamber 264 may be provided at a lower end of the tube 263. The tube 263 may pass through the lower buoyant chamber 264 in some embodiments. In other embodiments, the lower buoyant chamber 264 may be omitted. The WEC 260 may include buoyant chambers 262 and/or 264 with dimensions and/or shapes that are similar to those described above with respect to WEC 200. Similarly the tube 263 may be similar in dimension and/or shape to the tube 203 described above with respect to WEC 200.

In some embodiments, a mast 287 or other protruding structure may extend up from the top of the WEC 260. That is, the mast 287 may extend up from an upper surface of the upper buoyant chamber 262. The mast 287 may house some (or all) of the electrical components that are to be warmed. Grouping the electrical components within the mast 287 may allow for more efficient temperature control compared to if they were spread about the WEC 260. The mast 287 may also be used for location or position identification purposes when coupled with a thermal and electrical battery, such as those described in greater detail herein.

During oscillation (i.e., rising and falling) of the WEC 260 in response to waves passing through and/or over the body of water 261, water in the tube 263 may be injected into the upper buoyant chamber 262. As will be described in greater detail below, the oscillation of the WEC 260 may generate pressure differences within the WEC 260 (or between the interior of the WEC 260 and the external environment) that drive water (or other fluid) through a turbine (not visible in FIG. 19) or the like. The turbine can be coupled to a generator (not visible in FIG. 19) that converts rotational energy into electrical power. In some embodiments, the electrical power is used to provide a power input to a thermal and electrical battery that is coupled to the WEC 260.

In an embodiment, the battery may be similar to any of the batteries described in greater detail herein. For example, a battery similar to one or more of batteries 100, 101, 102, and/or 103 described with respect to FIGS. 1-4 may be coupled to the WEC 260. In the particular embodiment shown in FIG. 19, the battery coupled to the WEC 260 is most similar to the battery 100 of FIG. 1. As such, the battery comprises an electrolyzer 268 that is fluidically coupled to a first tank 265 and a second tank 266. For example, a pipe 269 may fluidically couple the first tank 265 to the electrolyzer 268 in order to deliver a precursor (that is stored in the first tank 265, but not visible) to the electrolyzer 268. The electrolyzer 268 may generate an oxidizing gas (not shown) and a fuel (not shown). The oxidizing gas may be sent to the first tank 265 through pipe 270, and the fuel may be sent to the second tank 266 through pipe 271. The electrolyzer 268 may be powered by the electrical power generated by the WEC 260 in response to wave motion on the body of water 261.

In an embodiment, the first tank 265 and the second tank 266 may be fluidically coupled to a fuel cell 275. For example, pipe 277 extends out of the first tank 265 and a branch 276 from the pipe 277 delivers oxidizing gas to the fuel cell 275. Fuel in the second tank 266 is fluidically coupled to the fuel cell 275 by pipe 278 and a branch 279 (not visible in FIG. 19). Valves and/or other coupling components are omitted from FIG. 19 for simplicity. Though valve structures similar to those described above may be used to control the flow of gasses to the fuel cell 275. The fuel cell 275 may be used to generate electrical current that is used to power an electrical load (not shown) that is provided on the WEC 260. In an embodiment, reaction byproducts from the fuel cell 275 may be routed back to the first tank 265 by a return pipe (not shown).

When thermal power is desired, the oxidizing gas and the fuel is allowed to flow up the pipes 277 and 278 to a thermal feed line 280. The thermal feed line 280 allows for the oxidizing gas and the fuel to flow to a peak 281 of the battery. As shown in FIG. 19, the peak 281 is at the top of the WEC 260 (i.e., at the top of the mast 287). Though, the peak 281 does not need to be an absolute peak or apex of the system. For example, the peak 281 may be any structure or feature that prevents the flow of liquid reaction byproduct back down the thermal feed line 280. A catalyst 282 (e.g., ultraviolet light, spark plug, platinum, etc.) may be provided on the opposite side of the peak 281. The catalyst 282 initiates an exothermic reaction between the oxidizing gas and the fuel in order to generate heat within the reaction pipe 283.

In the illustrated embodiment, the reaction pipe 283 is a spiral that wraps around a perimeter of the mast 287 and/or a perimeter of the upper buoyant chamber 262. Providing thermal energy to the mast 287 may make it easier to locate the WEC 260 in a low visibility environment. For example, the mast 287 may remain above the surface of the body of water 261, even during high wave conditions. As such, a persistent thermal signature may be provided when visibility is low. In an embodiment, the reaction pipe 283 may take any structural form, and/or be provided over, on, and/or otherwise thermally coupled to any one or more components, systems, devices, or structures of the WEC 260.

In an embodiment, the reacted byproduct (e.g., water, hydrochloric acid, etc.) flows through the reaction pipe 283 and enters a return line 284. The return line 284 may be fluidically coupled to the first tank 265 in order to provide a closed system. In some embodiments, the return line 284 may comprise a condenser 285 to further convert any remaining steam or gas into a fluid. The condenser 285 may be submerged (at least some of the time) in some embodiments. This may improve the condensation process since thermal transfer away from the condenser 285 is enhanced by the surrounding water.

FIG. 20 shows a side view of the same WEC 260 that is illustrated in FIG. 19.

FIG. 21 shows a side view of the same WEC 260 that is illustrated in FIG. 19 and FIG. 20. The view shown in FIG. 14 further illustrates the branch 279 from the pipe 278 to the fuel cell 275.

FIG. 22 shows a side view of the same WEC 260 that is illustrated in FIGS. 19-21.

FIG. 23 shows a side view of the same WEC 260 that is illustrated in FIGS. 19-22.

Figure 24:
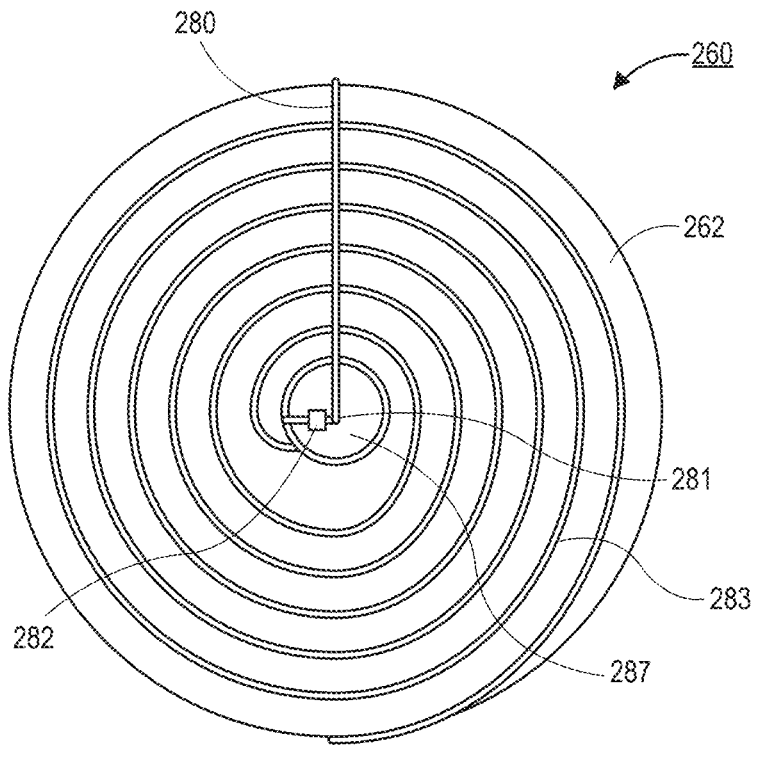
FIG. 24 is a top-down view of the vessel in FIG. 19, in accordance with an embodiment.

FIG. 24 shows a top-down view of the same WEC 260 that is illustrated in FIGS. 19-23.

Figure 25:
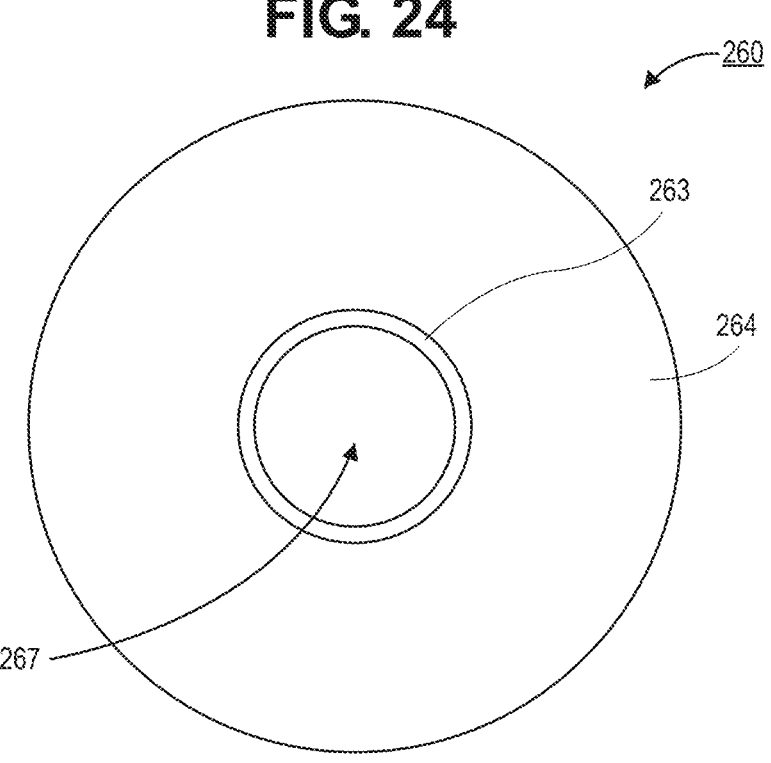
FIG. 25 is a bottom-up view of the vessel in FIG. 19, in accordance with an embodiment.

FIG. 25 shows a bottom-up view of the same WEC 260 that is illustrated in FIGS. 19-24. As shown in FIG. 25, the tube 263 passes through the lower buoyant chamber 264 and includes an opening 267 that is fluidically coupled to the surrounding body of water 261.

In the embodiments shown in FIGS. 5-25, the battery is provided external to the WEC. The battery may be coupled to the WEC through any suitable attachment and/or fastening features. For example, bolts, welds, clamps, tie-downs, and/or the like may be used to secure the battery to the WEC. However, in some embodiments, it may be desirable to provide the battery within the structure of the WEC or other vessel. An example of such an embodiment is shown in FIG. 26.

Figure 26:
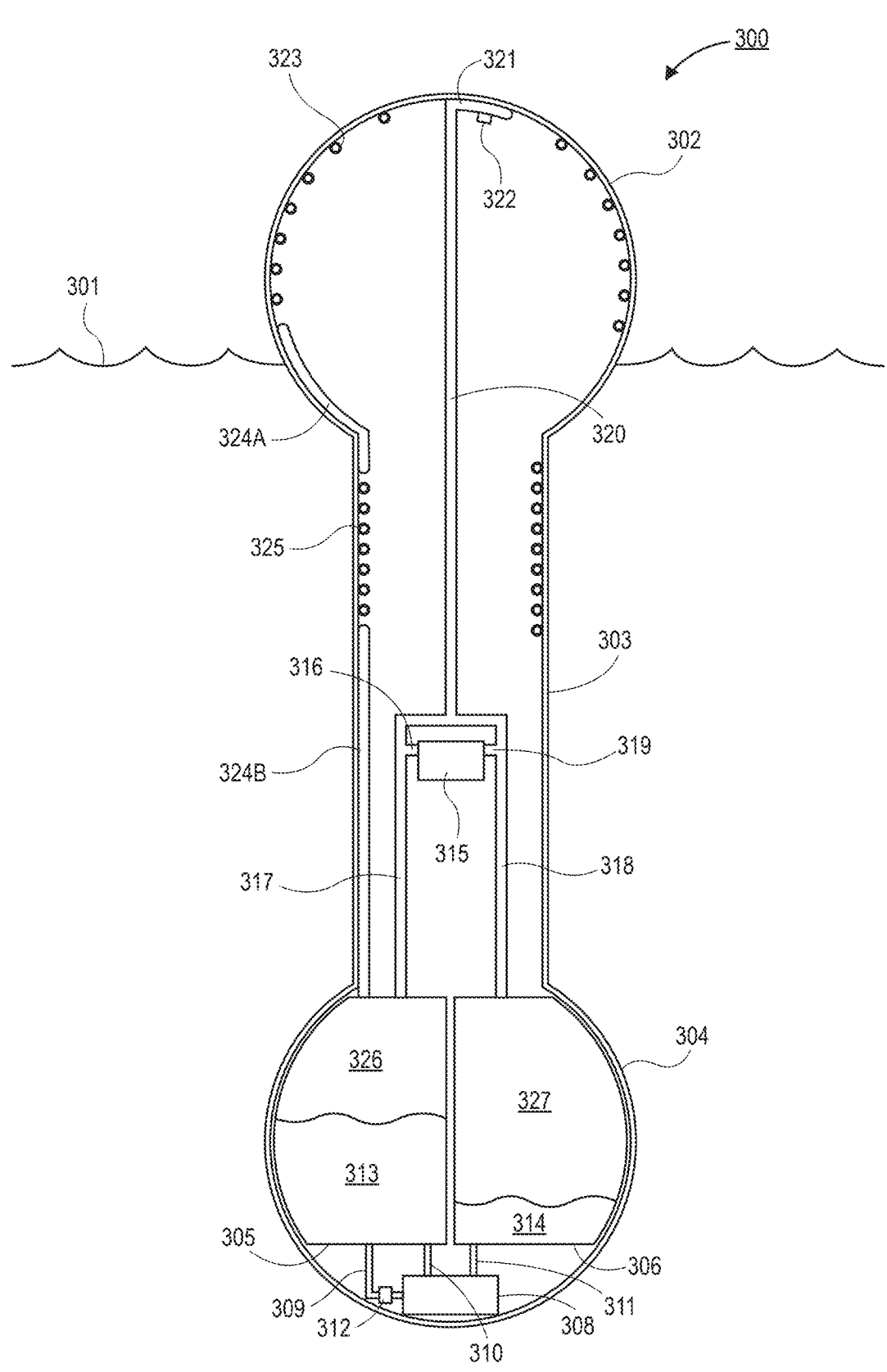
FIG. 26 is a cross-sectional illustration of a vessel with an internal thermal and electrical battery that includes an electrolyzer and a fuel cell, in accordance with an embodiment.

Referring now to FIG. 26, a cross-sectional illustration of a vessel 300 is shown, in accordance with an embodiment. The vessel 300 may float on a body of water 301. For example, an upper buoyant chamber 302 may be provided along a surface of the body of water 301. The upper buoyant chamber 302 may be coupled to a tube 303 that extends down from the upper buoyant chamber 302 into the body of water 301. A lower buoyant chamber 304 may be provided at a lower end of the tube 303. In the illustrated embodiment, the tube 303 does not extend through the lower buoyant chamber 304. Though in other embodiments, the tube 303 may be open at the bottom and fluidically coupled to the body of water 301. The vessel 300 may include buoyant chambers 302 and/or 304 with dimensions and/or shapes that are similar to any of those of the WECs described above. Similarly the tube 303 may be similar in dimension and/or shape to any of those of the WECs described above.

In some embodiments, the vessel 300 may be an energy generating vessel, such as a WEC. Though, other energy generation processes may be used to power the electrolyzer 308 of the battery. For example, one or more solar panels, a wind turbine, or the like may be used to generate sufficient energy to run the electrolyzer 308. In other embodiments, the vessel 300 may not have any energy generation functionality. Such embodiments may use a battery similar to battery 101 described in FIG. 2 above. That is, the electrolyzer 308 may be omitted, and the vessel 300 may be dependent on refueling in order to supply one or both of the oxidizing gas 326 in the first tank 305 and/or the fuel 327 in the second tank 306.

In an embodiment, the lower buoyant chamber 304 may house the first tank 305 and the second tank 306. While two tanks 305 and 306 are shown, it is to be appreciated that multiple tanks may be used to store the oxidizing gas 326 and/or multiple tanks may be used to store the fuel 327. In some embodiments, precursor 313 may also be stored in the first tank 305. Residual liquid 314 (often the same liquid as the precursor) may also be present in the second tank 306. The electrolyzer 308 may be fed precursor 313 by line 309 (with the aid of pump 312). Oxidizing gas 326 may flow from the electrolyzer 308 to the first tank 305 by line 310, and fuel 327 may flow from the electrolyzer 308 to the second tank 306 by line 311.

In an embodiment, a fuel cell 315 may be fed oxidizing gas 326 by line 317 with branch 316, and fuel 327 may be provided to the fuel cell 315 by line 318 and branch 319. Valve structures similar to those described in greater detail herein for controlling the flow of gasses to the fuel cell 315 are omitted for simplicity. Any reaction byproduct from the fuel cell 315 may flow back to the first tank 305 through a return line (not visible in FIG. 26).

In an embodiment, a thermal feed line 320 may fluidically couple the oxidizing gas 326 and the fuel 327 to a peak 321. Valve structures similar to those described in greater detail herein for controlling the flow of gasses to the peak 321 are omitted for simplicity. The peak 321 in FIG. 26 is near the top of the upper buoyant chamber 302 as one example of a possible location for the peak 321. A catalyst 322 may be provided downstream of the peak 321 (on a side of the peak 321 opposite from the first tank 305 and the second tank 306). The catalyst 322 may initiate an exothermic reaction between the oxidizing gas 326 and the fuel 327 in order to generate heat in the reaction pipe 323. As shown, the reaction pipe 323 wraps around an interior surface of the upper buoyant chamber 302 as one example of a possible location for the reaction pipe 323.

In an embodiment, a lower end of the reaction pipe 323 is fluidically coupled to a first portion of a return line 324A. The first portion of the return line 324A is fluidically coupled to a condenser 325. The condenser 325 may be a fluidic coil that wraps around the inner surface of the tube 303. In some embodiments, the condenser 325 is substantially submerged below the surface of the water 301. This enables faster cooling and conversion of steam and gas back into a liquid precursor. A bottom end of the condenser 325 is fluidically coupled to a second portion of the return line 324B that is, in turn, fluidically coupled to the first tank 305. As such, liquid precursors 313 may be returned to the first tank 305 to provide a closed loop system.

It is to be appreciated that the benefits provided by the inclusion of a thermal and electrical battery with a WEC can lead to more efficient energy product generation (e.g., by providing more optimal temperature conditions for certain components). The thermal energy can also be used for location tracking in order to make locating the WEC for energy product harvesting easier. Accordingly, energy products generated by the WEC can be more easily and/or cost-effectively generated and transported to locations where the energy product is stored and/or consumed. As used herein, energy products may include, but are not limited to, fuels (e.g., hydrogen and/or carbon containing fuels), chemicals (e.g., HCl), biological species, digital goods and/or services, and the like. In some instances, "chemicals" may be used to refer to energy products that are fuels (e.g., hydrogen gas) and/or non-fuel chemistries (e.g., HCl). Since the WEC may be located at sea, the energy products may be transported back to land for consumption, use, storage, or the like. Examples of energy product generation at the WEC and transport schemes or processes are described with respect to FIGS. 27-40.

Figure 27:
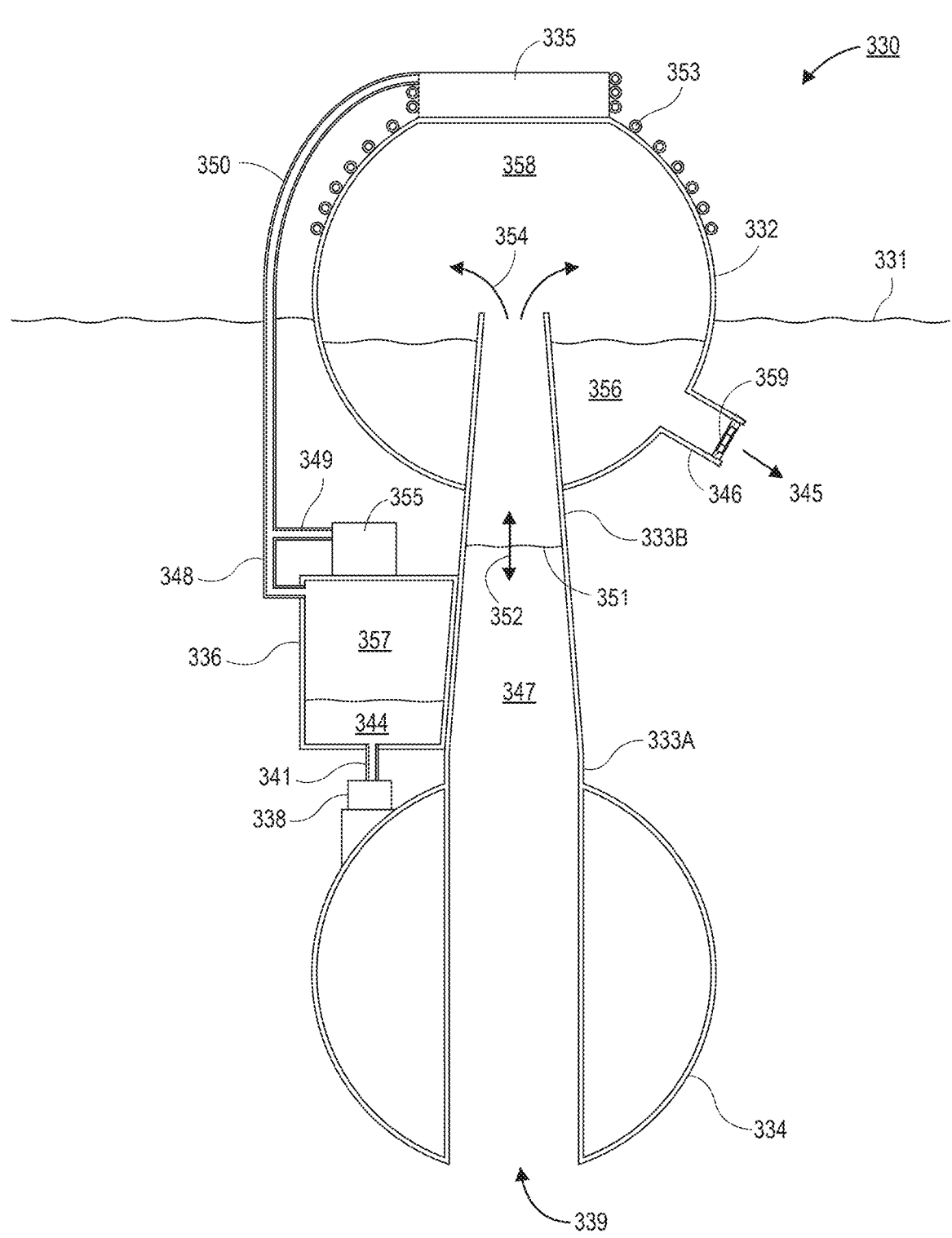
FIG. 27 is a cross-sectional view of a vessel with a thermal and electrical battery that is capable of producing excess chemicals for harvesting, in accordance with an embodiment.

FIG. 27 illustrates a cross-sectional view of a WEC 330 with a thermal and electrical battery, in accordance with an embodiment. The WEC 330 floats adjacent to an upper surface of a body of water 331 over which waves pass. The WEC 330 may include a buoyant chamber 332 with an interior volume 358. The interior volume 358 may be partially filled with water 356. Gasses (e.g., oxygen, hydrogen, air, or the like) may fill additional portions of the interior volume 358. Internal structures may also be provided within the buoyant chamber 332. For example, baffles, walls, sub-chambers, doors, or the like may be provided within the chamber 332. The internal structures may be used to control flow or movement of water 356 within the chamber 332, provide housing for different gas species, or the like.

The chamber 332 may be axially symmetric in some instances. For example, in FIG. 27, the chamber 332 is a spherical segment with a substantially horizontal top surface. In other instances, the chamber 332 may be a spherical cap, or any other type of axially symmetric shape. Though, the chamber 332 may be non-axially symmetric in other instances. For example, the chamber 332 may have a keel or hull shape similar to that of a floating vessel (e.g., a boat or ship). Openings, ports, or the like may also be provided through the walls of the chamber 332 in order to access materials and/or substances within the chamber 332, to provide control of pressure within the chamber 332, and/or the like.

A tube 333 may be coupled to the chamber 332. The tube 333 may have an open bottom 339 that is in fluid communication with the water 331 surrounding the WEC 330. The tube 333 may pass through a wall of a lower chamber 334 and a wall of the upper chamber 332. The tube 333 may pass into the interior volume 358. An opening at the top of the tube 333 is fluidically coupled to the interior 358 of the chamber 332. The tube 333 may have a constant diameter through its length. In other instances, the tube 333 may have a non-uniform diameter through its length. For example, the tube 333 may have a first portion 333A with a constant diameter and a second constricted portion 333B where the diameter is reduced. The tube 333 may be cylindrical or have any other shaped cross-section.

As shown, water 347 may reside in the tube 333 with a free surface 351. As indicated by the double arrow 352 across the free surface 351, the level of the oscillates up and down in response to oscillation of the WEC 330. Oscillation is driven by interaction with waves that pass along the surface of the body of water 331. The confined water 347 within the tube 333 may acquire momentum during oscillation of the WEC 330. At some points in time, the free surface 351 rises above the top opening of the tube 333 and is expelled (as indicated by arrows 354) into the interior volume 358 of the chamber 332. The water from the tube 333 maintains a level of water 356 within the chamber 332.

In order to generate energy, water 356 from the interior of the chamber 332 is expelled out a pipe 346. As water 356 passes through the pipe, an energy generation device 359 is engaged. The energy generation device 359 may comprise a hydropower turbine, such as a reaction turbine (e.g., a propeller turbine, a bulb turbine, a straflo turbine, a tube turbine, a Kaplan turbine, a Francis turbine, or a kinetic turbine) or an impulse turbine (e.g., a Pelton turbine, or a cross-flow turbine). In some instances, a single turbine is used for the energy generation device 359, and in other instances, multiple turbines arranged in series are used for the energy generation device 359. While a single energy generation device 359 is shown in the WEC 330, embodiments may include a plurality of energy generation devices 359.

The energy generation device 359 may be coupled to an electrical generator (not shown). The energy generation device provides rotational energy which is converted into electrical energy by the electrical generator. The electrical energy may be stored (e.g., in a battery) or consumed for one or more purposes, which will be described in greater detail herein. While an electrical generator is one option, other generator types may also be used. For example, generators described herein may include any generator, alternator, other mechanism, device, and/or component that converts energy from one form into another. In some instances, one or more of the energy generation systems may be replaced with a magnetohydrodynamic (MHD) generator, which generates electricity directly from a flow of liquid without the need for connection with a turbine and associated rotating shaft. That is, a combination of a turbine connected to a generator by a shaft can be replaced, in some instances and with an appropriate choice of working fluid, with a MHD generator.

As noted above, WEC 330 may generate significant amounts of energy that needs to be stored or used in a constructive manner. In some instances, energy generated from WEC 330 may be stored in a battery. The battery may provide an accessible energy source in order to run one or more electrical components integrated into the WEC 330 and/or generate heat. The battery may be similar to any of the thermal and electrical batteries described in greater detail herein. Alternatively (or in addition), WEC 330 may provide a material conversion process in order to "store" energy in a more transportable form. For example, energy generated by WEC 330 can be stored in the form of an energy product, such as those described in greater detail herein.

In the case of the energy product being hydrogen gas, an electrolyzer 338 may be provided on the WEC 330. The electrolyzer 338 may be fluidly coupled to a water source, such as water 344 within a chamber 336. Water 344 may be deionized, filtered, distilled and/or otherwise purified. Water 344 may be provided to the WEC 330 as a precursor material. Energy generated by the WEC 330 may be consumed by the electrolyzer 338 to convert water into oxygen and hydrogen. The hydrogen gas may be stored in the internal volume 357 of the chamber 336, or any other confined space associated with the WEC 330. The oxygen gas may be vented to atmosphere in some embodiments. After hydrogen gas is produced, the gas may be collected (i.e., removed or offloaded from the WEC 330) periodically be an external vessel, ship, air-ship, submersible, drone, or any other vehicle.

In addition to the generation of hydrogen as an energy product, the electrolyzer 338 may generate hydrogen (or any other fuel) and oxygen in order to operate the thermal and electrical battery. For example, the chamber 336 may be a chamber for storing the fuel, and a second chamber (not visible in the cross-section of FIG. 27) may be used to store the oxidizing gas (e.g., oxygen, chlorine gas, etc.). A pipe 341 may supply the fuel from the electrolyzer 338 to the chamber 336. An additional pipes 348 and 349 may fluidically couple the fuel in chamber 336 to a fuel cell 355 that can be used for powering an electrical load (not shown) on the WEC 330. Similar piping may fluidically couple the oxidizing gas to the fuel cell 355.

In an embodiment, a thermal feed line 350 may route the fuel and the oxidizing gas to a top of the WEC 330. A catalyst (not visible) may initiate an exothermic reaction within the reaction pipe 353 to generate heat. The heat can be used to warm components and/or structures of the WEC 330, such as an enclosure 335 (e.g., for storing electrical components, communication components, etc.) and/or the upper buoyant chamber. A return line (not visible) with or without a condenser may then return precursor fluid to a precursor storage chamber (not visible) similar to other embodiments disclosed herein.

WEC 330 may be an autonomous device with the ability to move and/or navigate in a controlled manner about the body of water. Propulsion of the WEC 330 may be driven through one or more different mechanisms. In one instance, the expelled water 345 out of the pipe 346 provides a propulsive force that can move the WEC 330. The WEC 330 can be steered through control of the force of the expelled water 345 and/or the direction of the expelled water 345. In some instances, one or more rudders (not shown) can be coupled to the WEC 330 in order to provide directional control, rotational control, and/or the like.

In some embodiments, propulsion of the WEC 330 may be provided through one or more active propulsion devices. For example, propellers or the like may be used in some instances. Energy to drive the active propulsion devices may be obtained through the energy generation of the WEC 330, or from batteries (e.g., a thermal and electrical battery) that is charged through the wave-energy generation of the WEC 330. In other instances, hydrogen or other gasses generated on the WEC 330 can be consumed (e.g., through the use of a fuel cell 355) in order to power active propulsion devices.

The enclosure 335 may be a water proof chamber for securing one or more electrical components. For example, a computing system, a positioning system, and/or a communications system may be provided in the enclosure 335. The computing system may provide one or more processors and associated hardware and/or software that enables control of the WEC 330. For example, the computing system may control power generation, such as by controlling flow rates of water to the energy generation device 359. The positioning system may include a GPS, a compass, an accelerometer, a gyroscope, or any other suitable navigational system. The positioning system may control propulsion and steering systems in order to navigate the WEC 330. The communications system may include an antenna, a receiver, and associated circuitry, hardware, and/or software. The communications system may provide a communication link to external systems, other waver-energy generation systems, or the like. The systems described in the enclosure 335 on the WEC 330 are exemplary in nature, and it is to be appreciated that many different systems, control apparatuses, and/or the like may be provided in the enclosure 335.

As will be described in greater detail below, the energy products produced by the WEC may be subsequently delivered to shore (or near shore) for use, storage, or the like. The energy product may be transported to shore through one or more vessels. In some instances, the energy product is transported to shore without further modification. For example, a hydrogen gas may be generated by the WEC, and the hydrogen gas is transported to shore. In other instances, the energy product may be used to generate a different energy product. For example, the energy product may be a precursor that is used in the generation of an alternative energy product (e.g., an energy product that has a higher energy density). In one example, a hydrogen energy product may be converted into methanol or ammonia through a chemical reaction with one or more other precursor gasses. This additional conversion may occur at the WEC or during transport of the energy product to shore.

Figure 28:
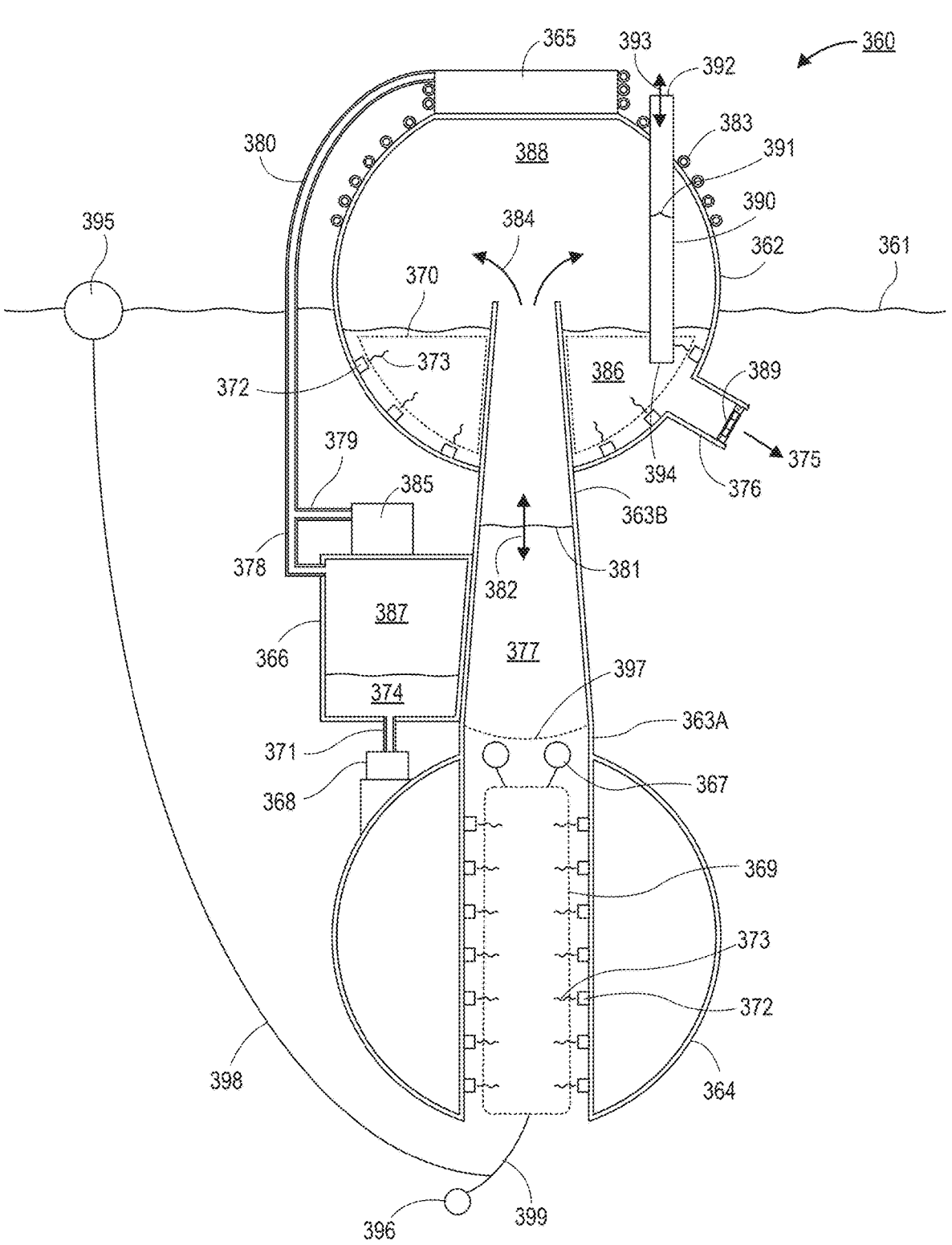
FIG. 28 is a cross-sectional view of a vessel with a thermal and electrical battery that illustrates the generation of biological products within the vessel, in accordance with an embodiment.

FIG. 28 illustrates a cross-sectional view of a WEC 360 with a thermal and electrical battery is shown, in accordance with an embodiment. The WEC 360 may be similar to the WEC 330 described above, with the exception of the energy product that is being generated or produced by the WEC 360. For example, WEC 360 may include a buoyant chamber 362 coupled to an injection tube 363A/363B. The tube 363 may pass through a wall of a lower chamber 364 and a wall of the upper chamber 362. Water 377 within the tube 363 oscillates (as indicated by double arrow 382) so that the surface 381 raises and lowers within the tube 363. In some instances water 377 may flow out 384 of the tube 363 into the interior 388 of the chamber 362 in order to fill water 386 in the chamber 362. Water 377 in the chamber 362 can be expelled down pipe 376, through energy generation device 389, and exit 375 the WEC 360 in order to generate energy.

However, instead of producing a gas as an energy product (or only gas), the WEC 360 may produce a biological product. The biological product may comprise one or more of marine algae (e.g., micro-alae and/or macro-algae), seaweed, other marine plants, fish, krill, or other marine organisms. More specifically, electrical power generated through the operation of an energy generation device 389 can be used to power lights 372, lamps, thermal devices (e.g., heaters), and/or the like. For example, lights 372 may be light emitting diode (LED) lights or any other suitable source for generating electromagnetic radiation 373. The electromagnetic radiation 373 can be consumed by the biological product within the WEC 360 in order to induce growth of the biological product.

As shown in FIG. 28, the lights 372 may be arranged, attached, or otherwise coupled to interior surfaces of the chamber 362. Additionally, lights 372 may be provided along sidewalls of the injection tube 363. While shown as being coupled directly to interior wall surfaces, other embodiments may comprise suspending lights 372 within an interior volume of the chamber 362. The lights 372 in FIG. 28 are all shown as being submerged in water 386 or 377. Though, in other embodiments, lights 372 may be provided above the surface of the water 386 within the chamber 362.

In one instance, designed to promote the growth of biological products (e.g., algae and/or other marine based plant life), an approximately circular net 370 spans, and/or is adjacent to, an approximately flow-normal and/or horizontal cross-section of the water 386, adjacent to the surface of the water 386. Net 370 entrains the biological product within the lower portion of the water 386 thereby tending to reduce, if not prevent, the outflow and/or loss of that macroalgae through the energy generation device 389. In other embodiments, other structures (e.g. a sieve, catchment, mesh, or grating) are positioned in the path of water flow to the energy generation device 389 in order to prevent outflow or loss of biological products.

Periodically, biological products may be removed from the water 386 by a ship, platform, or other vessel. A ship may insert a suction tube into and through an access tube 390. Once inserted into and through access tube 390, an inserted suction tube can be positioned near the bottom of the embodiment's reservoir of water 386 and suck out a portion of the biological product therein. A complementary access tube (not shown), and/or a complementary channel within a single access suction tube 390, can return water to the reservoir while biological products, are being removed from the reservoir of water 386, thereby maintaining and/or preserving the original level of the water 386 in the reservoir.

The access tube 390 allows algae, water, nutrients, and/or other materials, to be added to, and/or withdrawn from, the reservoir of water 386 when that reservoir is otherwise sealed inside the chamber 362. Because the access tube is open to the atmosphere (as indicated by arrow 393) at its upper mouth 392, and open to the water and biological product in the water 386 at its lower mouth 394, water 386 from the reservoir is free to rise up within the algae access tube 390. Because of the pressure of the air trapped within the air pocket 388 of the interior of the chamber 362, and the corresponding pressure of the water 386, the surface 391 of the water within the access tube 390 tends to rise to a height above the surface of the water 386 within the reservoir whose head pressure approximately corresponds to the pressure of the air within hollow chamber 362.

In addition to growing biological products, especially macroalgae, within the water 386 reservoir inside the hollow chamber 362, biological products, especially macroalgae, may be grown inside the embodiment's injection tube 363. An upper barrier net 397 spanning an upper portion, and/or at an upper position, of the injection tube 363 prevents at least a portion of the algae within the injection tube 363 from too closely approaching the upper constricted portion of the injection tube 363 which, if not prevented, could potentially clog the injection tube 363 at that location.

Macroalgae or other biological products are grown within a net enclosure and/or containment bag 369 that forms a porous bag entraining most, if not all, of the biological products. An upper end of the algae containment bag 369 is pulled upward by a float 367, tending to position the upper end of the bag proximate to the lower side of the barrier net 397. The biological product within the containment bag 369 are encouraged to grow through the embodiment's provision of light, e.g. 373, emitted by lamps, e.g. 372, positioned along the interior wall and/or surface of the injection tube 363.

A lower end of the containment bag 369 is pulled downward by a weight 396 connected to the bag by a tether, chain, rope, linkage, and/or cable 399. Also connected to the weight 396, and therethrough to the containment bag 369, is a tether, chain, rope, linkage, and/or cable 398 an upper end of which is connected to a float 395 that tends to float at the surface 361 of the body of water on which the WEC 360 floats.

Periodically, biological products may be removed from the WEC's 360 injection tube 363 by a ship or other vessel. A ship may attach a secondary cable to cable 398 and then lower a secondary weight to increase the total weight tending to pull the algae containment bag 369 down and out of the injection tube 363. After the containment bag 369 has been pulled down and becomes free of the injection tube 363, the containment bag 369 may be pulled up by the secondary cable and therewith lifted onto and/or into the ship where its biological products may be harvested. The same containment bag 369 that was removed may be reinserted into the injection tube 363 using the same second cable, using an underwater autonomous vehicle, and/or using another method, mechanism, and/or system. If the same containment bag 369 is reinserted into the embodiment's inertial water tube 363, it will tend to be so reinserted after most, but not all, of its entrained biological product has been harvested and/or removed. By leaving a portion of the biological product in the containment bag 369, the residual biological product can grow and give rise to another harvest. If a "new" second containment bag 369 is inserted into the embodiment's injection tube 363 to replace the removed containment bag 369, then it is advantageous to first "seed" that containment bag 369 with biologic stock so that a new crop of a preferred species of algae can be grown.

The scope of the present disclosure includes a complementary ship to periodically harvest the biological products grown within the embodiment, as well as the facilities on a shore, floating platform, and/or other ship where the harvested algae are processed and/or stored, as well as a method for harvesting biological products wherein: a wave energy converter of a type herein disclosed is deployed on a body of water; electrical energy produced by said wave energy converter operating in waves is used to power LEDs, or other lamps, or other sources of light emissions, that are mounted on, within, inside, or outside, of said wave energy converter, and/or LEDs, or other lamps, or other sources of light emissions, that are suspended from walls, surfaces, and/or structural members, within, inside, or outside, of said wave energy converted; biological products are permitted to grow in an enclosure, cavity, or vicinity of said wave energy converter using light from said lamps as a source of metabolic energy; said biological products (or products or byproducts produced therefrom, e.g. algal oil, fish oil, etc.) is transferred to a ship or other floating vessel; said ship or floating vessel transfers said biological products (or products or byproducts produced therefrom, e.g. algal oil, fish oil, etc.) to a shore facility for processing and/or storage.

The aquaculture configuration embodiment illustrated in FIG. 28 may also include fish within either or both of the water 386 reservoir and/or the algal containment bag 369. If one or more species of fish that are able to eat and/or consume the type(s) of algae being grown within the embodiment are selected and included within the respective growth areas prior to each growth cycle, then a portion of those fish may be harvested along with whatever algae remains uneaten. The scope of the present disclosure includes a method for harvesting fish wherein: a wave energy converter of a type herein disclosed is deployed on a body of water; electrical energy produced by said wave energy converter is used to power LEDs, or other lamps, or other sources of light emissions, that are mounted on, within, inside, or outside, of said wave energy converter, as well as LEDs, or other lamps, or other sources of light emissions, that are suspended from walls, surfaces, and/or structural members, within, inside, or outside, of said wave energy converter; algae are permitted to grow in an enclosure, cavity, or vicinity of said wave energy converter using light from said lamps as a source of metabolic energy; fish or other marine organisms are permitted to grow in an enclosure, cavity, or vicinity of said wave energy converter, feeding, at least in part, on said algae as a source of metabolic energy; said fish or other marine organisms are transferred to a ship or other floating vessel; said ship or floating vessel transfers said fish and/or other marine organisms (or products or byproducts produced therefrom, e.g. fish meal or fish oil) to a shore facility for processing and/or storage.

The scope of the present disclosure includes, but is not limited to, the growth and/or harvesting of any and every kind of microalgae, macroalgae, fish, crustacean. Fish that do not eat the varieties of algae grown may nonetheless receive nutrition, e.g. plankton and phytoplankton, from the water that is regularly introduced to the reservoir of water 386 and injection tube 363 as a result of wave action. In addition to introducing potentially nutrient-rich water from outside the embodiment into the water 386 reservoir and injection tube 363 as a result of wave action, the embodiment also tends to remove waste-containing and/or nutrient-depleted, water from the water 386 reservoir and injection tube 363 as a result of the same water cycle (i.e. water enters tube 363, and therefrom enters the water 386 reservoir, and thereafter flows out of the water reservoir through the energy generation device 389.

The scope of the present disclosure includes embodiments utilizing water reservoir lamps and/or inertial water tube lamps emitting light of any single wavelength, any range of wavelengths, and/or any combinations of wavelengths or ranges of wavelengths.

The scope of the present disclosure includes embodiments in which lamps are attached to the inner surface of the upper portion of the hollow chamber 362, i.e. within the air pocket 388. The scope of the present disclosure includes embodiments in which lamps are attached to the outer surfaces of the hollow chamber 362 and/or injection tube 363 thereby encouraging biological product growth, and the establishment of communities of fish or other marine life, outside the WEC 360, but in the vicinity of the WEC 360.

WEC 360 may generate significant amounts of energy that needs to be stored or used in a constructive manner. In some instances, energy generated from WEC 360 may be stored in a battery. The battery may provide an accessible energy source in order to run one or more electrical components integrated into the WEC 360 and/or generate heat. The battery may be similar to any of the thermal and electrical batteries described in greater detail herein. Alternatively (or in addition), WEC 360 may provide a material conversion process in order to "store" energy in a more transportable form. For example, energy generated by WEC 360 can be stored in the form of an energy product, such as those described in greater detail herein.

In the case of the energy product being hydrogen gas, an electrolyzer 368 may be provided on the WEC 360. The electrolyzer 368 may be fluidly coupled to a water source, such as water 374 within a chamber 366. Water 374 may be deionized, filtered, distilled and/or otherwise purified. Water 374 may be provided to the WEC 360 as a precursor material. Energy generated by the WEC 360 may be consumed by the electrolyzer 368 to convert water into oxygen and hydrogen. The hydrogen gas may be stored in the internal volume 387 of the chamber 366, or any other confined space associated with the WEC 360. The oxygen gas may be vented to atmosphere in some embodiments. After hydrogen gas is produced, the gas may be collected (i.e., removed or offloaded from the WEC 360) periodically be an external vessel, ship, air-ship, submersible, drone, or any other vehicle.

In addition to the generation of hydrogen as an energy product, the electrolyzer 368 may generate hydrogen (or any other fuel) and oxygen in order to operate the thermal and electrical battery. For example, the chamber 366 may be a chamber for storing the fuel, and a second chamber (not visible in the cross-section of FIG. 28) may be used to store the oxidizing gas (e.g., oxygen, chlorine gas, etc.). A pipe 371 may supply the fuel from the electrolyzer 368 to the chamber 366. Additional pipes 378 and 379 may fluidically couple the fuel in chamber 366 to a fuel cell 385 that can be used for powering an electrical load (not shown) on the WEC 360. Similar piping may fluidically couple the oxidizing gas to the fuel cell 385.

In an embodiment, a thermal feed line 380 may route the fuel and the oxidizing gas to a top of the WEC 360. A catalyst (not visible) may initiate an exothermic reaction within the reaction pipe 383 to generate heat. The heat can be used to warm components and/or structures of the WEC 360, such as an enclosure 365 (e.g., for storing electrical components, communication components, etc.) and/or the upper buoyant chamber. A return line (not visible) with or without a condenser may then return precursor fluid to a precursor storage chamber (not visible) similar to other embodiments disclosed herein.

Figure 29:
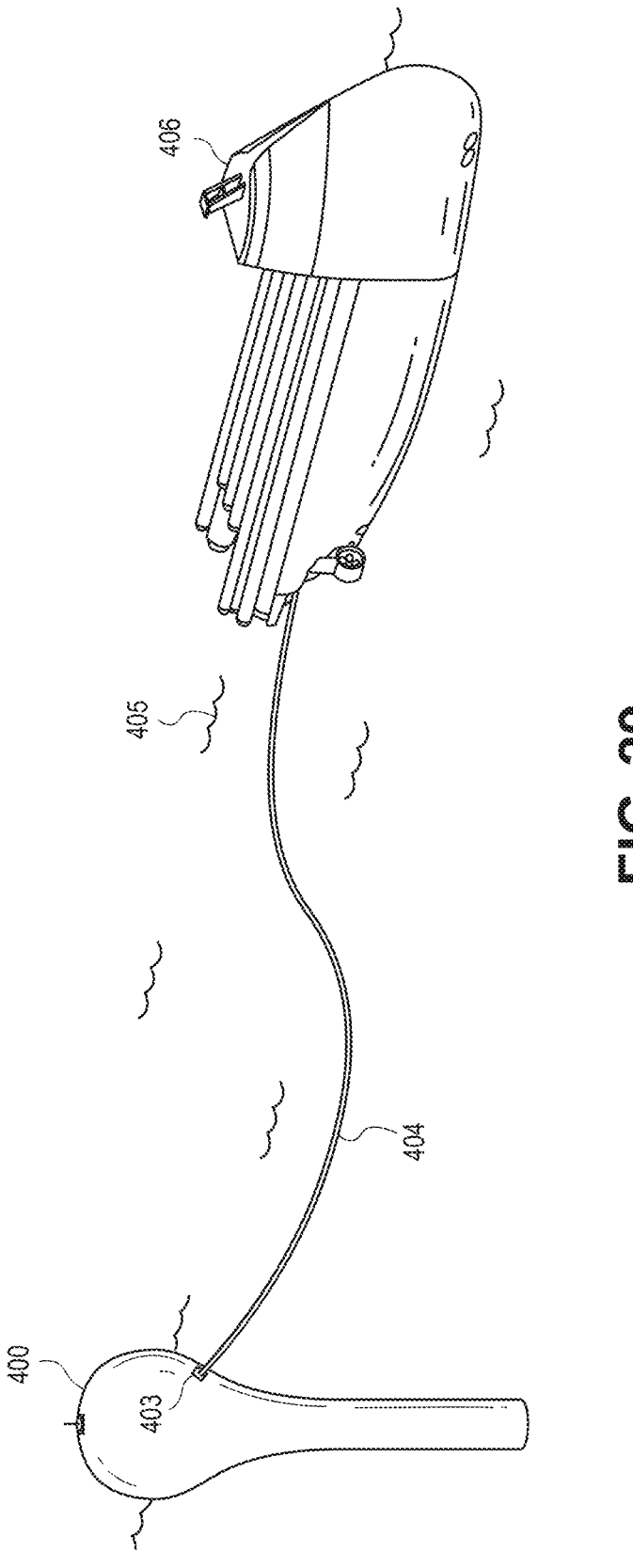
FIG. 29 is a perspective view of a system for coupling a first vessel to a second vessel for energy product offtake from the first vessel and/or precursor delivery to the first vessel, in accordance with an embodiment.

Referring now to FIG. 29 a perspective side view of a system including a WEC 400 that is fluidically coupled to a vessel 406 is shown, in accordance with an embodiment. A WEC 400 obtains, extracts, harvests, receives, and/or collects, energy from waves moving across the surface 405 of a body of water on which the WEC 400 floats. A portion of the energy that the WEC 400 extracts from the passing waves is converted into electrical power by a water turbine (not visible) and generator (not visible). A portion of the generated electrical power is used to generate an energy product (e.g., a liquid fuel, a gas fuel, a biological product, or the like). For example, a water electrolysis apparatus (not visible) inside the WEC 400 may be used for the conversion of a portion of water contained in a reservoir within the WEC 400 (not visible) into hydrogen gas. A portion of the synthesized hydrogen gas is captured within a hydrogen reservoir (not visible) within the WEC 400. The WEC 400 may comprise a thermal and electrical battery similar to any of those described in greater detail herein.

Periodically, a vessel 406 approaches the WEC 400 and positions itself near to the WEC 400. When sufficiently proximate to the WEC 400, the vessel 406 deploys a hose connection remotely-operated vehicle (hose connection ROV) 403 that is attached to a first end of a transfer hose 404. The hose connection ROV 403 pulls the transfer hose 404 to the WEC 400. The hose connection ROV 403 attaches itself translatably to the hull of the WEC 400 and moves itself across the WEC hull until it is positioned above and/or over a port (not visible) of the WEC 400. The hose connection ROV 403 then connects itself, and the attached hydrogen transfer hose, to the hydrogen port of the WEC 400 thereby permitting the energy product to be removed, and/or to flow, from the WEC 400 to the vessel 406 where it is then stored within one of more of the storage containers (not shown) of and/or on the vessel 406. In other embodiments, a passive retractable offtake system is used to couple the hose 404 to the port on the WEC 400. In some instances, the transfer of energy product from the WEC 400 to the vessel 406 is passive (e.g., if a pressure differential drives product from the WEC 400 to the vessel 406). In other instances, a pump, winch, or other mechanical force can be used to actively transport energy product from the WEC 400 to the vessel 406.

The vessel 406 in FIG. 29 is shown as a boat, but it is to be appreciated that any suitable transport vehicle may be used to offload energy product from the WEC 400. For example, a submersible vehicle, an aerial vehicle (e.g., helicopter, plane, dirigible airship, drone, etc.), or the like may also be used to offload energy product from the WEC 400. In an embodiment, the vessel 406 may transport the energy product directly to the shore, or the vessel 406 may be an intermediate transport that delivers the energy product to a second vessel, or a platform within the body of water on which the WEC 400 floats.

Figure 30:
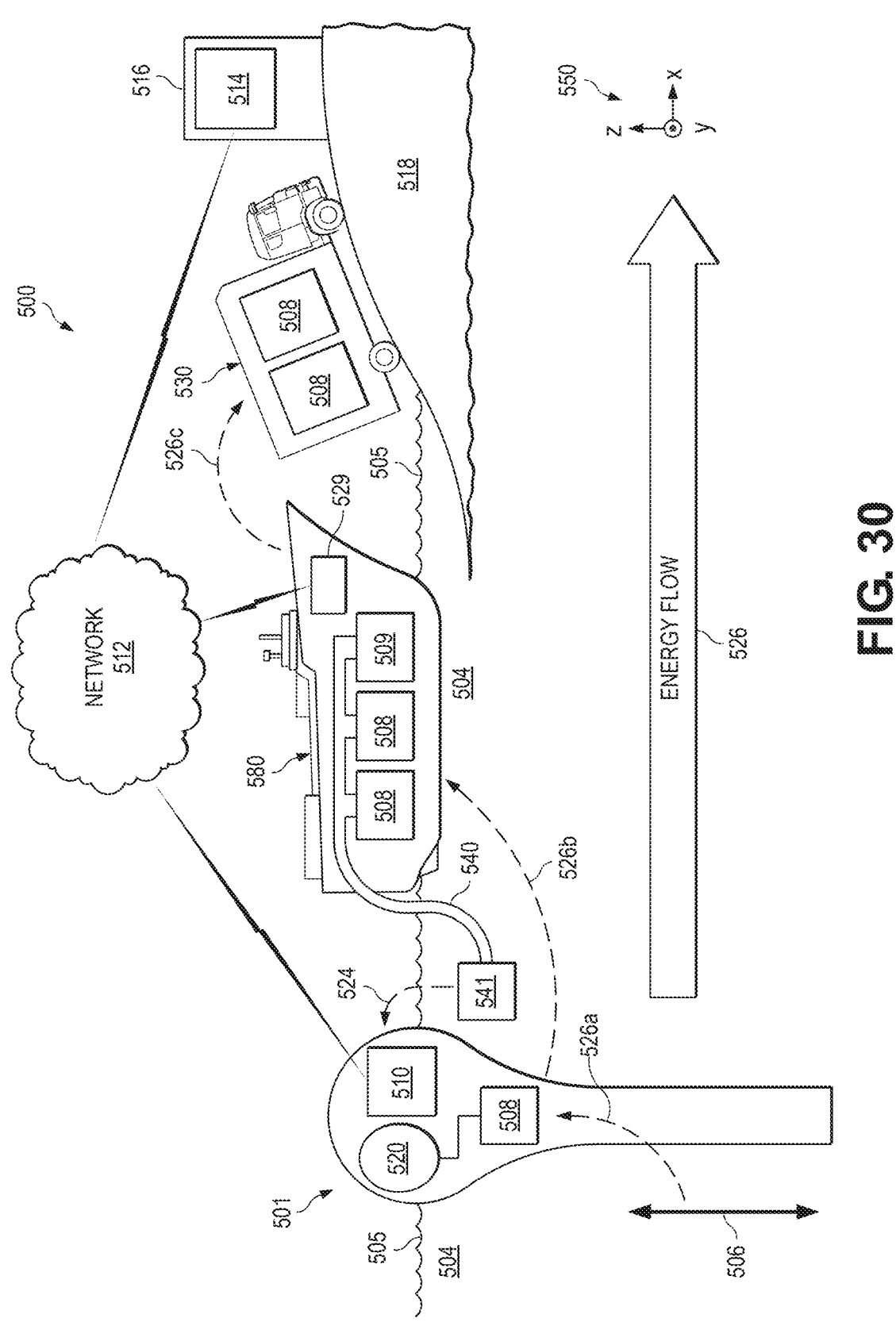
FIG. 30 is a schematic view of an energy flow diagram depicting the generation and transfer of energy products from the vessel to shore, in accordance with an embodiment.

Referring now to FIG. 30, a schematic diagram of a wave energy harvesting system 500 is shown. The wave energy harvesting system 500 may include a first free-floating body 501 and a second free-floating body 580 which may transiently couple to one another while floating on a surface 505 of a body of water 504. In an example embodiment, the first free-floating body 501 may be configured as a wave engine 501 (e.g., a WEC or hydrodynamic pump with a thermal and electrical battery, such as those described herein) and the second free-floating body 580 may be a storage vessel 580, such as a tanker ship 580. In some embodiments, the wave engine 501 may include a receiving port 520 operable to receive a conduit assembly 541 (as indicated by arrow 524) that is in fluidic communication with a conduit 540 from the storage vessel 580 and thereby fluidly couple the wave engine 501 to the storage vessel 580 via the conduit 540 for transfer of one or more fluids therebetween. While fluidic communication and coupling between the wave engine 501 and the storage vessel 580 is described in greater detail with respect to FIG. 30, it is to be appreciated that non-fluid products may also be transmitted between the wave engine 501 and the storage vessel 580.

In an embodiment, the fluidic communication (or fluidic coupling) between the wave engine 501 and the storage vessel 580 may be enabled through the use of automated, autonomous, and/or passive systems. In some embodiments, for instance, the conduit assembly 541 may include one or more fluid nozzles (not shown at FIG. 30) operable to emit one or more fluid streams to direct the conduit assembly 541 to the receiving port 520.

A set of Cartesian coordinate axes 550 is shown in FIG. 29 for contextualizing positions of the various components of the wave energy harvesting system 500. Specifically, x-, y-, and z-axes are provided which are mutually perpendicular to one another, where the x- and z-axes define a plane of the schematic diagram shown in FIG. 30 and the y-axis is perpendicular thereto. In some embodiments, a direction of gravity may be parallel to and coincident with a negative direction of the z-axis.

Though exemplified herein in the context of wave engines, the first free-floating body 501 may be configured as any free-floating body capable of self-propulsion, e.g., by extracting energy from stored fuel, inducing a flow of pressurized water, and/or harnessing one or more ambient environmental forces, so as to translate along the surface 505 of the body of water 504. For example, the first free-floating body 501 may be a ship 501 (such as a deployment ship, a tanker ship or other storage vessel, or another transport vessel), a buoy 501, a wind turbine 501, an offshore platform 501, such as a data center, etc.

In embodiments where the first free-floating body 501 is configured as the wave engine 501, water may pass into and through the wave engine 501 with upward and downward motion 506 (e.g., in a positive direction of the z-axis and the negative direction of the z-axis, respectively) of water waves. As described in greater detail herein, the upward and downward motion 506 may induce the water passing into and through the wave engine 501, energy from which may be captured and converted to an energy product 508 (as indicated by a dashed arrow 526a). The energy product 508, for example, may include one or more of an electrolysis product or other fuel/chemical, such as $H_2$ gas, HCl, etc., removed carbon, minerals, a biological product, digital goods, or an executed computational algorithm, such as, but not limited to a proof-of-work mechanism for a cryptocurrency, a trained machine learning algorithm, or the like.

In some embodiments, the first free-floating body 501 may include a first onboard controller or other computing device 510 and/or the second free-floating body 580 may include a second onboard controller or other computing device 529, the first and second onboard controllers 510, 529 each including non-transitory memory on which executable instructions may be stored. The executable instructions may be executed by one or more processors of the first and second onboard controllers 510, 529 to respectively perform various functionalities of the first and second free-floating bodies 501, 580. Accordingly, the executable instructions may include various routines for operation, propulsion, maintenance, tracking, and testing of the first and second free-floating bodies 501, 580. The first and second onboard controllers 510, 529 may be communicably coupled to various components (e.g., valves, power supplies, etc.) of the first and second free-floating bodies 501, 580 to command actuation and use thereof (wired and/or wireless communication paths between the first and second onboard controllers 510, 529 and the various components are omitted from FIG. 30 for clarity). For instance, the first onboard controller 510 may command actuation of one or more first coupling elements annularly distributed on the receiving port 520 and the second onboard controller 529 may command actuation of one or more second coupling elements annularly distributed on the conduit assembly 541 so as to selectively engage and disengage the one or more first coupling elements with one or more second coupling elements (first and second coupling elements not shown at FIG. 30). Though, it is to be appreciated that passive self-alignment may be enabled through the use of a retractable offtake system.

In certain embodiments, the first and second onboard controllers 510, 529 may be communicably coupled to a remote controller or computing device 514 via a wireless network 512. The various controllers 510, 514, 529 may be configured in a substantially similar manner to one another, excepting, in some examples, one or more modifications or differences for a given use case. For example, the remote controller 514 may be positioned so as to be accessible to an operator of the wave energy harvesting system 500, e.g., on a ship or in a physical structure 516 on land 518 (as illustrated in FIG. 30). As such, even when one or both of the first and second free-floating bodies 501, 580 are not geographically located within a national or subnational jurisdiction, the one or both of the first and second free-floating bodies 501, 580 may nevertheless be in continuous (e.g., substantially uninterrupted) or periodic communication with the remote controller 514 which may be geographically located within a national or subnational jurisdiction (e.g., on the land 518).

In some embodiments, because the remote controller 514 may be configured for use by the operator, the remote controller 514 may include a user interface at which the operator may enter commands or otherwise modify operation of the wave energy harvesting system 500. The user interface may include various components for facilitating operator use of the wave energy harvesting system 500 and for receiving operator inputs (e.g., requests to direct the conduit assembly 541 to the receiving port 520), such as one or more displays, input devices (e.g., keyboards, touchscreens, computer mice, depressible buttons, mechanical switches, other mechanical actuators, etc.), lights, etc. In additional or alternative embodiments, one or both of the first and second onboard controllers 510, 529 may be configured with the user interface as described hereinabove.

An overall energy flow 526 of the wave energy harvesting system 500 is schematically depicted in FIG. 30, in which energy captured at the first free-floating body 501 from water induced therethrough by the upward and downward motion 506 of the water waves (as indicated by the dashed arrow 526a) may be converted to the energy product 508 and transferred to the second free-floating body 580 (as indicated by a dashed arrow 526b) and then transferred from the second free-floating body 580 to a land-based vehicle 530 (as indicated by a dashed arrow 526c) to be transported to a storage facility and/or an end user for consumption. For example, in some embodiments, the wave energy harvesting system 500 may include a plurality of nodes including a plurality of first free-floating bodies 501, one or more second free-floating bodies 580 to transport a plurality of energy products 508 from the plurality of first free-floating bodies 501 to the land 518, and one or more land-based vehicles 530 to transport the plurality of energy products 508 from the one or more second free-floating bodies 580 to the storage facility and/or the end user. In other instances, the energy products 508 may be directly transported from the second free-floating body 580 to a storage facility and/or end user on the land 518 or within a certain distance of the land 518 (e.g., up to 100 kilometers from land, up to 40 kilometers from land, up to 1 kilometer from land, up to 500 meters from land, or up to 50 meters from land). Though storage facilities or consumption locations may be further from land in other embodiments.

In an example embodiment, the energy product 508 may be a fluid (e.g., a liquid or a gas) which is transferred from the first free-floating body 501 to the second free-floating body 580 via the conduit 540, the conduit 540 being configured to transiently fluidly couple an internal reservoir of the second free-floating body 580 to an internal reservoir of the first free-floating body 501 via one or more internal passages extending at least a length of the conduit 540 (internal reservoirs and internal passage(s) not shown at FIG. 30). In certain embodiments, the conduit 540 may include a plurality of internal passages, each of which may convey a different fluid between the first and second free-floating bodies 501, 580. As an example, the conduit 540 may include a first internal passage configured to supply an energy product precursor 509 (e.g., an electrolysis reactant, such as deionized water) from the second free-floating body 580 to the first free-floating body 501 so as to replace the energy product 508 being transferred to the second free-floating body 580. Accordingly, in such an example, the conduit 540 may further include a second internal passage configured to siphon the energy product 508 (e.g., an electrolysis product, such as hydrogen gas) from the first free-floating body 501 to the second free-floating body 580. As such, the overall energy flow 526 may be maintained by periodically (e.g., once per week) replenishing a capacity of the first free-floating body 501 to convert captured energy into a chemical energy product.

In some embodiments, the adjustments to the position of the conduit assembly 541 may be executed based on a manual operator input, e.g., at the user interface of the remote controller 514. In additional or alternative embodiments, the adjustments to the position of the conduit assembly 541 may be automatically adjusted, e.g., based on feedback from one or more sensors and/or data received via the wireless network 512. As an example, one or both of the first and second free-floating bodies 501, 580 may include an accelerometer (e.g., an inertial measurement unit; not shown) configured to gather changes in local positional data, e.g., resulting from water wave motions. As an additional or alternative example, one or both of the first and second free-floating bodies 501, 580 may include a global positioning system (not shown) configured to gather geographic positional data. As an additional or alternative example, one or both of the first and second free-floating bodies 501, 580 may include a wind speed sensor (not shown) configured to measure wind speed. As an additional or alternative example, such data (e.g., the positional data and/or the wind speed) may be received via the wireless network 512, in addition to other data such as meteorological data (e.g., water wave height, direction of water wave propagation, water wave period, weather, etc.). In some embodiments, directions and magnitudes of applied forces may be inferred based on the feedback from the one or more sensors and/or the data received via the wireless network 512, such that specific operational parameters (e.g., the one or more continuously adjustable parameters) may be adjusted responsive such that changes in individual applied forces may be accounted for with specificity. Though, the use of a passive retractable offtake system may allow for a more passive and precise fluidic coupling between the free-floating bodies 501 and 580, even in the view of wave conditions, wind conditions, or other environmental factors.

Figure 32:
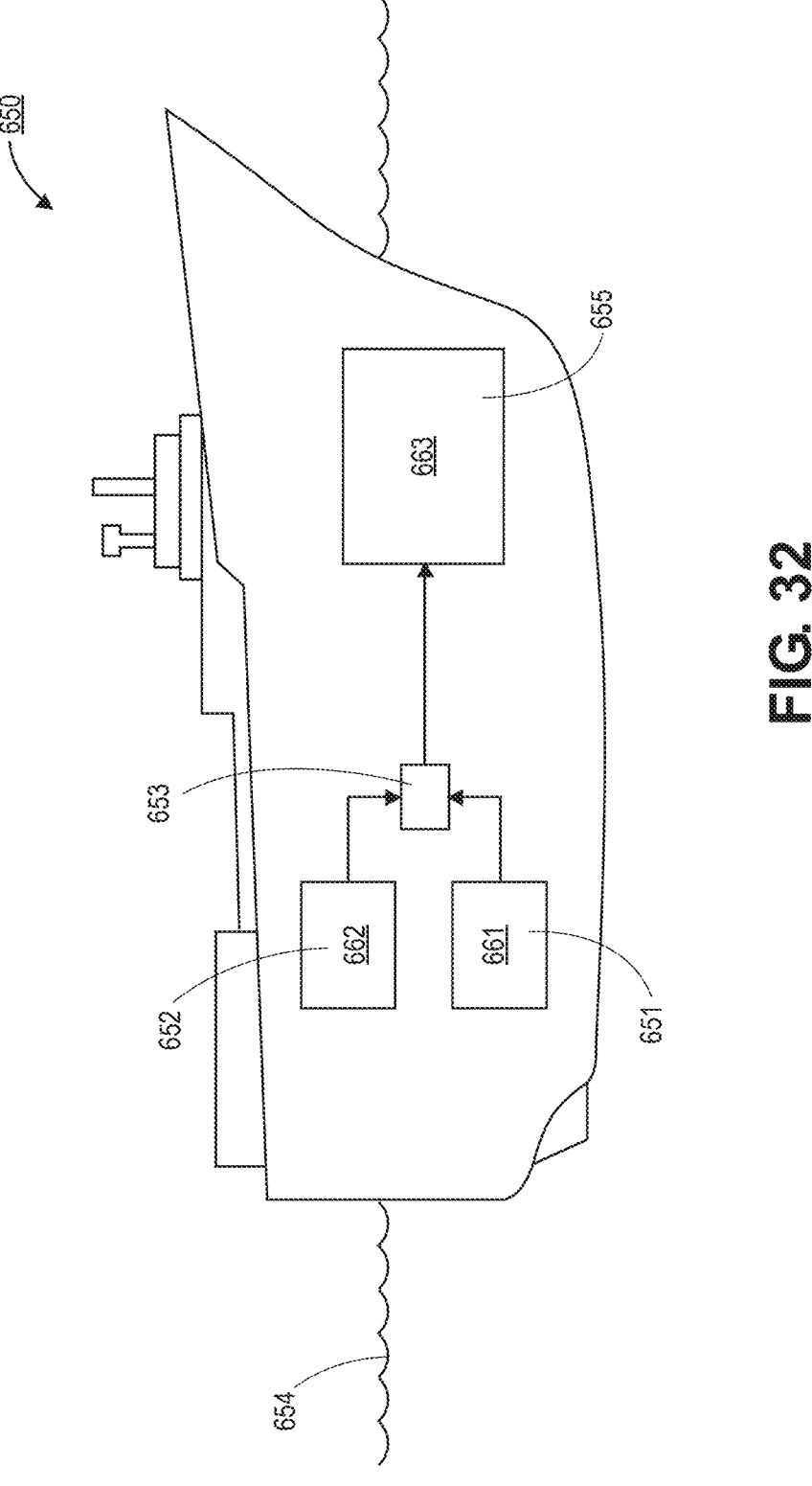
FIG. 32 is a schematic view of an energy product conversion plant integrated on a transport vessel, in accordance with an embodiment.
Figure 33:
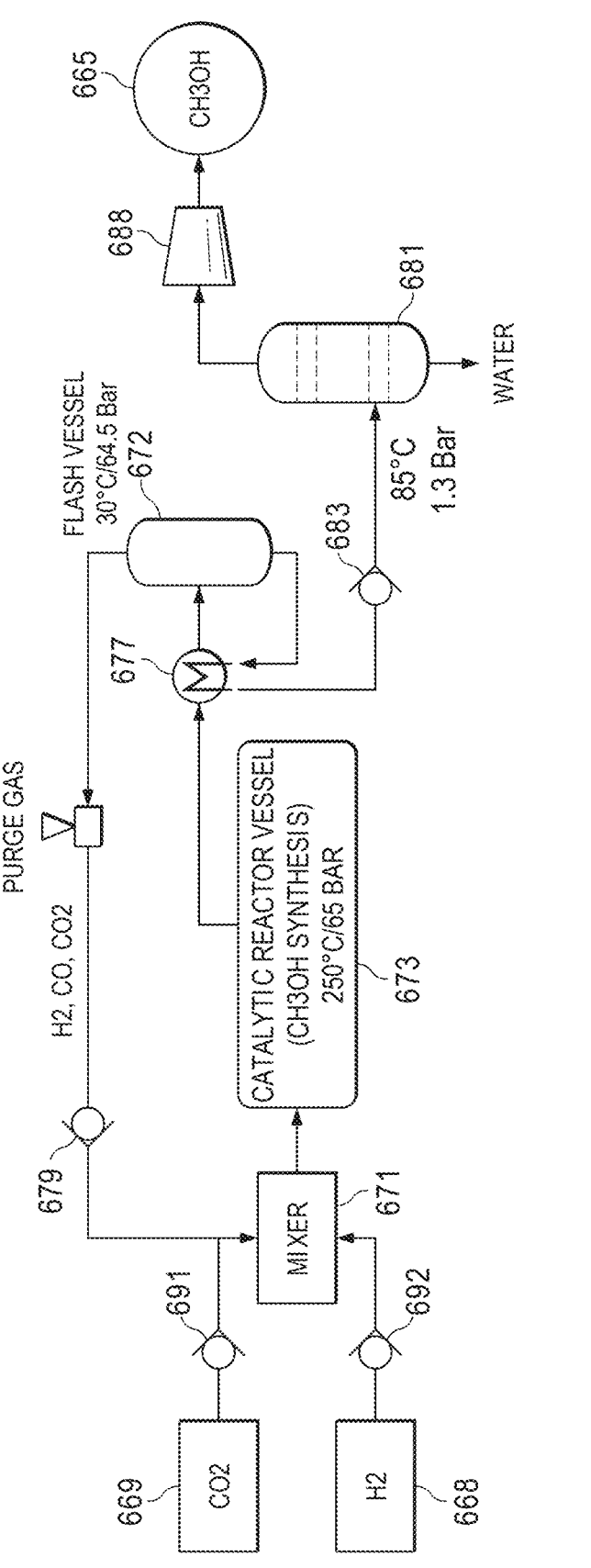
FIG. 33 is a schematic of an energy product conversion process, in accordance with an embodiment.

In the embodiment shown in FIG. 30, the energy product 508 is generated at the first free-floating body 501 and subsequently transported to land 518. That is, the energy product 508 may not undergo any subsequent processing after it has been produced. However, in other embodiments, the energy product 508 may be further processed in order to generate an alternative product before reaching land 518 (or near land). For example, the initial energy product 508 may be filtered, compressed (e.g., from gas to liquid), used in a reaction as a precursor, or otherwise processed before reaching land 518 or near land. For example, hydrogen gas may be used as a precursor in order to generate a more energy dense substance or fuel, such as methanol, or algae can be processed into algae oil. These processing operations may be implemented on the first free-floating body 501, on the second free-floating body 580, or on a combination of both the first free-floating body 501 and the second free-floating body 580. Examples of such processing are shown in FIGS. 31-33.

Figure 31:
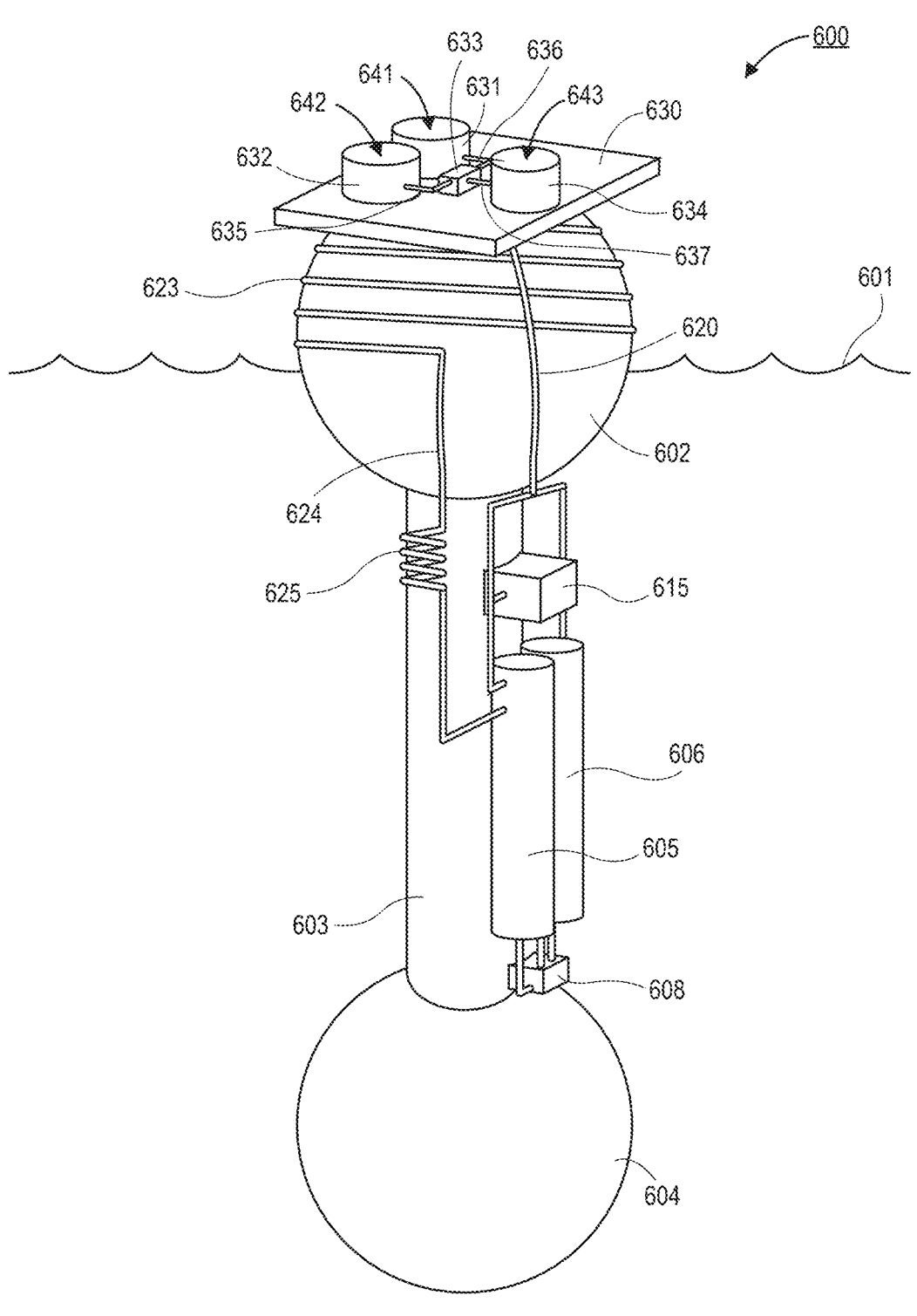
FIG. 31 is a side perspective view of a vessel with a thermal and electrical battery with an energy product conversion plant integrated on the vessel, in accordance with an embodiment.

Referring now to FIG. 31 a side perspective view of an WEC 600 with an integrated thermal and electrical battery and an integrated processing plant on a platform 630 is shown, in accordance with an embodiment. The WEC 600 floats adjacent to an upper surface of a body of water 601 over which waves tend to pass. The WEC 600 comprises a hollow buoyant chamber 602, and/or buoy. In an embodiment a tube 603 is coupled to the buoyant chamber 602 and a lower hollow buoyant chamber 604.

In an embodiment, a thermal and electrical battery is coupled to the WEC 600. The battery may be similar to any of the thermal and electrical batteries described in greater detail herein. For example, an electrolyzer 608 may be fluidically coupled to a first tank 605 for storing an oxidizing gas and a second tank 606 for storing a fuel. The first tank 605 and the second tank 606 may be fluidically coupled to a fuel cell 615 for producing electrical current to power an electrical load (not shown) on the WEC 600. The first tank

605 and the second tank 606 may also be fluidically coupled to a feed line 620 that is fluidically coupled to a reaction pipe 623 for producing thermal energy from an exothermic reaction of the oxidizing gas and the fuel. The byproducts from the reaction pipe 623 may flow down a return line 624 (and optional condenser 625) back to the first tank 605.

As described in other embodiments, an energy product 641 may be generated by way of conversion of wave energy into electrical power. In some embodiments, the energy product 641 may be a gas or other fluid, such as hydrogen gas. The energy product 641 may be stored in a first storage container 631. WEC 600 depicts the first storage container 631 for the energy product 641 being on the platform 630. Though other implementations may include the first storage container 631 being integrated into the hollow chamber 602, being external to the WEC 600 (e.g., being attached or otherwise coupled to an external surface of the WEC 600), or positioned in the approximate area of the WEC 600 (e.g., on a second floating platform that is at least temporarily coupled to the WEC 600).

In an embodiment, the energy product 641 in the first storage container 631 may be used as a precursor for a chemical reaction. In an additional embodiment, a second precursor 642 may be stored in a second storage container 632. In the instance of a chemical reaction to convert hydrogen gas into methanol, the second precursor 642 may comprise $CO_2$ or another carbon containing source. The second precursor 642 may also be generated as an energy product on the WEC 600, or the second precursor 642 may be periodically replenished by a vessel, or the like. The energy product 641 may flow from the first storage container 631 into a reaction apparatus 633 through pipe 636, and the second precursor 642 may flow from the second storage container 632 into the reaction apparatus 633 through pipe 635. The reacted product 643 (e.g., a second energy product) may flow through pipe 637 into a third storage container 634. The reacted product 643 may be periodically removed from the third storage container 634 for transport to an alternative location (e.g., another storage location or use facility, either on the body of water 601 or on land). While a simple reaction process is shown in FIG. 31, it is to be appreciated that any suitable conversion, filtering, compression, reaction, treatment, or the like may be implemented on the WEC 600.

Referring now to FIG. 32 a side view schematic of a vessel 650 that may be used to transport an energy product from a WEC with a thermal and electrical battery (not shown) to land (not show) is shown. For example, vessel 650 may be similar to the second free-floating body 580 in FIG. 30. The vessel 650 may include a first storage container 651 for storing an energy product 661. The energy product 661 may be transported into the first storage container 651 from a WEC, or from another vessel (not shown) that obtained the energy product 661 from a WEC. For example, the energy product 661 may comprise hydrogen or any other energy product described in greater detail herein. The vessel 650 may also comprise a second storage container 652 for storing an additional precursor 662. In the case of hydrogen to methanol conversion, the additional precursor 662 may comprise carbon (e.g., $CO_2$). In an embodiment, the energy product 661 and the precursor 662 are flown into a reaction apparatus 653. The combined energy product 661 and precursor 662 may react in the reaction apparatus 653 to form a reacted product 663 that is transported to a third storage container 655. The reacted product 663 may be transported by the vessel 650 to an alternative storage or use facility (either on land or on the water 654). While a simple reaction process is shown in FIG. 32, it is to be appreciated that any suitable conversion, filtering, compression, reaction, treatment, or the like may be implemented on the vessel 650.

Referring now to FIG. 33 a diagram providing a more detailed explanation of a reaction process that may be used to convert a first energy product into a second energy product is shown, in accordance with an embodiment. The conversion depicted in FIG. 33 can be implemented on a WEC (e.g., similar to FIG. 31), on a transport vessel (e.g., similar to FIG. 32), partially on the WEC and partially on the transport vessel, or partially on a first transport vessel and partially on a second transport vessel. In the embodiment shown in FIG. 33, a detailed process by which methanol ($CH_3OH$) is synthesized from, by, and/or through, $CO_2$ hydrogenation is shown. In an embodiment, $CO_2$ is stored in $CO_2$ tank 669 and $H_2$ is stored in $H_2$ tank 668. One or both of the $CO_2$ and the $H_2$ may be energy products generated by a WEC with a thermal and electrical battery. The $CO_2$ and $H_2$ are pumped with pump 691 and pump 692 and combined in a mixer 671 with a recirculated stream from flash vessel 672. The mixed stream (of $CO_2$ and $H_2$ gases) is pumped to a catalytic reactor vessel 673 where an exothermic reaction takes place, and the temperature and pressure can reach 250° C. and 65 bar, respectively, or higher. The post-reaction stream exits the catalytic reactor vessel 653 and passes through heat exchanger 677 and then enters flash vessel 672 where the temperature and pressure will be approximately 30.0° C. and 64.5 bar, respectively.

A stream of $H_2$, CO and $CO_2$ from flash vessel 672 is recirculated back to mixer 671 by pump 679 after being purged of a small amount of gas to further purify the stream. The liquid stream from flash vessel 672 enters heat exchanger 677 which is then pumped to distillation tower 681 by pump 683. The crude $CH_3OH$ stream entering distillation tower 681 can be at a temperature and pressure of 85° C. and 1.3 bar, respectively. A final separation of $CH_3OH$ and water takes place within distillation tower 681. Gaseous $CH_3OH$ is pumped to methanol ballast sphere 665 via a compressor pump 688 where the $CH_3OH$ is cooled to liquefaction. Water extracted from the crude aqueous $CH_3OH$ is released from a bottom of the distillation tower 681. Other processes for synthesizing methanol from $CO_2$ and $H_2$ are known in the prior art and can be used in place of the one shown. Embodiments utilizing, incorporating, and/or including, such other methanol synthesis processes and/or associated mechanism and equipment are included within the scope of the present disclosure. Further, while methanol synthesis is provided as one example, conversion or reaction of any energy products using any suitable chemical reactions, processes, treatments, filtering, or the like may be used.

In the several of the previous embodiments, while energy products are defined as being physical items (e.g., fuels, chemicals, biological goods, etc.), embodiments are not limited to such configurations. For example, electrical power derived by a WEC described herein may be used to power one or more computational systems. These systems may be used in order to provide computational work that has a monetary or social value. For example, computational work can be used to host a data center, implement block-chain mining, training machine learning (ML) or artificial intelligence (AI) algorithms, or the like. An example of such a system is provided in FIG. 34.

Figure 34:
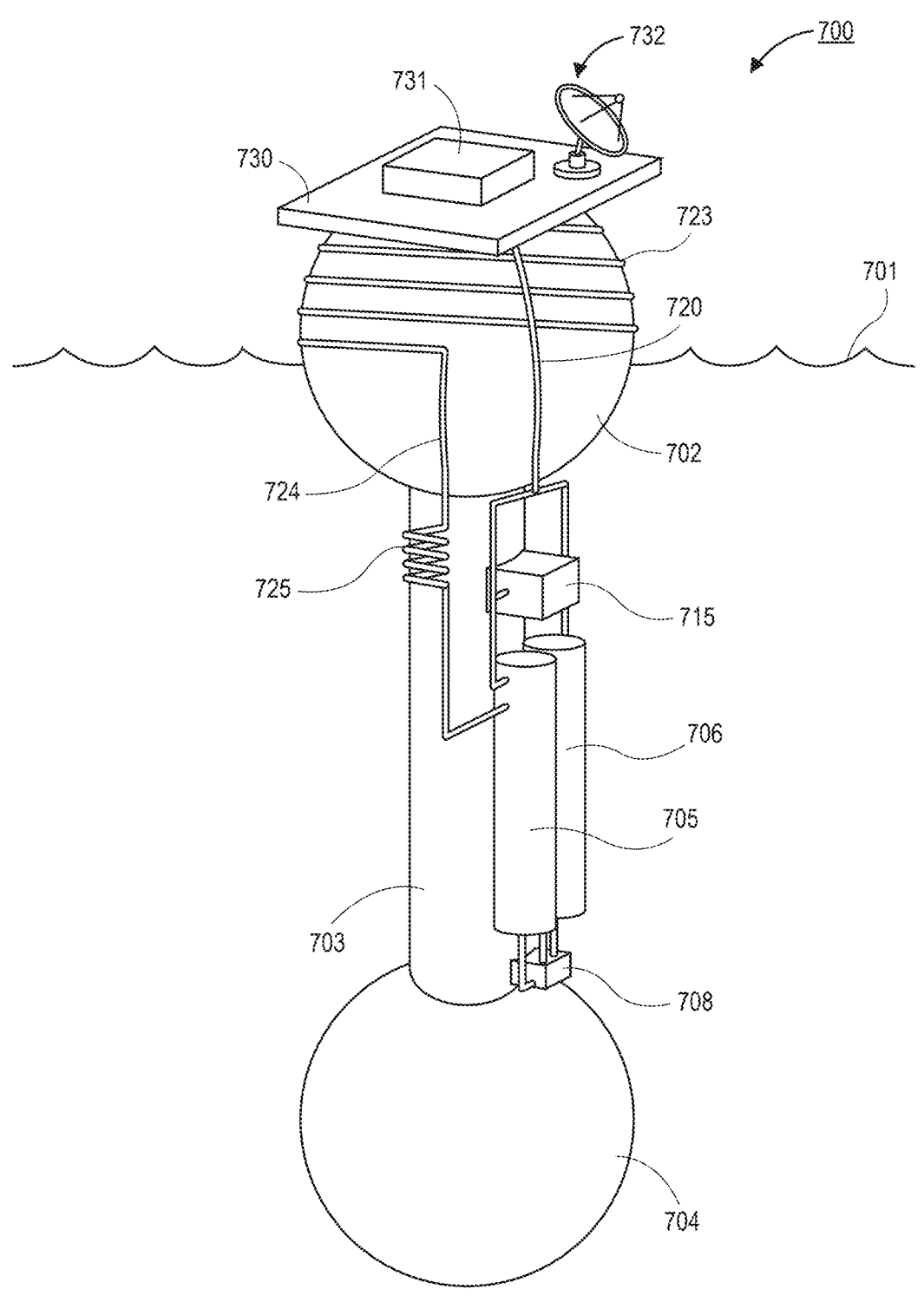
FIG. 34 is a side perspective view of a vessel with a thermal and electrical battery with a computing system integrated on the vessel, in accordance with an embodiment.

Referring now to FIG. 34 a side perspective view of a WEC 700 that includes a thermal and electrical battery with an integrated computing system 731 on a platform 730 at the top of the WEC 700 is shown, in accordance with an embodiment. The WEC 700 floats adjacent to an upper surface 701 of a body of water over which waves tend to pass. The WEC 700 comprises a hollow buoyant chamber 702, and/or buoy. In an embodiment a tube 703 is coupled to the buoyant chamber 702. A lower hollow buoyant chamber 704 may be provided at a bottom of the tube 703.

In an embodiment, a thermal and electrical battery is coupled to the WEC 700. The battery may be similar to any of the thermal and electrical batteries described in greater detail herein. For example, an electrolyzer 708 may be fluidically coupled to a first tank 705 for storing an oxidizing gas and a second tank 706 for storing a fuel. The first tank 705 and the second tank 706 may be fluidically coupled to a feed line 720 that is fluidically coupled to a fuel cell 715 for producing electrical current to power an electrical load (not shown) on the WEC 700. The first tank 705 and the second tank 706 may also be fluidically coupled to a reaction pipe 723 for producing thermal energy from an exothermic reaction of the oxidizing gas and the fuel. The byproducts from the reaction pipe 723 may flow down a return line 724 (and optional condenser 725) back to the first tank 705.

As described in other embodiments, an energy product may be generated by way of conversion of wave energy into electrical power. In some embodiments, the energy product may be a gas or other fluid, such as hydrogen gas. In some instances, the energy product may be used in order to operate a computing system 731. In an embodiment, a platform 730 may be provided over a top of the buoyant chamber 702. The computing system 731 may be provided on the platform and include an enclosure to protect components from water and the elements. Any number of computational systems (e.g., processors, graphics processors, etc.), memories, and/or the like may be housed within the enclosure. The computing system 731 may be configured with a plurality of processing systems integrated with each other in order to perform complex computer processing operations. As noted above, the computing system 731 may be optimized and/or configured to implement one or more of data center hosting, implementing block-chain mining, training ML or AI algorithms, or the like. The outcome of the computational work (e.g., block-chain coins or tokens, trained algorithms, data center capacity, etc.) can be transmitted to external devices over a wireless network through one or more antennas 732, or other wireless systems. As noted above, the computing system may be powered by energy generated by the WEC 700 through conversion of wave energy into electrical power, or through conversion of the energy product stored in a chamber back into electrical power (e.g., through the use of a hydrogen fuel cell or the like).

Figure 35:
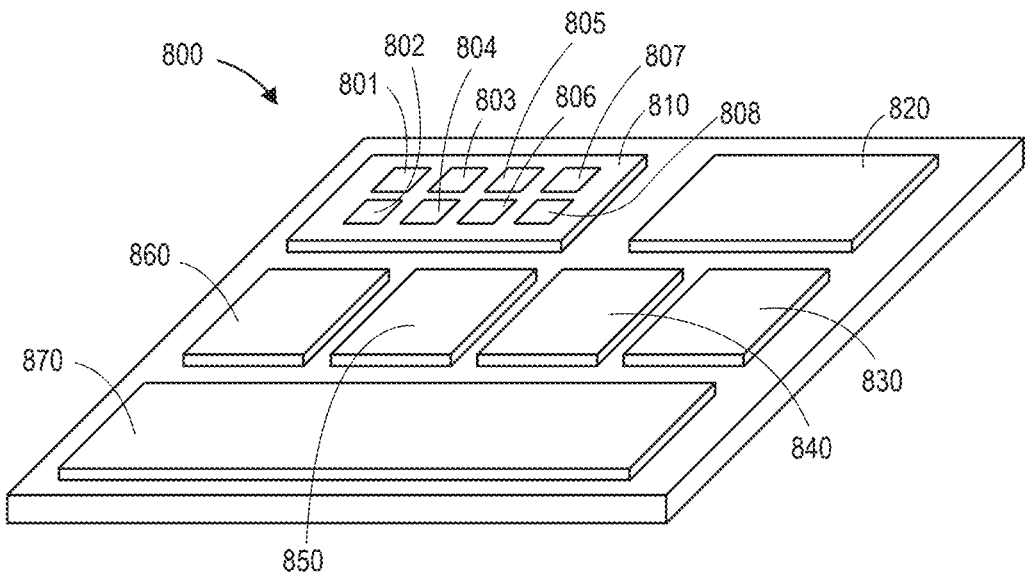
FIG. 35 is a perspective view of a computing system that can be integrated with a vessel that comprises a thermal and electrical battery, in accordance with an embodiment.

Referring now to FIG. 35 a perspective view of an computing system 800 that may be integrated with a WEC with a thermal and electrical battery, such as those described in greater detail herein, is shown, in accordance with an embodiment. The computing system 800 may comprise an array of electronics, hardware, and/or software that are configured to control one or more aspects of the wave-energy generation device. While the components illustrated in FIG. 34 are shown on a single board, it is to be appreciated that components may be on separate boards, structures, or the like. The computing system 800 may be housed within a water tight chamber or enclosure provided on the WEC.

Computing system 800 may comprise a computing device 810. The computing device 810 houses a board. The board may include a number of components, including but not limited to a processor 801. The processor 801 may include, but is not limited to, a central processing unit (CPU), a graphics processing unit (GPU), an application-specific integrated circuit (ASIC), a field programmable gate array (FPGA), and/or the like. The processor 801 is physically and electrically coupled to the board. Other components of computing device 810 include, but are not limited to, one or more memories 802 or 803, such as volatile memory (e.g., DRAM), non-volatile memory (e.g., ROM), flash memory, a mass storage device (such as hard disk drive, compact disk (CD), digital versatile disk (DVD), and so forth). The computing device may comprise a communications chipset 804, a digital signal processor 805, a chipset 806, an antenna 807, and/or an input/out device 808.

Computing system 800 may comprise a communications device 820. The communications device 820 enables wireless communications for the transfer of data to and from the computing system 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communications device 820 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing system 800 may include a plurality of communications devices 820. For instance, a first communications device 820 may be dedicated to shorter range wireless communications such as Wi-Fi and Bluetooth and a second communications device 820 may be dedicated to longer range wireless communications such as GPS, EDGE, GPRS, CDMA, WiMAX, LTE, Ev-DO, and others. The communications device 820 may be communicatively coupled to one or more antennas, satellite dishes, or other device to broadcast and/or receive wireless communications. The antennas or the like may be external to the enclosure, or the antennas may be within the enclosure.

Computing system 800 may also comprise a server rack 830. The server rack 830 may comprise a plurality of processors with associated hardware and software. The server rack 830 may execute computational work in order to provide a revenue generating service. The server rack 830 may be powered through energy generated by the WEC, such as those described in greater detail herein. While a constant power supply may be desired, computing system 800 may still function with an intermittent or non-constant power supply provided by wave-energy generation. To deal with the variable power supply, server rack 830 may include controllers that adjust clock speed for the processors. This allows for power consumption to be directly controlled to coincide with available power. In some instances, the server rack 830 may perform data center operations or tasks. The server rack 830 may host and/or deliver content, or otherwise provide a link between consumers and centralized data storage. In some instances, the server rack 830 may perform services in conjunction with block-chain technologies, such as cryptocurrency mining. The server rack 830 may perform services such as ML or AI training as well.

Computing system 800 may include a positioning system 840. The positioning system 840 may include one or more modules, components, and/or apparatuses for determining a geolocation of the wave-energy generation device. In some instances, the positioning system 840 may comprise a GPS, a compass, an accelerometer, a gyroscope, and/or the like.

The positioning system 840 may include a processor and/or controller to enable navigation for the wave-energy generation device. For example, actuators may be controlled in order to steer or direct the wave-energy generation device in a particular direction. Propulsion devices (e.g., propellers, water get flows, etc.) on the WEC may also be powered and/or directed by components of the positioning system 840.

Computing system 800 may include a sensor module 850. The sensor module 850 may include processors, memory, and associated hardware and software to control and/or record data from one or more sensors that monitor various aspects of the WEC. Sensors may comprise, but are not limited to, a pressure sensor, a gas composition sensor, a water level sensor, a temperature sensor, a fluid flow rate sensor, an electrical current sensor, a power sensor, a camera, an optical sensor, or the like. The physical sensors may be distributed throughout the WEC, and the controlling circuitry/software may be provided in the sensor module 850 within the computing system 800.

Computing system 800 may include an interface module 860. The interface module 860 may comprise one or more components used to interface with the wave-energy generation device. The interface module 860 may include one or more input devices. For example, a keyboard, a mouse, a touchscreen display, or the like may be provided in the interface module 860. Output devices, such as a display screen, a speaker, or the like may also be provided in the interface module 860. The interface module 860 may further comprise a camera, a video camera, a biometric screening device, or the like.

Computing system 800 may include a battery module 870. The battery module 870 may include any type of battery. The battery may include a rechargeable battery, such as a lithium based battery (e.g., a lithium-ion battery). The battery of the battery module 870 may be charged by electricity generated by the WEC. The battery module 870 may be used as a store of power in order to power one or more electrical components of the computing system 800, or any other powered device of the wave-energy generation device. The battery module 870 may be used in order to normalize power delivery to electrical components. For example, the battery module may supply power in order to equalize total power delivery when the wave-energy generation device provides variable power over time.

Figure 36:
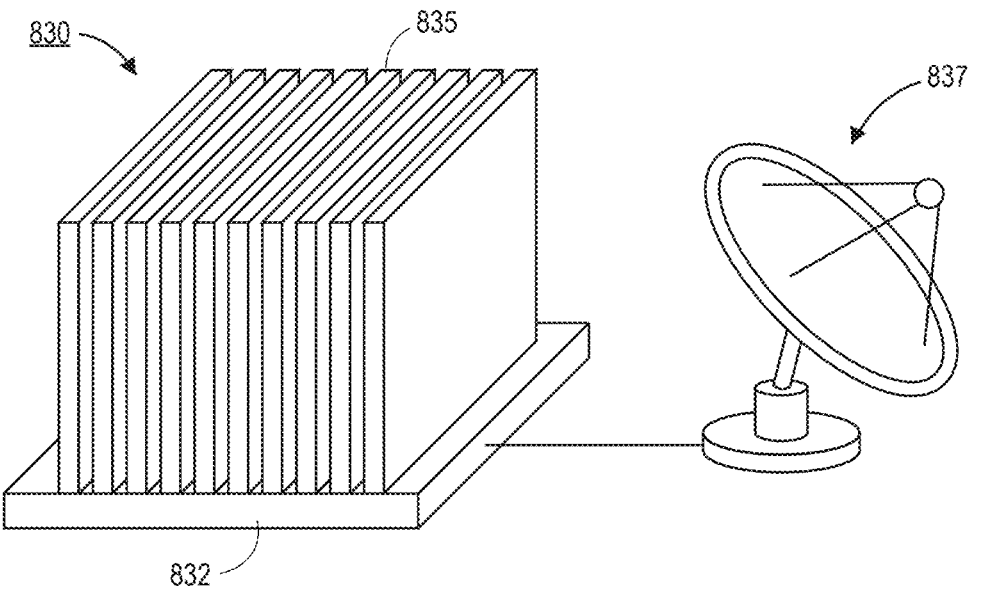
FIG. 36 is a perspective view of a server system that can be integrated with a vessel that comprises a thermal and electrical battery, in accordance with an embodiment.

Referring now to FIG. 36 a perspective view of a server rack 830 that may be integrated into a WEC with a thermal and electrical battery, such as those described in greater detail herein, is shown, in accordance with an embodiment. As shown, the server rack 830 may include a plurality of server blades 835 that are provided on a rack 832. The server blades 835 may be communicatively coupled to each other through the rack 832 and/or associated cabling, in order to provide enhanced processing power. The server blades 835 may include processors, such as, but not limited to, central processing units (CPUs), graphics processing units (GPUs), application-specific integrated circuits (ASICs), field programmable gate arrays (FPGAs), and/or the like.

In some instances the server rack 830 is communicatively coupled to an antenna 837 to enable wireless communication. The antenna 837 may include a parabolic dish antenna or any other antenna configuration. The ability to wirelessly transmit data from the server rack 830 allows for data to be processed remotely at the source of power generation (e.g., in the ocean) while still being useful to the end consumer. The data delivery, hosting, computation, and the like can be executed at lower energy costs using such wave-energy generation devices. Further, the server rack 830 can be passively cooled by the body of water surrounding the wave-energy generation device (e.g., the server rack 830 can be in a water tight enclosure that is submersed in water). In some instances, the server rack 830 functions as a crypto-currency mining rig that is powered through the energy produced by the WEC.

Figure 37:
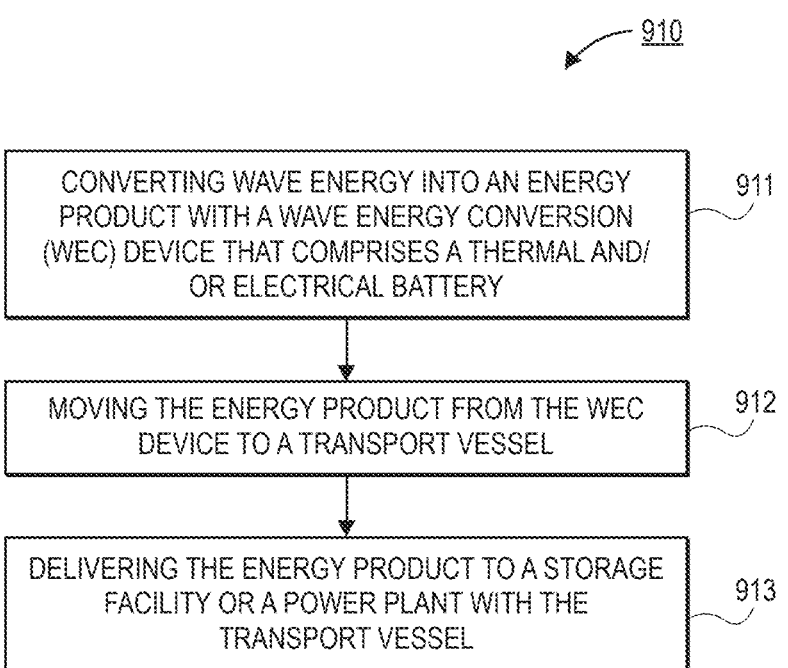
FIG. 37 is a process flow diagram of a process for generating an energy product with a first vessel with a thermal and electrical battery and transporting the energy product to a second vessel, in accordance with an embodiment.

FIG. 37 is a process flow diagram of a process 910 for generating an energy product with a WEC and transporting the energy product to an alternative location is shown in accordance with an embodiment. In an embodiment, the process 910 may begin with operation 911, which comprises converting wave energy into an energy product with a WEC that comprises a thermal and electrical battery. The WEC may be similar to any of the WECs described in greater detail herein. The energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the energy product may be made using any process described herein. For example, electrical power generated by the WEC can be used in order to produce the energy product.

In an embodiment, the process 910 may continue with operation 912, which comprises moving the energy product from the WEC to a transport vessel. The transport vessel may be similar to any vessel described herein. For example, the transport vessel may comprise a boat, a submersible, an aerial vehicle, or any other vessel that is capable of controlled motion on, through, and/or over the body of water on which the WEC floats. The energy product may be delivered or moved (actively or passively) to the transport vessel through any mechanism, such as a hose, a pipe, a cable, or the like.

In an embodiment, the process 910 may continue with operation 913, which comprises moving the energy product to a storage facility or a power plant with the transport vessel. The storage facility or a power plant may be provided at a location that is different than an approximate location of the WEC. In one embodiment, the location is at land. Though, in other embodiments, the location is near land (e.g., up to 100 kilometers from land, up to 40 kilometers from land, up to 1 kilometer from land, up to 500 meters from land, or up to 50 meters from land). In other embodiments, the storage facility may be a second vessel. For example, the first vessel may take the energy product from the WEC and deliver it to the second vessel. The second vessel may then take the energy product towards shore.

Figure 38:
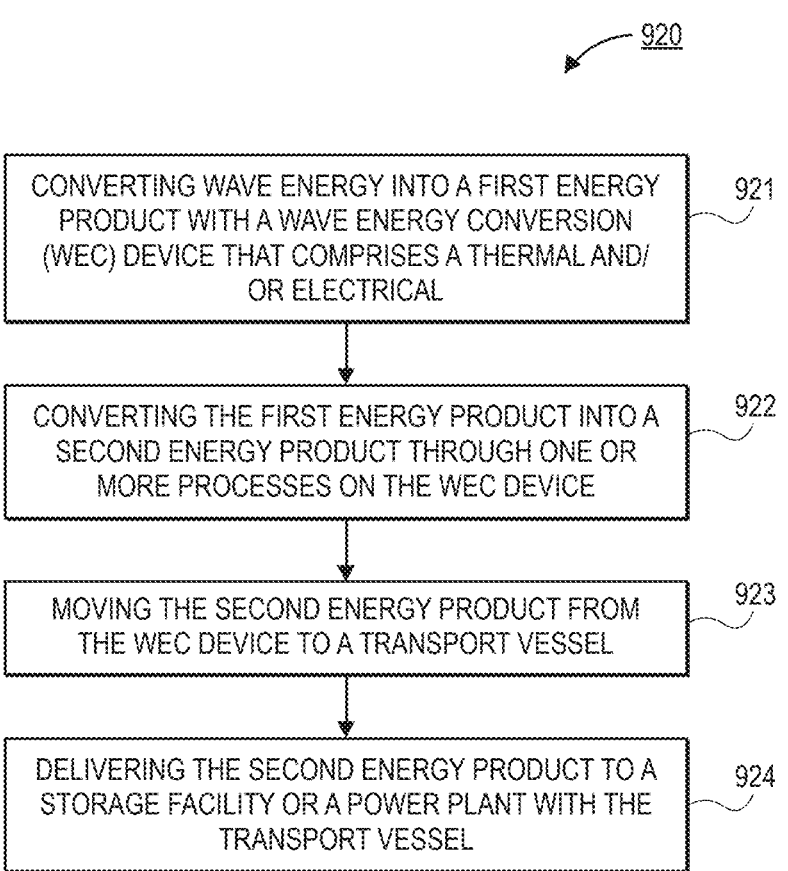
FIG. 38 is a process flow diagram of a process for energy product generation and conversion on a first vessel with a thermal and electrical battery and transporting the converted energy product to a second vessel, in accordance with an embodiment.

FIG. 38 is a process flow diagram of a process 920 for converting a first energy product into a second energy product and transporting the second energy product to a storage facility or power plant. In an embodiment, the process 920 may begin with operation 921, which comprises converting wave energy into a first energy product with a WEC that comprises a thermal and electrical battery. The WEC may be similar to any of the WECs described in greater detail herein. The first energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the first energy product may be made using any process described herein. For example, electrical power generated by the WEC can be used in order to produce the energy product.

In an embodiment, the process 920 may continue with operation 922, which comprises converting the first energy product into a second energy product through one or more processes on the WEC. The conversion of the first energy product to the second energy product may include converting one type of fuel or chemical into another fuel or chemical. In one embodiment, the first energy product may comprise hydrogen, and the second energy product may comprise methanol. Additional precursors (e.g., $CO_2$) may be reacted with the first energy product in order to generate the second energy product. For example, a process similar to the process described with respect to FIG. 33 may be used in some embodiments. Other conversion processes may also be used, such as, but not limited to, filtering, compression (e.g., from a gas to a liquid), purification, or the like may be used. Conversions may also include processing biological products. For example, algae may be processed into algae oil, or fish may be processed into fish oil. The conversion process may be implemented on or within the vicinity of the WEC. For example, a processing plant may be provided on the WEC, similar to what is shown in FIG. 31.

In an embodiment, the process 920 may continue with operation 923, which comprises moving the second energy product from the WEC to a transport vessel. The transport vessel may be similar to any vessel described herein. For example, the transport vessel may comprise a boat, a submersible, an aerial vehicle, or any other vessel that is capable of controlled motion on, through, and/or over the body of water on which the WEC floats. The second energy product may be delivered or moved (actively or passively) to the transport vessel through any mechanism, such as a hose, a pipe, a cable, or the like.

In an embodiment, the process may continue with operation 924, which comprises delivering the second energy product to a storage facility or a power plant with the transport vessel. The storage facility or a power plant may be provided at a location that is different than an approximate location of the WEC. In one embodiment, the location is at land. Though, in other embodiments, the location is near land (e.g., up to 100 kilometers from land, up to 40 kilometers from land, up to 1 kilometer from land, up to 500 meters from land, or up to 50 meters from land). In other embodiments, the storage facility may be a second vessel. For example, the first vessel may take the second energy product from the WEC and deliver it to the second vessel. The second vessel may then take the second energy product towards shore.

FIG. 39 is a process flow diagram of a process 930 for converting a first energy product into a second energy product and transporting the second energy product to storage facility or power plant. In an embodiment, the process 930 may begin with operation 931, which comprises converting wave energy into a first energy product with a WEC that comprises a thermal and electrical battery. The WEC may be similar to any of the WECs described in greater detail herein. The first energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the first energy product may be made using any process described herein. For example, electrical power generated by the WEC can be used in order to produce the energy product.

In an embodiment, the process 930 may continue with operation 932, which comprises moving the first energy product from the WEC to a transport vessel. The transport vessel may be similar to any vessel described herein. For example, the transport vessel may comprise a boat, a submersible, an aerial vehicle, or any other vessel that is capable of controlled motion on, through, or over the body of water on which the WEC floats. The first energy product may be delivered or moved (actively or passively) to the transport vessel through any mechanism, such as a hose, a pipe, a cable, or the like.

In an embodiment, the process 930 may continue with operation 933, which comprises converting the first energy product into a second energy product through one or more processes on the transport vessel. The conversion of the first energy product to the second energy product may include converting one type of fuel or chemical into another fuel or chemical. In one embodiment, the first energy product may comprise hydrogen, and the second energy product may comprise methanol. Additional precursors (e.g., $CO_2$) may be reacted with the first energy product in order to generate the second energy product. For example, a process similar to the process described with respect to FIG. 33 may be used in some embodiments. Other conversion processes may also be used, such as, but not limited to, filtering, compression (e.g., from a gas to a liquid), purification, or the like may be used. Conversions may also include processing biological products. For example, algae may be processed into algae oil, or fish may be processed into fish oil. The conversion process may be implemented on or within the vicinity of the transport vessel. For example, a processing plant may be provided on the transport vessel, similar to what is shown in FIG. 32.

In an embodiment, the process 930 may continue with operation 934, which comprises delivering the second energy product to a storage facility or a power plant with the transport vessel. The storage facility or a power plant may be provided at a location that is different than an approximate location of the WEC. In one embodiment, the location is at land. Though, in other embodiments, the location is near land (e.g., up to 100 kilometers from land, up to 40 kilometers from land, up to 1 kilometer from land, up to 500 meters from land, or up to 50 meters from land). In other embodiments, the storage facility may be a second vessel. For example, the first vessel may take the energy product from the WEC and deliver it to the second vessel. The second vessel may then take the energy product towards shore.

FIG. 40 is a process flow diagram of a process 940 for using a WEC to power a computing system (either directly or through use of an energy product) in order to generate digital goods. In an embodiment, the process 940 may begin with operation 941, which comprises converting wave energy into an energy product with a WEC that comprises a thermal and electrical battery. The WEC may be similar to any of the WECs described in greater detail herein. The first energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the first energy product may be made using any process described herein. For example, electrical power generated by the WEC can be used in order to produce the energy product.

In an embodiment, the process 940 may continue with operation 942, which comprises powering a computer system coupled to the WEC through the conversion of the energy product into electricity. For example, the energy product may be a fuel (e.g., hydrogen) that can be consumed to generate electricity. This may provide a more stable and consistent power supply than relying on the direct conversion of wave energy to electricity to power the computer system. Though, in some embodiments, the WEC may directly power the computer system without the need to generate an intervening energy product to store energy for future use.

In an embodiment, the process 940 may continue with operation 943, which may comprise generating a digital good through use of the computing system. In an embodiment, the digital good may include a block-chain based coin, a trained ML algorithm, a trained AI algorithm, a software product, a digital token, server capacity, or the like. The digital good may be stored on a non-transitory computer readable medium (e.g., a memory, a disk drive, a CD, a DVD, or other storage medium) in some embodiments.

In an embodiment, the process 940 may continue with operation 944, which comprises wirelessly transporting the digital good to a receiving device external to the WEC. The receiving device may be a second non-transitory computer readable medium provided at a location remote from the WEC. For example, the receiving device may be located on land or near land (e.g., up to 100 kilometers from land, up to 40 kilometers from land, up to 1 kilometer from land, up to 500 meters from land, or up to 50 meters from land). In an embodiment, the wireless transfer of the digital good may be transmitted through an antenna or other device for connecting to a wireless network. While wireless transport of the digital good may be faster, physical transport of the digital good stored on a non-transitory computer readable medium may also be provided by way of a vessel, a wired connection, or the like.

While the foregoing disclosure has described various embodiments, it is understood that the invention is not limited to any specific embodiment or depiction herein. A person of ordinary skill in the art would readily appreciate modifications and substitutions herein, and the scope of the invention includes all such modifications and substitutions. Accordingly, the scope of the invention should not be construed to be limiting by the foreign description except where expressly so stated, but rather the invention's scope is properly determined by the appended claims, using the common and ordinary meanings of the words therein consistent with, but not limited by, the descriptions and figures of this disclosure.

EXAMPLES

Example 1: a wave energy converter (WEC), comprising: a buoyant chamber; a tube depending from the buoyant chamber; and a battery coupled to the WEC, wherein the battery comprises: a first tank for storing an oxidizing gas and a precursor fluid; a second tank for storing a fuel; a fuel cell fluidically coupled to the first tank and the second tank; and a reaction pipe fluidically coupled to the first tank and the second tank.

Example 2: the WEC of Example 1, wherein the reaction pipe wraps around the buoyant chamber.

Example 3: the WEC of Example 1, wherein the battery further comprises: a catalyst along the reaction pipe.

Example 4: the WEC of Example 3, wherein the catalyst comprises one or more of an ultraviolet light, a spark plug, or a piece of platinum.

Example 5: the WEC of Example 3, wherein the reaction pipe comprises an apex, and wherein the first tank and the second tank are on a first side of the apex, and the catalyst is on a second side of the apex.

Example 6: the WEC of Example 1, wherein the battery further comprises: a first valve between the first tank and the fuel cell; a second valve between the second tank and the fuel cell; a third valve between the first tank and the reaction pipe; and a fourth valve between the second tank and the reaction pipe.

Example 7: the WEC of Example 1, further comprising: an electrolyzer fluidically coupled to the first tank and the second tank.

Example 8: the WEC of Example 7, wherein the electrolyzer is powered by energy generated by the WEC.

Example 9: the WEC of Example 1, wherein an end of the reaction pipe opposite from the first tank is fluidically coupled to a third tank.

Example 10: the WEC of Example 1, wherein a first end of the reaction pipe and a second end of the reaction pipe are fluidically coupled to the first tank.

Example 11: the WEC of Example 1, further comprising: a condenser along a length of the reaction pipe.

Example 12: the WEC of Example 1, further comprising: a mast that extends up from an upper end of the buoyant chamber, and where the reaction pipe wraps around the mast.

Example 13: the WEC of Example 1, wherein the reaction pipe is inside the buoyant chamber.

Example 14: the WEC of Example 1, wherein the first tank and the second tank are within the buoyant chamber and/or the tube.

Example 15: the WEC of Example 1, wherein the reaction pipe comprises: a first fluidic path; and a second fluidic path, wherein the first fluidic path and the second fluidic path are in fluidic parallel with each other.

Example 16: the WEC of Example 1, wherein the fuel cell is configured to power a load that comprises one or more of a sensor, a processor, a server, a communications system, a communications component, a light, a beacon, a transponder, a battery, an electrical motor, or a propulsion device.

Example 17: a thermal and electric battery, comprising: a first tank that is configured to store an oxidizing gas and a precursor fluid; a second tank that is configured to store a fuel, wherein the oxidizing gas and the fuel react exothermically to produce thermal energy within a reaction pipe that is fluidically coupled to the first tank and the second tank; and a fuel cell fluidically coupled to the first tank and the second tank, wherein the fuel is cell is configured to generate electricity in response to a flow of the oxidizing gas and the fuel through the fuel cell.

Example 18: the thermal and electric battery of Example 17, further comprising: a catalyst along the reaction pipe.

Example 19: the thermal and electric battery of Example 18, wherein the reaction pipe comprises an apex, and wherein the first tank and the second tank are on a first side of the apex, and the catalyst is on a second side of the apex.

Example 20: the thermal and electric battery of Example 17, further comprising: an electrolyzer fluidically coupled to the first tank and the second tank.

Example 21: the thermal and electric battery of Example 17, further comprising: a condenser along the reaction pipe.

Example 22: the thermal and electric battery of Example 17, wherein a first end of the reaction pipe and a second end of the reaction pipe are fluidically coupled to the first tank.

Example 23: the thermal and electric battery of Example 17, wherein a first end of the reaction pipe is fluidically coupled to the first tank, and wherein a second end of the reaction pipe is fluidically coupled to a third tank configured to store a reaction byproduct.

Example 24: the thermal and electric battery of Example 17, wherein the oxidizing gas comprises oxygen or chlorine, and wherein the fuel comprises a hydrogen containing gas.

Example 25: a buoyant wave energy apparatus that floats adjacent to an upper surface of a body of water over which waves pass, the buoyant wave energy apparatus comprising: a buoyant chamber with an attached inertial tube that extends down into the body of water, wherein the buoyant chamber and the inertial tube are configured to generate energy from a motion of waves that pass over and/or through the body of water, and wherein the apparatus further comprises a thermal and electric battery that is coupled to the buoyant chamber and/or the inertial tube, wherein a thermal portion of the thermal and electric battery is configured to warm the buoyant wave energy apparatus so that one or more components of the buoyant wave energy apparatus are at a suitable temperature in order to allow for operation in a cold environment, wherein an electrical portion of the thermal and electric battery is configured to provide power to one or more components of the buoyant wave energy apparatus, and wherein the thermal and electric battery comprises a first tank that is configured to store an oxidizing gas, a second tank that is configured to store a fuel that can react with the oxidizing gas to produce thermal energy within a reaction pipe that is fluidically coupled to the first tank and the second tank, and a fuel cell that is fluidically coupled to the first tank and the second tank, and wherein the fuel is cell is configured to generate electricity in response to a flow of the oxidizing gas and the fuel through the fuel cell.

I claim:

1. A wave energy converter (WEC), comprising:
a buoyant chamber;
a tube depending from the buoyant chamber; and
a battery coupled to the WEC, wherein the battery comprises:
   a first tank for storing an oxidizing gas and a precursor fluid;
   a second tank for storing a fuel;
   a fuel cell fluidically coupled to the first tank and the second tank;
   a reaction pipe fluidically coupled to the first tank and the second tank; and
   a return line coupled to the reaction pipe and to the first tank, the return line to replenish the precursor fluid in the first tank.

2. The WEC of claim 1, wherein the reaction pipe wraps around the buoyant chamber.

3. The WEC of claim 1, wherein the battery further comprises:
a catalyst along the reaction pipe.

4. The WEC of claim 3, wherein the catalyst comprises one or more of an ultraviolet light, a spark plug, or a piece of platinum.

5. The WEC of claim 3, wherein the reaction pipe comprises an apex, and wherein the first tank and the second tank are on a first side of the apex, and the catalyst is on a second side of the apex.

6. The WEC of claim 1, wherein the battery further comprises:
a first valve between the first tank and the fuel cell;
a second valve between the second tank and the fuel cell;
a third valve between the first tank and the reaction pipe; and
a fourth valve between the second tank and the reaction pipe.

7. The WEC of claim 1, further comprising:
an electrolyzer fluidically coupled to the first tank and the second tank.

8. The WEC of claim 7, wherein the electrolyzer is powered by energy generated by the WEC.

9. The WEC of claim 1, wherein an end of the reaction pipe opposite from the first tank is fluidically coupled to a third tank.

10. The WEC of claim 1, wherein a first end of the reaction pipe and a second end of the reaction pipe are fluidically coupled to the first tank.

11. The WEC of claim 1, further comprising:
a condenser along a length of the reaction pipe.

12. The WEC of claim 1, further comprising:
a mast that extends up from an upper end of the buoyant chamber, and where the reaction pipe wraps around the mast.

13. The WEC of claim 1, wherein the reaction pipe is inside the buoyant chamber.

14. The WEC of claim 1, wherein the first tank and the second tank are within the buoyant chamber and/or the tube.

15. The WEC of claim 1, wherein the reaction pipe comprises:
a first fluidic path; and
a second fluidic path, wherein the first fluidic path and the second fluidic path are in fluidic parallel with each other.

16. The WEC of claim 1, wherein the fuel cell is configured to power a load that comprises one or more of a sensor, a processor, a server, a communications system, a communications component, a light, a beacon, a transponder, a battery, an electrical motor, or a propulsion device.

17. A thermal and electric battery, comprising:
a first tank that is configured to store an oxidizing gas and a precursor fluid;
a second tank that is configured to store a fuel, wherein the oxidizing gas and the fuel react exothermically to produce thermal energy within a reaction pipe that is fluidically coupled to the first tank and the second tank;
a fuel cell fluidically coupled to the first tank and the second tank, wherein the fuel is cell is configured to generate electricity in response to a flow of the oxidizing gas and the fuel through the fuel cell; and
a return line coupled to the reaction pipe and to the first tank, the return line to replenish the precursor fluid in the first tank.

18. The thermal and electric battery of claim 17, further comprising:
a catalyst along the reaction pipe.

19. The thermal and electric battery of claim 18, wherein the reaction pipe comprises an apex, and wherein the first tank and the second tank are on a first side of the apex, and the catalyst is on a second side of the apex.

20. The thermal and electric battery of claim 17, further comprising:
an electrolyzer fluidically coupled to the first tank and the second tank.

21. The thermal and electric battery of claim 17, further comprising:
a condenser along the reaction pipe.

22. The thermal and electric battery of claim 17, wherein a first end of the reaction pipe and a second end of the reaction pipe are fluidically coupled to the first tank.

23. The thermal and electric battery of claim 17, wherein a first end of the reaction pipe is fluidically coupled to the first tank, and wherein a second end of the reaction pipe is fluidically coupled to a third tank configured to store a reaction byproduct.

24. The thermal and electric battery of claim 17, wherein the oxidizing gas comprises oxygen or chlorine, and wherein the fuel comprises a hydrogen containing gas.

25. A buoyant wave energy apparatus that floats adjacent to an upper surface of a body of water over which waves pass, the buoyant wave energy apparatus comprising:
a buoyant chamber with an attached inertial tube that extends down into the body of water, wherein the buoyant chamber and the attached inertial tube are configured to generate energy from a motion of waves that pass over and/or through the body of water, and wherein the buoyant wave energy apparatus further comprises a thermal and electric battery that is coupled to the buoyant chamber and/or the inertial tube, wherein a thermal portion of the thermal and electric battery is configured to warm the buoyant wave energy apparatus so that one or more components of the buoyant wave energy apparatus are at a suitable temperature in order to allow for operation in a cold environment, wherein an electrical portion of the thermal and electric battery is configured to provide power to one or more components of the buoyant wave energy apparatus, and wherein the thermal and electric battery comprises a first tank that is configured to store an oxidizing gas and a precursor fluid, a second tank that is configured to store a fuel that can react with the oxidizing gas to produce thermal energy within a reaction pipe that is fluidically coupled to the first tank and the second tank, a fuel cell that is fluidically coupled to the first tank and the second tank, and wherein the fuel is cell is configured to generate electricity in response to a flow of the oxidizing gas and the fuel through the fuel cell, and the thermal and electric battery comprising a return line coupled to the reaction pipe and to the first tank, the return line to replenish the precursor fluid in the first tank.

\* \* \* \* \*